(12) United States Patent
Meyers

(10) Patent No.: US 8,521,930 B1
(45) Date of Patent: Aug. 27, 2013

(54) METHOD AND APPARATUS FOR SCHEDULING TRANSACTIONS IN A HOST-CONTROLLED PACKET-BASED BUS ENVIRONMENT

(75) Inventor: Christopher Michael Meyers, Beaverton, OR (US)

(73) Assignee: Fresco Logic, Inc., Beaverton, OR (US)

( * ) Notice: Subject to any disclaimer, the term of this patent is extended or adjusted under 35 U.S.C. 154(b) by 223 days.

(21) Appl. No.: 13/190,237

(22) Filed: Jul. 25, 2011

Related U.S. Application Data

(63) Continuation-in-part of application No. 13/035,875, filed on Feb. 25, 2011, and a continuation-in-part of application No. 13/032,240, filed on Feb. 22, 2011, which is a continuation-in-part of application No. 13/015,392, filed on Jan. 27, 2011.

(60) Provisional application No. 61/369,668, filed on Jul. 31, 2010, provisional application No. 61/369,686, filed on Jul. 31, 2010, provisional application No. 61/391,027, filed on Oct. 7, 2010, provisional application No. 61/446,913, filed on Feb. 25, 2011, provisional application No. 61/307,899, filed on Feb. 25, 2010, provisional application No. 61/307,907, filed on Feb. 25, 2010, provisional application No. 61/307,939, filed on Feb. 25, 2010, provisional application No. 61/307,929, filed on Feb. 25, 2010.

(51) Int. Cl.
*G06F 13/22* (2006.01)
*G06F 13/362* (2006.01)
*G06F 13/42* (2006.01)

(52) U.S. Cl.
CPC ............ *G06F 13/22* (2013.01); *G06F 13/3625* (2013.01); *G06F 13/4221* (2013.01)

USPC ............ 710/109; 710/46; 710/107; 710/117; 710/313; 710/220

(58) Field of Classification Search
USPC .......................................................... 710/307
See application file for complete search history.

(56) References Cited

U.S. PATENT DOCUMENTS 6,721,815 B1 * 4/2004 Leete ............................... 710/6
7,007,119 B2 * 2/2006 Howard et al. ............... 710/100

(Continued)

OTHER PUBLICATIONS

U.S. Appl. No. 13/015,392, filed Jan. 27, 2011.

(Continued)

*Primary Examiner* — Ryan Stiglic
(74) *Attorney, Agent, or Firm* — Stoel Rives LLP

(57) ABSTRACT

Systems and methods schedule periodic and non-periodic transactions in a multi-port bus environment. The method may comprise performing multiple search passes through a first array of endpoints to determine whether dispatch resources are available for active endpoints satisfying a set of sort criteria. When dispatch resources are not available for an endpoint, a sort level may be marked with a marker to indicate that an endpoint has not been serviced. After the active endpoints in the first array have been serviced by dispatching a periodic transaction to the endpoint or by marking a sort level corresponding to the endpoint, a non-periodic transaction may be dispatched to an active endpoint in a second array. In response to receiving an indication that the dispatch resources have become available, a subsequent search pass may be made through the first array, starting with a highest priority sort level that is marked with the marker.

51 Claims, 21 Drawing Sheets

(56) References Cited

U.S. PATENT DOCUMENTS

| | | | |
|---|---|---|---|
| 7,281,074 B2* | 10/2007 | Diefenbaugh et al. | 710/260 |
| 7,490,255 B2* | 2/2009 | Diefenbaugh et al. | 713/320 |
| 7,849,251 B2* | 12/2010 | Diefenbaugh | 710/313 |
| 7,853,748 B2* | 12/2010 | Fleming | 710/311 |
| 7,895,370 B2* | 2/2011 | Fleming | 710/18 |
| 8,200,858 B1* | 6/2012 | Shor | 710/39 |
| 8,285,909 B2* | 10/2012 | Diefenbaugh | 710/313 |
| 2003/0005197 A1* | 1/2003 | Abramson et al. | 710/300 |
| 2003/0079061 A1* | 4/2003 | Azzarito et al. | 710/5 |
| 2005/0111362 A1* | 5/2005 | Freytsis et al. | 370/230 |
| 2007/0005859 A1* | 1/2007 | Diefenbaugh et al. | 710/260 |
| 2007/0083695 A1* | 4/2007 | Aull et al. | 710/310 |
| 2008/0005445 A1* | 1/2008 | Diefenbaugh et al. | 710/313 |
| 2009/0150582 A1* | 6/2009 | Diefenbaugh | 710/100 |
| 2009/0216981 A1* | 8/2009 | Diefenbaugh et al. | 711/163 |
| 2010/0082872 A1* | 4/2010 | Fleming | 710/310 |
| 2010/0169522 A1* | 7/2010 | Fleming | 710/100 |
| 2011/0078344 A1* | 3/2011 | Diefenbaugh | 710/47 |

OTHER PUBLICATIONS

U.S. Appl. No. 13/032,240, filed Feb. 22, 2011.
U.S. Appl. No. 13/035,875, filed Feb. 25, 2011.
COMPAQ et al., "Universal Serial Bus Specification Revision 1.1," Sep. 23, 1998.
COMPAQ et al., "Universal Serial Bus Specification Revision 2.0," Apr. 27, 2000 (In particular, Chapter 11 and section 8.4.2.).
Hewlett-Packard Co. et al., "Universal Serial Bus 3.0 Specification Revision 1.0," Nov. 12, 1998.

* cited by examiner

METHOD AND APPARATUS FOR SCHEDULING TRANSACTIONS IN A HOST-CONTROLLED PACKET-BASED BUS ENVIRONMENT

RELATED APPLICATIONS

This application is a continuation-in-part of and claims priority under 35 U.S.C. §120 from U.S. application Ser. No. 13/032,240, filed Feb. 22, 2011 and U.S. application Ser. No. 13/035,875, filed Feb. 25, 2011, and claims the benefit under 35 U.S.C. §119(e) of U.S. Provisional Patent Application No. 61/369,668, filed Jul. 31, 2010, U.S. Provisional Patent Application No. 61/369,686, filed Jul. 31, 2010, U.S. Provisional Patent Application No. 61/391,027, filed Oct. 7, 2010, and U.S. Provisional Patent Application No. 61/446,913, filed Feb. 25, 2011. U.S. application Ser. No. 13/032,240 is a continuation-in-part of U.S. application Ser. No. 13/015,392, filed Jan. 27, 2011 and claims priority from U.S. Provisional Patent Application No. 61/307,939, filed Feb. 25, 2010, U.S. Provisional Patent Application No. 61/307,929, filed Feb. 25, 2010, U.S. Provisional Patent Application No. 61/369,668, filed Jul. 31, 2010, U.S. Provisional Patent Application No. 61/369,686, filed Jul. 31, 2010, and U.S. Provisional Patent Application No. 61/391,027, filed Oct. 7, 2010. U.S. application Ser. No. 13/035,875 claims priority from U.S. Provisional Patent Application No. 61/307,899, filed Feb. 25, 2010 and U.S. Provisional Patent Application No. 61/307,907, filed Feb. 25, 2010. U.S. application Ser. No. 13/015,392 claims priority from U.S. Provisional Patent Application No. 61/307,939, filed Feb. 25, 2010, U.S. Provisional Patent Application No. 61/307,929, filed Feb. 25, 2010, U.S. Provisional Patent Application No. 61/369,668, filed Jul. 31, 2010, U.S. Provisional Patent Application No. 61/369,686, filed Jul. 31, 2010, and U.S. Provisional Patent Application No. 61/391,027, filed Oct. 7, 2010. Each of the above applications are hereby incorporated by reference in their entireties.

TECHNICAL FIELD

The field of this disclosure relates generally to serial bus data transfer and, in particular, to servicing endpoints in a multi-port multi-speed bus environment.

BACKGROUND

Various interfaces have been designed to facilitate data exchange between a host computer and peripheral devices, such as keyboards, scanners, and printers. One common bus-based interface is the Universal Serial Bus (USB), which is a polled bus in which the attached peripherals share bus bandwidth through a host-scheduled, token-based protocol. The bus allows peripheral devices to be attached, configured, used, and detached while the host and other peripheral devices are operating.

USB transactions are scheduled by host software to communicate with downstream devices that are attached to the host. Periodic transactions, such as isochronous transfers with USB speakers or interrupt transfers with USB keyboards, have strict timing requirements. Thus, periodic transactions need to move across the bus in a timely manner. Non-periodic transactions, such as bulk transfers with USB printers or control transfers for device configuration, do not have strict timing requirements.

The host software traditionally predetermines the dispatch schedule for scheduled periodic traffic. For example, the host software may generate a preordered time domain list, such as an enhanced host controller interface (EHCI) frame list, for periodic traffic. The predetermined dispatch schedule is typically calculated or recalculated if there is a change to the number of periodic data pipelines in the system tree structure, which may interrupt periodic streaming data. Moreover, a preordered time domain list can only effectively direct the scheduling of a single composite speed. For a large number of ports, multiple preordered time domain lists are complex to create, store, and manage.

DETAILED DESCRIPTION

Figure 1:
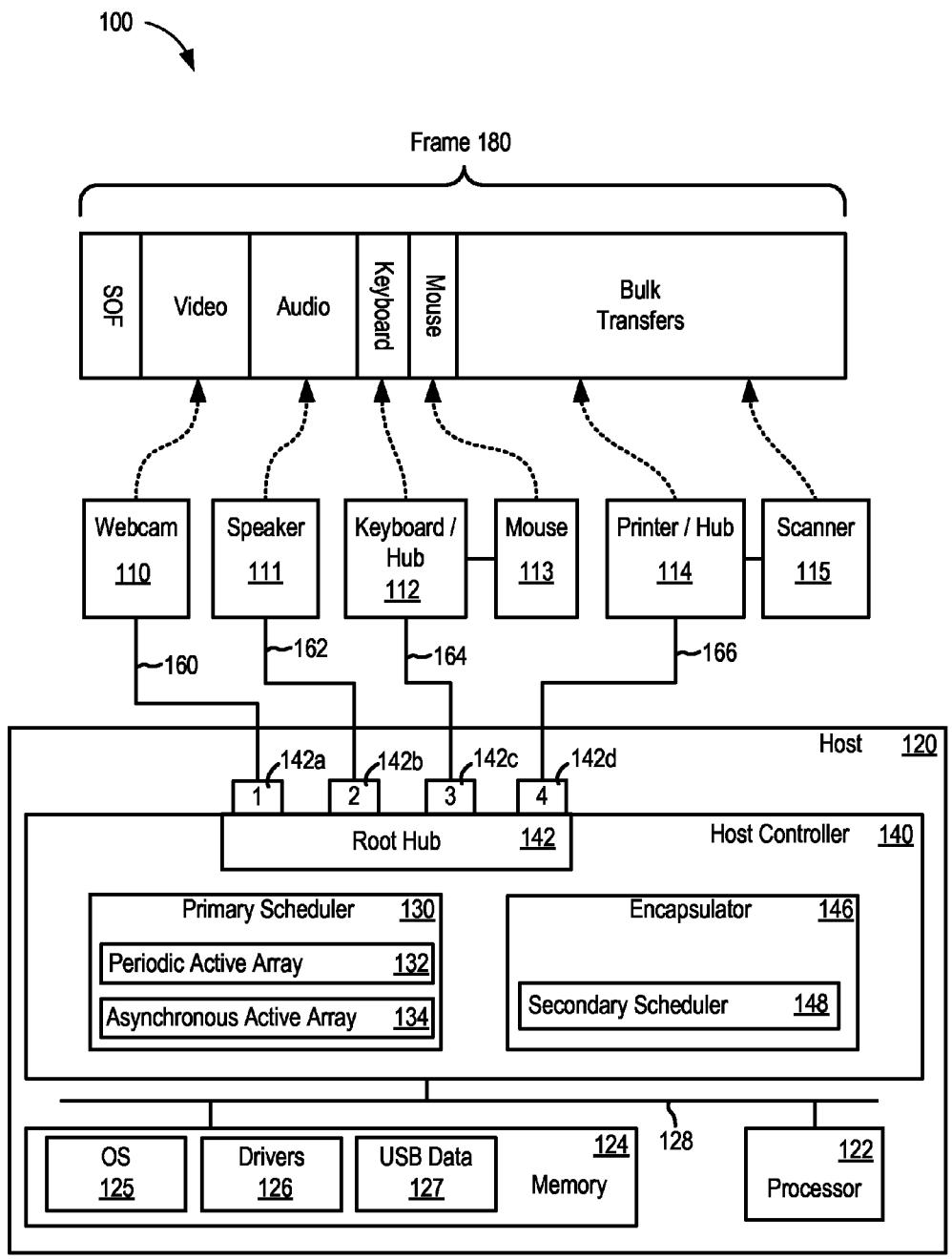
FIG. 1 is a block diagram illustrating a plurality of devices attached to a host, according to one embodiment.

With reference to the above-listed drawings, this section describes particular embodiments and their detailed construction and operation. The embodiments described herein are set forth by way of illustration only and not limitation. Those skilled in the art will recognize in light of the teachings herein that, for example, other embodiments are possible, variations can be made to the example embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

As one skilled in the art will appreciate in light of this disclosure, certain embodiments may be capable of achieving certain advantages, including some or all of the following: (1) avoiding much of the software driver complexity to control periodic packet execution; (2) providing a simpler hardware/software interface to control periodic packet execution; (3) avoiding a software requirement to watch over all active periodic data pipes in order to build the timing map; (4) enabling virtualization for the host operating system(s) by freeing a software driver from having to watch over all active periodic data pipes; (5) by scheduling in real-time there is no predetermined schedule required except to deliver the packet information at the required interval rate, thereby resulting in simpler addition or removal of pipes to the periodic schedule without interrupting to rebuild or rebalance the schedule; (6) providing a logic-based hardware scheduler; (7) providing a logic-based hardware scheduler that helps ensure timely delivery of scheduled data at an endpoint specific service interval; (8) providing a logic-based hardware scheduler that services periodic endpoints first by sort level and then by endpoint number; (9) providing a logic-based hardware scheduler that checks port credits before dispatching a transaction to provide transaction flow control and help manage ports operating at different speeds; (10) providing a logic-based hardware scheduler that delays servicing longer service interval endpoints to subsequent sub-frames if a port does not have sufficient port credits; (11) providing a logic-based hardware scheduler that prioritizes the most frequent service intervals and revisits, after the port credits have freed, partially serviced endpoints having higher priority service intervals that were previously skipped due to insufficient port credits; (12) providing a logic-based hardware scheduler that utilizes a reservation system when servicing non-periodic transactions to help ensure scheduling fairness between endpoints; (13) by implementing a logic-based scheduler that determines dispatch timing of periodic packets in real-time, the driver can be freed from the task of timing map rebalance and transitioning from a first timing map (e.g., timing map A) to a second timing map (e.g., timing map B) during the attachment or removal of a new device to the bus; (14) by implementing a logic-based scheduler that determines dispatch timing of periodic packets in real-time, a timing map can be altered after a device is attached or detached or after a pipe/endpoint is started or stopped, such as starting or closing a video camera application; (15) providing a logic-based scheduler that determines dispatch timing of periodic packets in real-time facilitates rapid purge and recovery upon detection of an error with a downstream data forwarding component; (16) providing a host controller that dynamically determines a schedule (e.g., timing map) facilitates packing transactions close together in each frame to thereby maximize bus-idle time and yield opportunities for improved power savings by, for example, keeping a transceiver powered down for longer periods of time; (17) providing a logic-based hardware scheduler that avoids or minimizes the need to cache or lookup ahead of time a timing map stored in system memory to compensate for a relatively slow access of system memory; and (18) providing a logic-based hardware scheduler that computes a schedule in real-time with relatively low overhead times and avoids all fetches for system memory to read a timing map, which allows the logic-based hardware scheduler to minimize power consumption. These and other advantages of various embodiments will be apparent upon reading this document.

FIG. 1 is a block diagram of an example system 100 in which the transaction scheduling and dispatch methods described herein may be implemented. In the system 100, a plurality of devices 110-115 are attached to a host 120 via buses 160-166. The host controller 140 includes primary and secondary schedulers 130 and 148 to determine when the host controller 140 will move data between the host 120 and a device (e.g., the devices 110-115). The primary scheduler 130 is configured to dispatch transactions at all transaction speeds supported by the host controller 140 (e.g., low-speed, full-speed, high-speed, and super-speed). The secondary scheduler 148 is configured to dispatch split transactions, which facilitate transferring data between the host 120 and a hub at a first communication speed (e.g., high-speed) while data is transferred between the hub and a device at a second communication speed (e.g., low-speed or full-speed). Additional details regarding the secondary scheduler are described in U.S. application Ser. No. 13/032,240, filed Feb. 22, 2011, entitled "Method And Apparatus For Scheduling Transactions In A Multi-Speed Bus Environment," which is hereby incorporated by reference in its entirety. Certain embodiments may omit the secondary scheduler 148.

The primary scheduler 130 includes a periodic active array 132 and an asynchronous active array 134. The periodic active array 132 includes a set of endpoints that are active at a given time and are in need of servicing using periodic transactions, such as isochronous and interrupt transfers. The asynchronous active array 134 includes a set of endpoints that are active at a given time and are in need of servicing using non-periodic transactions, such as control and bulk transfers. As will be described in more detail below, the primary scheduler 130 processes the periodic and asynchronous active arrays 132 and 134 and determines in real-time an order in which to initiate transactions.

According to one embodiment, the primary scheduler 130 services active endpoints in the periodic active array 132 first by sort level (e.g., starting with the most frequent service intervals) and then by endpoint number. Before dispatching a transaction to an active endpoint that meets the sort level criteria, the primary scheduler 130 determines whether a target port has sufficient port credits. If the target port does not have sufficient port credits, the primary scheduler 130 marks that sort level as incomplete and attempts to service active endpoints satisfying a next set of sort level criteria. In response to receiving a trigger that port credits have freed from a blocked port, the primary scheduler 130 revisits the incomplete sort levels and attempts to service endpoints that were previously skipped due to insufficient port credits.

The primary scheduler 130, according to one embodiment, services active endpoints in the asynchronous active array 134 in a round-robin manner and utilizes a reservation system to help ensure scheduling fairness between endpoints. Before dispatching a transaction to an active endpoint in the asynchronous active array 134, the primary scheduler 130 determines whether a target port has sufficient port credits. If the target port does not have sufficient port credits, the primary scheduler 130 attempts to make a reservation for that endpoint so the endpoint has an opportunity to be serviced during a subsequent iteration through the asynchronous active array 134.

The host 120 may be any computing device, such as a general-purpose computer, personal computer, embedded system (e.g., a system that is embedded into a complete device and is designed to perform a few dedicated functions or tasks), or other device (e.g., mobile phone, smartphone, or set-top box). The host 120 performs several functions, such as detecting the attachment and removal of devices (e.g., the devices 110-115), managing control and data flow between the host 120 and the devices, collecting status and activity statistics, and providing power to the attached devices. The host 120 includes a processor 122 connected to a memory 124 and the host controller 140. The connection may be via a bus 128, such as a peripheral component interconnect express (PCIe) bus, an advanced microcontroller bus architecture (AMBA) high-performance bus (AHB), an AMBA advanced extensible interface (AXI), or a CoreConnect bus, or other communication mechanism, such as direct connections of a serial, parallel, or other type.

The processor 122 may be any form of processor and is preferably a digital processor, such as a general-purpose microprocessor or a digital signal processor (DSP), for example. The processor 122 may be readily programmable; hard-wired, such as an application specific integrated circuit (ASIC); or programmable under special circumstances, such as a programmable logic array (PLA) or field programmable gate array (FPGA), for example. Program memory for the processor 122 may be integrated within the processor 122, may be part of the memory 124, or may be an external memory. The processor 122 executes one or more programs to control the operation of the other components, to transfer data between components, to associate data from the various components together (preferably in a suitable data structure), to perform calculations using the data, to otherwise manipulate the data, and to present results to the user. For example, the processor 122 preferably executes software to manage interactions between attached devices and host-based device software, such as device enumeration and configuration, isochronous and asynchronous data transfers, power management, and device and bus management information.

The memory 124 may comprise any suitable machine readable medium, such as random access memory (RAM), read only memory (ROM), flash memory, and EEPROM devices, and may also include magnetic or optical storage devices, such as hard disk drives, CD-ROM drives, and DVD-ROM drives. In certain embodiments, the host controller 140 is a shared memory host controller in which the memory 124 (e.g., RAM) is shared between the host controller 140 and the processor 122. In addition, or alternatively, an interface may be coupled to the bus 128 so that memory 124 or another memory, such as flash memory or a hard disk drive, are accessible locally or accessible remotely via a network.

Operating system (OS) 125 and drivers 126 may be stored in memory 124 or in another memory that is accessible to the host 120. The drivers 126 serve as the interface between the operating system 125 and the various hardware components that are included in the host 120, such as the memory 124 and the host controller 120, and other components that may be included in the host 120, such a display driver, network interface, and input/output controller. For example, for each hardware component included in the host 120, a driver for that component may be stored in memory 124. Data 127 may also be stored in memory 124 or in another memory that is accessible to the host 120. The data 127 may include data awaiting transfer to one of the devices 110-115, such as audio output destined for a speaker 111 or print data destined for a printer 114. The data 127 may also include data received from one of the devices 110-115, such as video data from a webcam 110, user input data from the keyboard 112 or a mouse 113, or image data from a scanner 115.

The host 120 interacts with devices 110-115 through the host controller 140, which functions as an interface to the host 120 and allows for two-way communication with the attached devices. Various devices may be coupled to the host 120 via the host controller 140, such as the webcam 110, speaker 111, keyboard 112, mouse 113, printer 114, and scanner 115. Other devices that may be coupled to the host controller 140 include, for example, cameras, MP3 players, and other input devices such as a pen and tablet and a trackball. Although only one host controller is illustrated in FIG. 1, multiple host controllers may be included in the host 120. In addition, each of the devices 110-115 may serve as a hub for other devices. For example, the keyboard 112 provides hub functionality so that another device, such as the mouse 113, can be coupled to the host 120 via a hub within the keyboard 112. Likewise, the printer 114 provides hub functionality so that another device, such as the scanner 115, can be coupled to the host 120 via a hub within the printer 114. Further, external hubs may be coupled to the host controller 140.

In the embodiment illustrated in FIG. 1, the host controller 140 includes a root hub 142 and an encapsulator 146. The root hub 142 is directly attached to or embedded in the host controller 140 and includes one or more root ports, such as root ports 1-4 (which are labeled 142a-142d in FIG. 1). The root hub 142 provides much of the same functionality as an externally connected hub but the root hub 142 is integrated within the host 120 and the hardware and software interface between the root hub 142 and the host controller 140 is defined by the specific hardware implementation. A set of host controller state machines manage the attachment and removal of devices to the system 100 and manage the traversal of data between the host 120 and attached devices.

According to one embodiment, the encapsulator 146 is configured to generate split transactions, which are special transactions that are generated and scheduled by the host 120 to facilitate speed shifts between buses operating at different communication speeds or data transfer rates, such as when the host 120 communicates with low-speed and full-speed devices that are attached to downstream high-speed hubs. The encapsulator 146 builds fields around a normal packet (e.g., an IN or OUT token packet) and collects information used to execute the normal packets. The information collected by the encapsulator 146 includes the state of transaction translators within hubs that are in communication with the host 120. The encapsulator 146 may include an identifier memory and a plurality of state fields that are configured to store state information concerning various transaction translators, such as the number of outstanding transactions, bytes-in-progress to downstream transaction translators, the maximum packet size of a data payload to be moved, and the direction of the data movement. The state information tracked using the identifier memory and the plurality of state fields is used by the primary and secondary schedulers 130 and 148 to dispatch packets from the host 120 to downstream transaction translators (e.g., to help avoid buffer overflows and buffer underflows at the transaction buffers within the transaction translators), additional details of which are described in described in U.S. application Ser. No. 13/032,240. Certain embodiments may omit the encapsulator 146.

The host controller 140 may be implemented in any combination of hardware, firmware, or software. According to a preferred embodiment, the host controller 140 implements a USB protocol, such as one or more of USB 1.0 described in Universal Serial Bus Specification Revision 1.1, dated September 1998, USB 2.0 described in Universal Serial Bus Specification Revision 2.0, dated Apr. 27, 2000, and USB 3.0 described in Universal Serial Bus 3.0 Specification Revision 1.0, dated Nov. 12, 2008, all of which are available from USB Implementers Forum, Inc. at http://www.usb.org/developers/docs/ and are hereby incorporated by reference in their entireties. According to other embodiments, the host controller 140 implements other protocols, such as a future USB version or another protocol that imposes a tiered ordering on a star topology to create a tree-like configuration.

Hosts according to other embodiments may have less than all of the components illustrated in FIG. 1, may contain other components, or both. For example, the host 120 may include a number of other components that interface with one another via the bus 128, including a display controller and display device, an input controller, and a network interface. The display controller and display device may be provided to present data, menus, and prompts, and otherwise communicate with a user via one or more display devices. The network interface may be provided to communicate with one or more hosts or other devices. The network interface may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet). A wireless connection may use low or high powered electromagnetic waves to transmit data using any wireless protocol, such as Bluetooth™, IEEE 802.11b/g/n (or other WiFi standards), infrared data association (IrDa), and radiofrequency identification (RFID).

In the example configuration illustrated in FIG. 1, the buses 160-166 operate at various communication speeds. For example, the buses 160 and 166 may operate at a communication speed that corresponds to a USB super-speed data transfer rate of approximately 5 gigabits per second, the bus 162 may operate at a communication speed that corresponds to a USB high-speed data transfer rate of approximately 480 megabits per second, and the bus 164 may operate at a communication speed that corresponds to one of a USB low-speed data transfer rate of approximately 1.5 megabits per second or a USB full-speed data transfer rate of approximately 12 megabits per second. However, the buses 160-166 may operate at communication speeds corresponding to other data transfer rates. For example, any of the buses 160-166 may operate at a communication speed corresponding to one of a USB super-speed, high-speed, full-speed, or low-speed data transfer rate.

The devices (e.g., devices 110-115) in communication with the host 120 share bus bandwidth. FIG. 1 illustrates a frame 180 depicting a variety of potential transactions that could be performed during a single frame (e.g., a one millisecond frame or a microframe interval, such as a 125 microsecond interval). The frame 180 illustrated in FIG. 1 is a contrived example to illustrate the shared nature of a frame. Not every device 110-115 will necessarily transfer data during each frame. For example, host software might poll the keyboard 112 every nth frame to check for keystrokes. Some devices require bandwidth every frame (e.g., isochronous transactions for speaker 111) while other devices transfer large blocks of data that do not have strict timing requirements (e.g., asynchronous transfers for the printer 114). When an application requires large amounts of bandwidth every frame, little bandwidth may be left for bulk transfers (e.g., for the printer 114 or scanner 115), which may, for example, slow or even stop the transfer of data to the printer 114.

Figure 2:
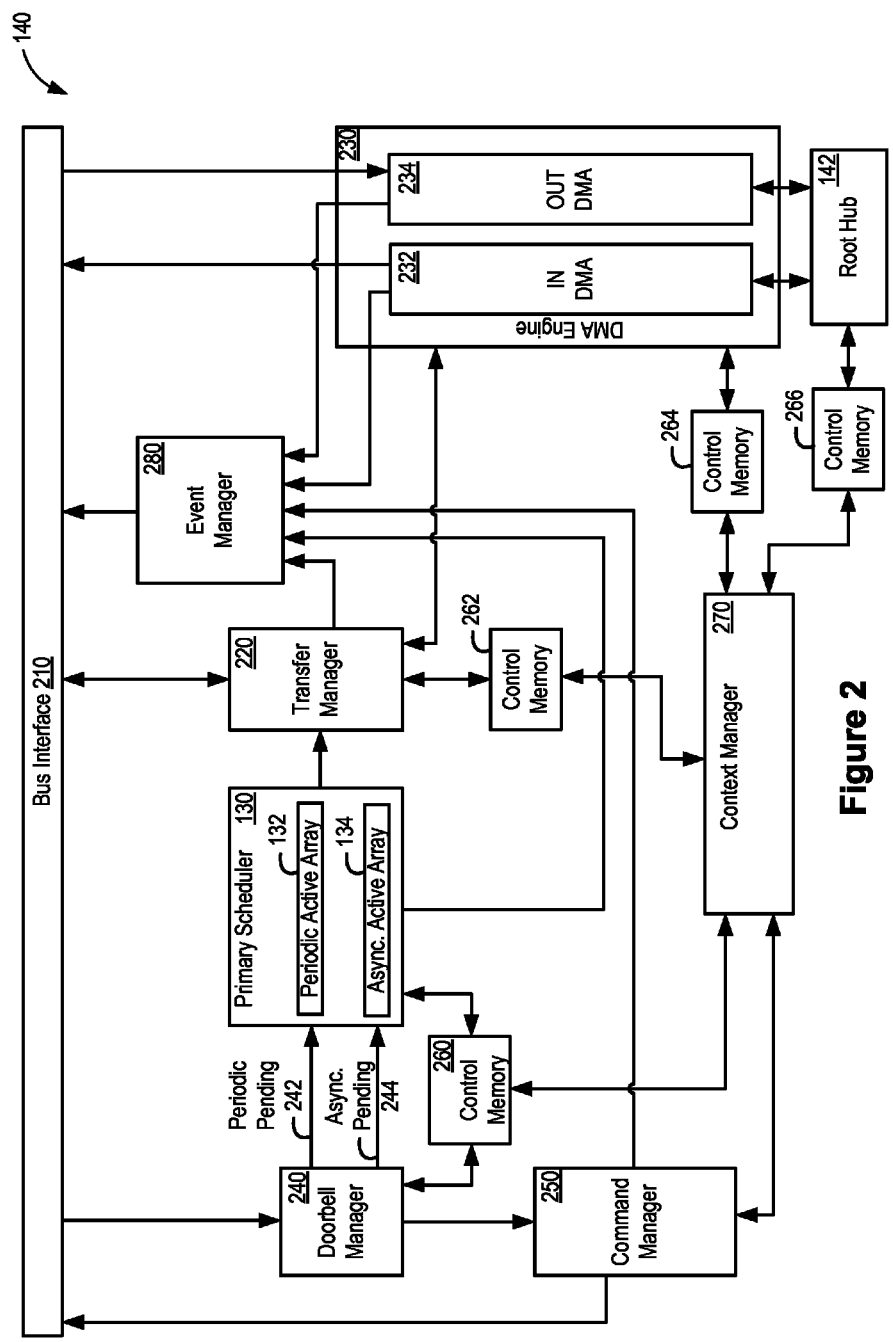
FIG. 2 is block diagram illustrating the interaction between various components within the host controller of FIG. 1 that facilitate scheduling and dispatching transactions to downstream devices, according to one embodiment.

FIG. 2 is block diagram illustrating the interaction between various components within the host controller 140 that facilitate scheduling and dispatching transactions to downstream devices, according to one embodiment. The host controller 140 includes a bus interface 210 configured to communicatively couple other components of the host 120 (FIG. 1), such as the processor 122 and the memory 124, to the host controller 140 via the bus 128. According to one embodiment, the bus interface 210 is configured to communicate over the bus 128 using the PCIe protocol. The host controller 140 includes a plurality of functional modules, such as a transfer manager 220, the primary scheduler 130, and a DMA engine 230, that are configured to work together in a coordinated manner to effect transfer of data between the host 120 (FIG. 1) and one or more devices (e.g., devices 110-115 in FIG. 1). According to one embodiment, the transfer manager 220 is configured to determine what data (e.g., control data and/or payload data) should be transferred, the primary scheduler 130 is configured to determine the actions preformed by the transfer manager 220, and the DMA engine 230 is configured to transfer data payloads between the bus interface 210 and the root hub 142. The root hub 142 is configured to communicate with one or more device endpoints over a packet-based bus.

According to one embodiment, the host controller 140 includes a plurality of control memories 260, 262, 264, and 266, each of which is associated with one or more of the functional modules. In particular, the control memory 260 is associated with the primary scheduler 130 and a doorbell manager 240, the control memory 262 is associated with the transfer manager 220, the control memory 264 is associated with the DMA engine 230, and the control memory 266 is associated with the root hub 142. The control memories 260-266 store state and/or data information fields that the associated functional module(s) access. The control memories 260-266 are physically distinct within the host controller 140 and independently accessible from one another. In other words, each of the control memories 260-266 occupy a physically separate memory segment within the host controller 140. Certain embodiments may omit one or more of the control memories 260, 262, 264, and 266.

As illustrated in FIG. 2, some of the control memories are shared between two functional modules while other control memories are unshared. For example, the control memory 260 is shared between the primary scheduler 130 and the doorbell manager 240 and the control memory 264 is shared between the IN DMA 232 and the OUT DMA 234. In contrast, the control memory 262 associated with the transfer manager 220 is configured to allow the transfer manager 220 to access the control memory 262 without contention from the other functional modules and the control memory 266 associated with the root hub 142 is configured to store all the fields used by the root hub 142 so that the root hub 142 can access the control memory 266 without contention from other functional modules. Individually accessible control memories require more physical space inside host controller 140 than shared control memories; however, individually accessible control memories can provide faster access times for functional modules requiring fast or frequent access to associated control memory data. To reduce the memory footprint of the host controller 140, functional modules that do not require fast or frequent access may share a control memory.

When host software detects and enumerates a new endpoint, a command manager 250 initializes the control memories 260-266 with profile data associated with the new endpoint. A context manager 270 may be provided to allow the command manager 250 to read, modify, and write data within the control memories 260-266. The context manager 270 may also arbitrate access to the control memories 260-266 between the various functional modules (e.g., the transfer manager 220, the primary scheduler 130, and the DMA engine 230). The context manager 270 may also lock the control memories 260-266 in some situations, such as during an endpoint shutdown where a write must be performed in multiple control memories without interference. An event manager 280 may be provided to log various events from the functional modules, including posting events, such as successful transaction completion and transaction errors (e.g., missed service intervals) to an event ring accessible by system software, such as the drivers 126 or the OS 125 (FIG. 1). The context manager 270 and event manager 280 may be omitted in certain embodiments.

A doorbell manager 240 preferably has read and write access to the control memory 260. For example, if the doorbell manager 240 receives an indication to start a particular endpoint and that endpoint is in a stopped state, the doorbell manager 240 updates the state information associated with that endpoint in the control memory 260. By way of another example, after receiving a slot number (e.g., device ID) and endpoint number when a new transfer is initiated, the doorbell manager 240 accesses the control memory 260 to determine the endpoint type (e.g., interrupt, isochronous, bulk, or control) so that the doorbell manager 240 can notify the primary scheduler 130 whether the new transfer is a periodic or asynchronous transfer. The doorbell manager 240 may be omitted in certain embodiments.

The primary scheduler 130 has read only access to the control memory 260, according to one embodiment. For each endpoint that the primary scheduler 130 is attempting to service, the primary scheduler 130 pulls context information from the control memory 260. The context information may be slot specific (e.g., device specific) and endpoint specific. For example, the endpoint specific context information may include one or more of endpoint type (e.g., a two-bit value specifying the endpoint type, such as interrupt, isochronous, bulk, or control), endpoint direction (e.g., the direction of data transfer, such as an IN transfer to the host 120 or an OUT transfer to a device), endpoint state (e.g., a three-bit value specifying whether a doorbell has been rung and whether the endpoint has been halted or stopped), service interval for periodic transfers (e.g., a period of time between consecutive requests to an endpoint to send or receive data), and an indication of whether the transaction involves a split transaction. Slot specific context information may include one or more of a root hub number (e.g., a value specifying the root hub port number to which the device is connected), speed (e.g., the device speed, such as full-speed, low-speed, high-speed, or super-speed), and device address (e.g., a value representing the address of the device on the bus). According to other embodiments, the primary scheduler 130 has read and write access to the control memory 260.

The transfer manager 220, according to one embodiment, does not have access to the control memory 260. Thus, when the primary scheduler 130 makes a request to initiate a transfer, the primary scheduler 130 may also send to the transfer manager 220 information from the control memory 260 that the transfer manager 220 uses to execute the transaction. For example, the primary scheduler 130 may send to the transfer manager 220 the endpoint type, root hub port number, speed, slot ID or device address, maximum packet size, and packet burst and multiplier.

Referring now to FIGS. 1 and 2, to initiate data transfers to or from a target device (e.g., devices 110-115), system software, such as the drivers 126 or the OS 125, issues transaction requests to the host controller 140 via the bus 128. For example, a USB keyboard driver may issue a transaction request that indicates how often the keyboard should be polled to determine if a user has pressed a key and supplies the location of a memory buffer into which data from the keyboard is stored. According to one embodiment, the host software issues a transaction request by generating or setting up a linked list or ring of data structures in system memory (e.g., the memory 124). To conserve the host memory 124, the host software driver may store the transaction data in discrete segments located in a circularly linked list, or transfer ring. The transfer ring of data structures may include one or more transfer request blocks (TRBs). Individual transfer request blocks may include one or more fields specifying, for example, the device address, the type of transaction (e.g., read or write), the transfer size, the speed at which the transaction should be sent, and the location in memory of the data buffer (e.g., where data from the device should be written or where data destined for the device can be read from).

After the host memory 124 is set up (e.g., with TRBs), the host software notifies the doorbell manager 240 by writing data to a doorbell register. For example, the host software may write to a specific register address using the slave or target half of the bus 128 (e.g., memory mapped I/O). The write generates a strobe to the doorbell manager 240 along with a data field of the write that is formatted to include slot and endpoint information, which in turn may be used by the doorbell manager 240 to set an appropriate bit in a doorbell set array within the doorbell manager 240. After receiving a notification that an endpoint needs servicing, the doorbell manager 240 alerts the primary scheduler 130 that an endpoint needs servicing. For example, the doorbell manager 240 may generate a periodic pending level indication 242 or an asynchronous pending level indication 244, which is translated into an active endpoint in one of the periodic or asynchronous active arrays 132 or 134. The primary scheduler 130 processes the active endpoints in the active arrays 132 or 134 and determines an order in which to service the active endpoints. Additional details regarding the operation of the primary scheduler 130 are discussed in more detail below.

After determining that a particular endpoint should be serviced, the primary scheduler 130 sends a request to the transfer manager 220 to service the scheduled endpoint task. The primary scheduler 130 may also send to the transfer manager 220 information about the endpoint that the transfer manager 220 uses to execute the transaction.

The transfer manager 220 facilitates concurrent processing of multiple threads, i.e., multiple endpoint transaction pipelines. For each service opportunity, the transfer manager 220 determines how much of a scheduled transaction to execute. Based on the scheduled transaction request and the available resources, the transfer manager 220 determines how many bytes in the TRB linked list the DMA engine 230 should move. For example, although the host software driver may request a transaction that is over one megabyte in size, the DMA engine 230 may be constrained by available resources and capable of moving only some portion of the total transaction. The transfer manager 220 calculates the portion of the transaction request to move, interfaces with the host software driver to apportion the transaction, and provides the DMA engine 230 with the location and offset of the apportioned transaction. The transfer manager 220 processes the remaining portion of the transaction request by sequencing through the ring of TRBs and executing the individual TRBs by handing them off to DMA engine 230. Additional details regarding the transfer manager are described in U.S. application Ser. No. 13/035,875, filed Feb. 25, 2011, entitled "Multi-Port Context-Based Host Controller," which is hereby incorporated by reference in its entirety.

The DMA engine 230 pairs up individual transfer request blocks with any necessary data movement and passes the transaction identified by the transfer request block and any associated data to the root hub 142. According to the embodiment illustrated in FIG. 2, the DMA engine 230 comprises an inbound DMA engine (IN DMA) 232 for inbound data transfers and an outbound DMA engine (OUT DMA) 234 for outbound data transfers.

According to one embodiment, the transfer manager 220 also tracks port credits and provides the primary scheduler 130 with an indication of how many packets are in or on their way to the port buffers. The transfer manager 220 may also provide feedback to the primary scheduler 130 that a request was not serviced or only partially serviced if, for example, transfer manager 220 could not service the scheduled endpoint task or did not finish servicing the request (e.g., if the primary scheduler requests sixteen packets to be moved and only four were moved before the port ran out of credits).

Figure 3:
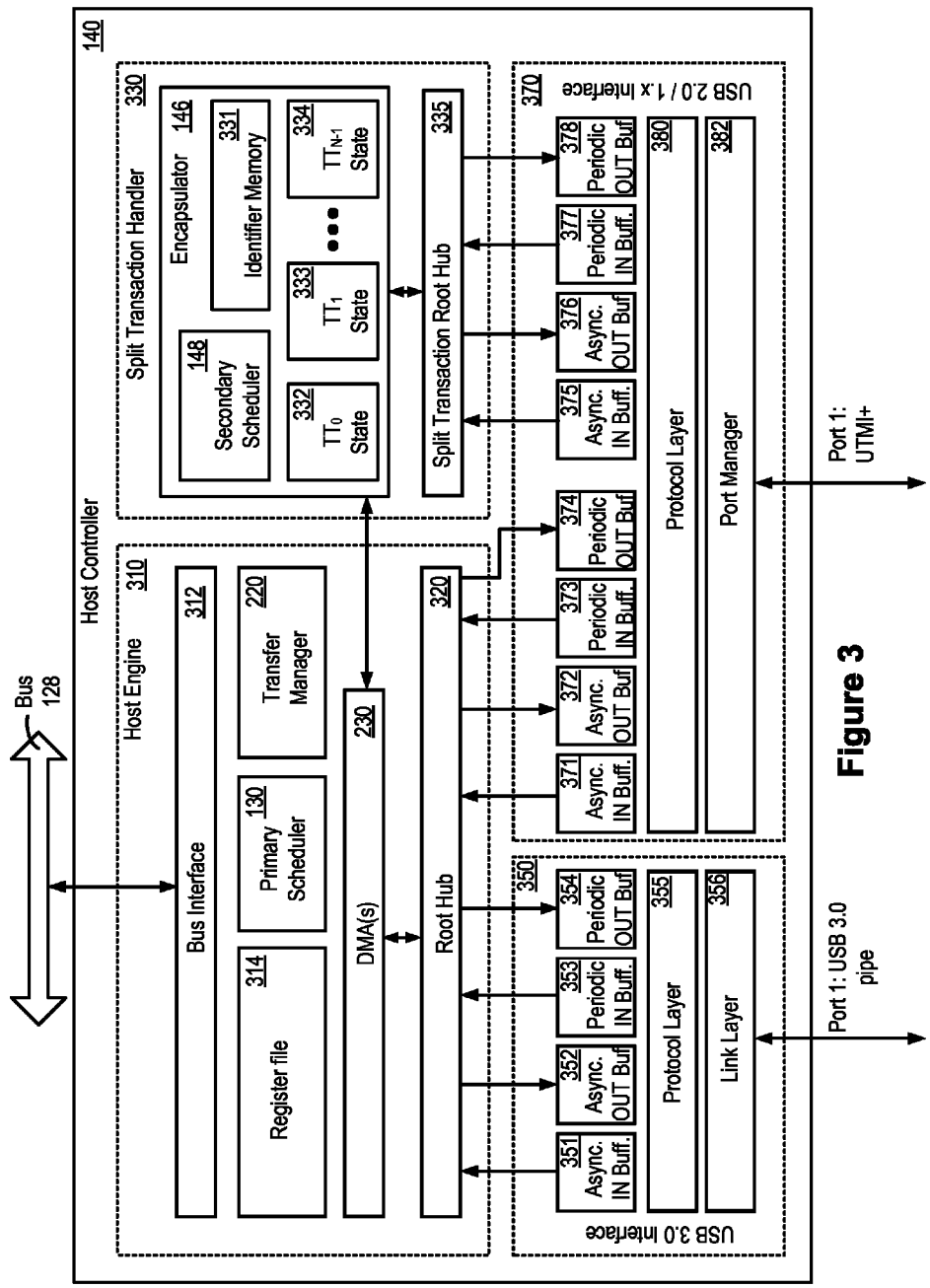
FIG. 3 is a block diagram illustrating additional details of the host controller of FIG. 1, according to one embodiment.

FIG. 3 is a block diagram illustrating additional details of the host controller 140 of FIG. 1, according to one embodiment. The host controller 140 illustrated in FIG. 3 implements the USB 2.0 and USB 3.0 protocols using a host engine 310, a split transaction handler 330, a USB 3.0 interface 350, and a USB 2.0 and 1.x interface 370. Host controllers according to other embodiments may include fewer than all of the components illustrated in FIG. 3, may include other components, or both. In addition, host controllers according to other embodiments may implement any combination of the USB 1.0, USB 2.0, and USB 3.0 protocols or other protocols, such as a future USB version.

The host engine 310 includes a bus interface 312 configured to communicatively couple other components of the host 120 (FIG. 1), such as the processor 122 and the memory 124, to the host controller 140 via the bus 128. According to one embodiment, the bus interface 312 is configured to communicate over the bus 128 using the PCIe protocol. To initiate data transfers to or from a target device (e.g., devices 110-115 in FIG. 1), system software, such as the drivers 126 (e.g., USB device drivers or client drivers) or the OS 125 (FIG. 1), issues transaction requests to the host engine 310 via the bus 128. For example, a USB keyboard driver may issue a transaction request that indicates how often the keyboard should be polled to determine if a user has pressed a key and supplies the location of a memory buffer into which data from the keyboard is stored. According to one embodiment, the system software issues a transaction request by generating or setting up a linked list or ring of data structures in system memory (e.g., the memory 124 in FIG. 1) and writing data to a doorbell register in a register file 314, which alerts the primary scheduler 130 that an endpoint needs servicing. The register file 314 also stores data used to control the operation of the host controller 140, data regarding the state of the various ports associated with interfaces 350 and 370, and data used to connect and establish a link at the port level.

After the doorbell has been rung (i.e., after the data has been written to the doorbell register), the primary scheduler 130 and the transfer manager 220 (e.g., a transfer ring manager or list processor) work together to move data between the host and the device. The primary scheduler 130 determines when the host controller 140 will move data between the host and the device and the transfer manager 220 determines what data will be transferred based the information included in the transaction request. The transfer manager 220 may also determine where the data to be transferred is stored, whether the data should be transferred via the USB 3.0 interface 950 or the USB 2.0/1.x interface 370, the speed at which the data should be transferred (e.g., low-speed, full-speed, high-speed, or super-speed), and whether the transaction includes a split transaction. The primary scheduler 130 may also pass that information to the transfer manager 220. After the primary scheduler 130 determines when the data will be moved, the primary scheduler sends a request to the transfer manager 220 to service the endpoint.

The transfer manager 220 processes the transaction request by walking through the ring of transfer request blocks and executing the individual transfer request blocks by handing them off to the direct memory access (DMA) engine(s) 230. The DMA engine 230 pairs up the individual transfer request blocks with any necessary data movement and passes the transaction identified by the transfer request block and any associated data to a root hub 320. The root hub 320 routes the transaction and any associated data to an appropriate buffer 351-354 or 371-378 for an appropriate port (e.g., port 1-4) depending on which port the device is connected, whether the transaction is a USB 1.x, 2.0, or 3.0 transaction, and whether the transaction is a periodic or asynchronous transfer. For example, if the device to which the transaction relates is connected to port 1 and the transaction involves a high-speed asynchronous IN transaction, the IN token or header may be routed by the root hub 320 into a header buffer and a data payload returned from the device is routed into the asynchronous IN buffer 371. A protocol layer 380 and port manager 382 may pull the transaction from the header buffer at the appropriate time for transmission over the downstream bus. After the device responds (e.g., with image data from a scanner or user input data from a keyboard, for example), the response moves back through the host controller 140 in the reverse direction along a similar path. For example, the response moves from the port manager 382 up through the protocol layer 380, into the asynchronous IN buffer 371, and eventually onto the bus 128 via the root hub 320, the DMA engine 230, the transfer manager 220, and the bus interface 312. After the transfer manager 220 receives the response, the transfer manager 220 inspects the results and handles any actions specified in the transaction ring, such as asserting an interrupt.

While the host controller 140 only illustrates a single port (port 1) in the USB 3.0 interface 350 and a single port (port 1) in the USB 2.0/1.x interface 370, the interfaces 350 and 370 include multiple ports (e.g., ports 1-N). Each port of the USB 3.0 interface 350 may include asynchronous IN and OUT buffers 351 and 352 and periodic IN and OUT buffers 353 and 354 (e.g., FIFO buffers) to store transactions and any associated data. According to one embodiment, the buffers 351-354 are each sized to accommodate four data packets (e.g., four packets at 1024 bytes each). Each of the buffers 351-354 may have associated therewith header buffers to store token packets associated with the data packets. Each port of the USB 3.0 interface 350 also includes a protocol layer 355 and a link layer 356 to implement the USB 3.0 protocol.

Each port of the USB 2.0/1.x interface 370 may include asynchronous IN and OUT buffers 371 and 372 and periodic IN and OUT buffers 373 and 374 (e.g., FIFO buffers) for non-split transactions and asynchronous IN and OUT buffers 375 and 376 and periodic IN and OUT buffers 377 and 378 (e.g., FIFO buffers) for split transactions. According to one embodiment, the asynchronous IN and OUT buffers 371, 372, 375, and 376 are each sized to accommodate two data packets (e.g., two packet buffers at 512 bytes each) and the periodic IN and OUT buffers 373, 374, 377, and 378 are each sized to accommodate three data packets (e.g., three packet buffers at 1024 bytes each). Because USB 2.0 is a half duplex, certain embodiments may combine buffers 371 and 372 into one buffer, buffers 373 and 374 into one buffer, buffers 375 and 376 into one buffer, and buffers 377 and 378 into one buffer. Each of the buffers 371-378 may have associated therewith header buffers to store token packets associated with the data packets. Each port of the USB 2.0/1.x interface 370 may also include the protocol layer 380 and port manager 382 to implement the USB 2.0 and USB 1.0 protocols.

As will be described in more detail with respect to FIG. 8, the transfer manager 220 is configured to monitor the number of data packets stored in or in progress to one or more of the buffers 351-354, 371-374, and 375-378. For example, the transfer manager 220 may include a transaction counter associated with each of the buffers 351-354, 371-374, and 375-378. In other words, the transaction counters mirror the state of what is stored (or will be stored) in the buffers 351-354, 371-374, and 375-378. After the primary scheduler 130 issues a transaction request to the transfer manager 220 and the transfer manager 220 issues the transaction, the transaction counter associated with the transaction is incremented. After a response to an executed transaction is received (e.g., a handshake packet), the transaction counter associated with the transaction is decremented.

Split transactions take a different path through the host controller 140. After the system software sets up the transfer request block rings and rings the doorbell, the primary scheduler 130 initiates a transaction request by sending a request to the transfer manager 220 to service the endpoint. If the transfer manager 220 determines that the transaction request involves a split transaction destined for a full-speed or low-speed device attached to a hub operating at high-speed, the transfer manager 220 executes the split transaction by generating a split packet request (e.g., from state and/or data information fields stored in the control memory 262 or FIG. 2) and handing the split packet request off to the DMA engine 230, which pairs the split packet request up with the necessary data movement and passes the split packet request and any associated data to the encapsulator 146. The split packet request generated by the transfer manager 220 generally includes more data information fields (e.g., that are pulled from the control memory) than the transfer request block.

After the encapsulator 146 receives the split packet request and any associated data, a lookup is performed in an identifier memory 331 to determine whether the identifier memory 331 includes an entry for a downstream transaction translator to which the split transaction is addressed. If the identifier memory 331 includes an entry corresponding to the downstream transaction translator that will receive the split transaction, the secondary scheduler 148 may check the state of that transaction translator as reflected in the state fields 332-334, for example, so that the secondary scheduler 148 can determine in which microframe to send the split transaction to the downstream transaction translator. After the secondary scheduler 148 determines that it is time to send the split transaction, the encapsulator 146 passes the split packet request and any associated data to a split transaction root hub 335. The root hub 335 routes the split packet request and any associated data to an appropriate buffer 375-378 for an appropriate port (e.g., port 1-4) depending on which port the downstream hub that includes the targeted transaction translator is connected and whether the split transaction is a periodic or asynchronous split transaction. The protocol layer 380 and port manager 382 generate and/or pull the necessary packets from the data stored in an appropriate buffer 375-378 for transmission to the hub over the downstream bus at the appropriate time.

As illustrated in FIG. 3, the host controller 140 according to one embodiment includes the primary scheduler 130 and the secondary scheduler 148. When a split transaction is destined for a full-speed or low-speed device attached to a high-speed hub, transactions traverse the bus between the hub and device at a full-speed or low-speed data rate during one millisecond intervals. Thus, the hub sends scheduled or periodic packets either every one millisecond or some power-of-two multiplier of every one millisecond. The primary scheduler 130 is configured to determine what millisecond interval a split transaction should be executed by a downstream hub and posts the split transaction to the secondary scheduler 148 preceding the target one-millisecond frame. Between the host controller 140 and the high-speed hub, the framing is 125 microseconds (e.g., the frame rate on the high-speed bus is eight times faster than the frame rate on the low-speed or full-speed bus), according to one embodiment. The secondary scheduler 148 is configured to break a split transaction (which may take one millisecond to execute) into multiple sub-packets and determine which 125 microsecond frames to transmit those sub-packets.

Data stored in the transaction translator state fields 332-334 helps ensure that the targeted downstream transaction translator does not overflow or underflow. According to a preferred embodiment, the data stored in the transaction translator state fields 332-334 includes a value or count reflecting the number of bytes-in-progress to a particular transaction translator. The count is used by the secondary scheduler 148 to throttle the rate at which start-split transactions are dispatched in real time, which helps prevent overflow of the buffers within the downstream transaction translators. In addition, one or more transaction lists may be stored in the transaction translator state fields 332-334. The one or more transaction lists are generated by the primary scheduler 130 and sent to the secondary scheduler 148, which executes transactions from a transaction list during an appropriate millisecond frame interval. The encapsulator 146, the secondary scheduler 148, the identifier memory 331, the state fields 332-334, the split transaction root hub 335, and the buffers 375-378 may be omitted in certain embodiments. In other words, certain embodiments of the host controller 140 may not support split transactions.

Figure 4:
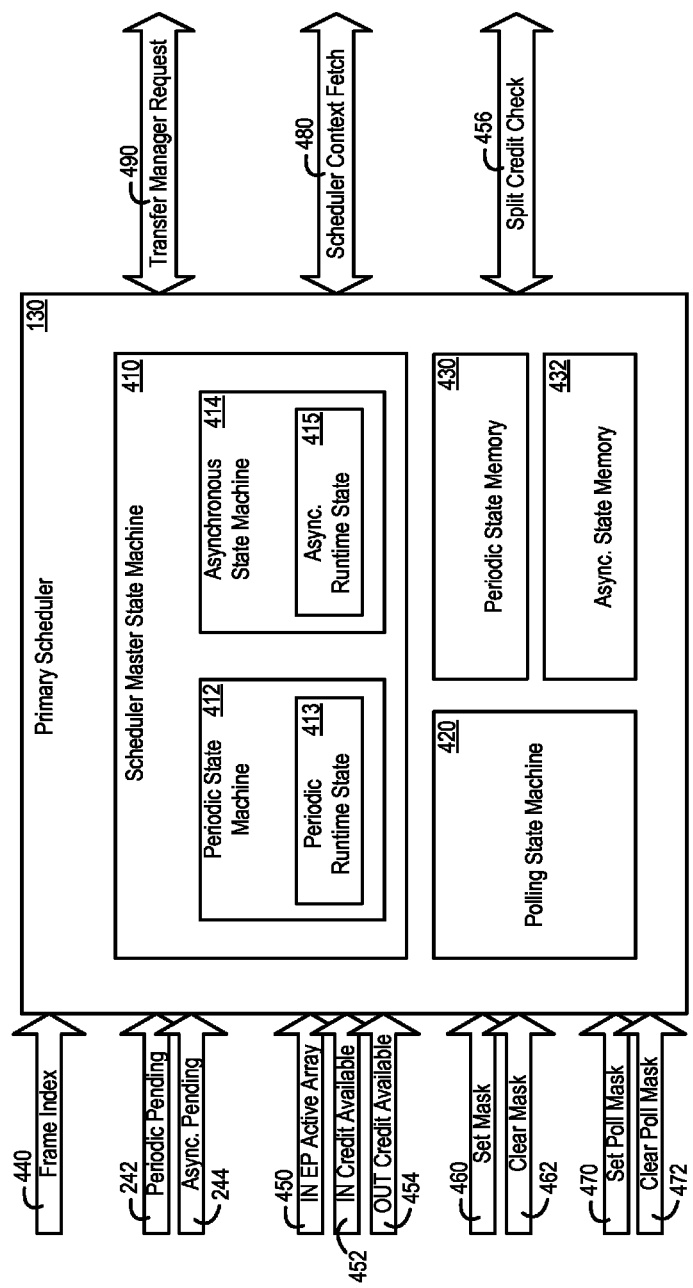
FIG. 4 is a block diagram illustrating additional details of the primary scheduler of FIG. 1, according to one embodiment.

FIG. 4 is a block diagram illustrating additional details of the primary scheduler 130 of FIG. 1, according to one embodiment. The primary scheduler 130 illustrated in FIG. 4 includes a scheduler master state machine or engine 410, which includes a periodic state machine or engine 412 that is configured to schedule periodic transactions and an asynchronous state machine or engine 414 that is configured to schedule asynchronous transactions. The scheduler master state machine 410 remains in an idle state until there are periodic or asynchronous transactions to schedule. For example, if there are any periodic transactions pending and a new service interval begins (e.g., at a sub-frame or microframe boundary), the periodic state machine 412 processes and attempts to dispatch the pending periodic transactions. By way of another example, if the periodic state machine 412 previously skipped a sort level due to insufficient port credits and the primary scheduler 130 receives a trigger that port credits have freed from the blocked port, the periodic state machine 412 rewinds to the skipped sort level and attempts to service endpoints that were previously passed over. Additional details regarding the operation of the periodic state machine or controller 412 are described with reference to FIGS. 5A, 6A, 7, 8, 9A, and 9B. In a similar vein, if there are any asynchronous transactions pending and there are no periodic transactions pending (or there are periodic transactions pending with blocked ports), the asynchronous state machine 414 processes and attempts to dispatch the pending asynchronous transactions. Additional details regarding the operation of the asynchronous state machine or controller 414 are described with reference to FIGS. 5B, 6B, 8, 11, and 12A-12C. The scheduler master state machine or controller 410 also coordinates the interaction between the periodic and asynchronous state machines 412 and 414, which is described with reference to FIG. 14.

According to one embodiment, the periodic state machine 412 includes a periodic runtime state 413 to temporarily store one or more periodic pending flags. For example, at the start of a new service interval, the periodic state machine 412 may examine all active endpoints and set pending flags to indicate which ports have periodic transactions pending. Similarly, at the start of a new service interval, the periodic state machine 412 may examine all active endpoints and set pending flags to indicate which sort levels have periodic transactions pending so the periodic state machine 412 does not need to re-inspect the sort levels that have no periodic transactions pending (at least until the start of another new service interval). According to one embodiment, the asynchronous state machine 414 includes an asynchronous runtime state 415 to temporarily store one or more reservations. For example, as will be described in more detail below, the asynchronous state machine 414 may make a reservation for an endpoint if the port associated with that endpoint does not have sufficient port credits so that the endpoint has an opportunity to be serviced during a subsequent iteration through the asynchronous active array 134 (FIG. 1). The periodic and asynchronous runtime states 413 and 415 may be implemented in any suitable machine readable medium, such as registers (flip-flops or latches), RAM, flash memory, and EEPROM.

The primary scheduler 130 also includes a polling state machine or engine 420 that is configured to attempt to dispatch asynchronous transactions at a slower pace than the asynchronous state machine 414. For example, if the asynchronous state machine 414 attempts to execute an asynchronous transaction and the endpoint returns a negative acknowledgement (e.g., a NAK packet), the polling state machine 420 retries servicing that endpoint at a slower rate.

Figure 5A:
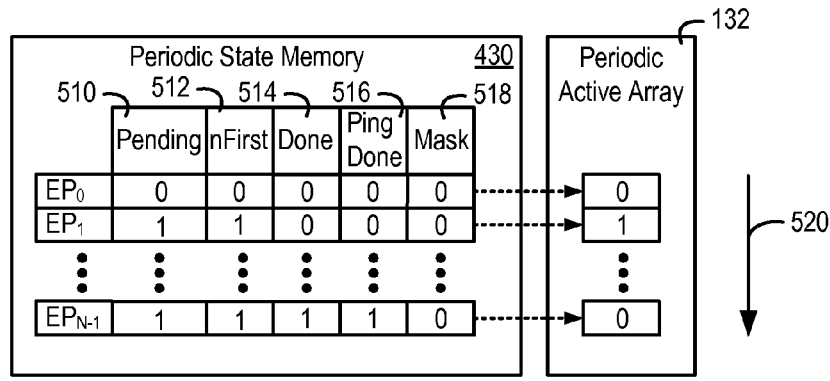
FIGS. 5A and 5B are block diagrams illustrating additional details of the periodic and asynchronous state memories of the primary scheduler of FIG. 4, according to various embodiments.
Figure 5B:
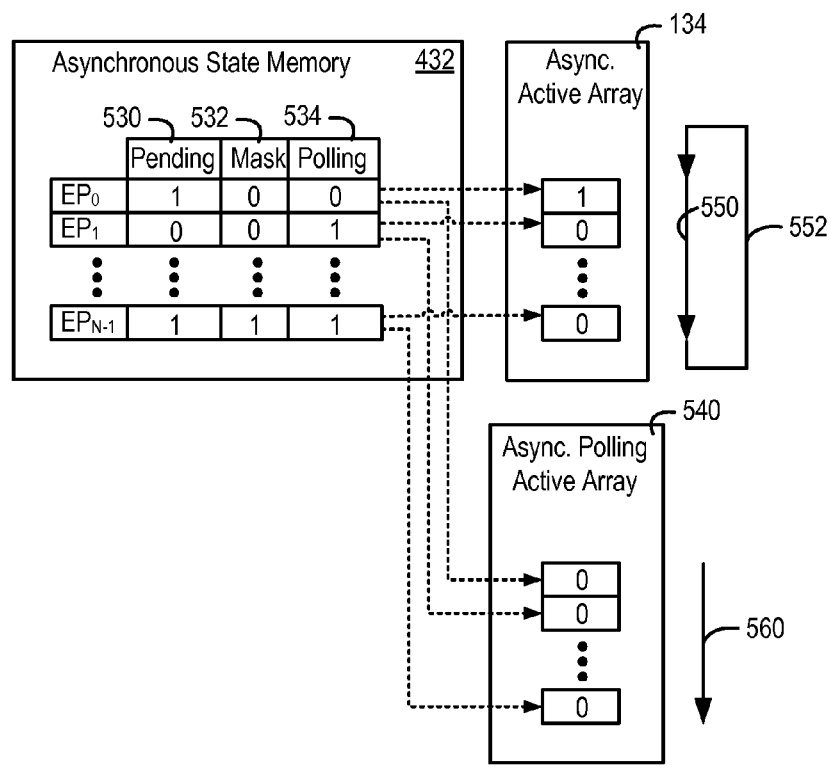

According to one embodiment, the primary scheduler 130 includes a periodic state memory 430 that is configured to store state information associated with the periodic endpoints attached the host controller 140 (FIGS. 1-3), such as an indication of which endpoints are ready to be serviced and which endpoints have already been serviced in a service interval. The state fields included in a periodic state memory 430 according to one embodiment are illustrated in FIG. 5A. In a similar vein, the primary scheduler 130 includes an asynchronous state memory 432 that is configured to store state information associated with the asynchronous endpoints attached the host controller 140 (FIGS. 1-3), such as an indication of which endpoints are ready to be serviced and which endpoints should be serviced by the polling state machine 420. The state fields included in an asynchronous state memory 432 according to one embodiment are illustrated in FIG. 5B.

The primary scheduler 130 includes a number of inputs to facilitate the operation of the state machines 410, 412, 414, and 420. One input is the frame index 440, which provides a sub-frame or microframe count from a sub-frame counter so that the state machines can perform tasks during appropriate sub-frame intervals (e.g., so that the periodic state machine 412 can determine the beginning and end of a service interval). The primary scheduler 130 also receives the periodic and asynchronous pending level indications 242 and 244 from the doorbell manager 240 (FIG. 2). The periodic and asynchronous pending level indications 242 and 244 alert the scheduler master state machine 410 that there are periodic endpoints, asynchronous endpoints, or both, to service and the pending level indications 242 and 244 are translated into an active endpoint in the periodic or asynchronous active arrays 132 or 134 (FIG. 1).

Before dispatching a transaction to an endpoint, the periodic and asynchronous state machines 412 and 414 perform one or more port credit checks. If a port does not have sufficient port credits, the transaction is not dispatched and may be retried at some later time. To facilitate performing a local credit check, the primary scheduler 130 receives from the transfer manager 220 (FIG. 2) an IN endpoint active array 450, an IN credit available input 452, and OUT credit available input 454. If the transaction involves a split transaction, the primary scheduler 130 issues a request (e.g., via a split credit check input/output 456) to a credit check module within the secondary scheduler 148 (FIGS. 3 and 8) to determine whether a split transaction can be dispatched to a downstream transaction translator. For example, the primary scheduler 130 may issue a request to the secondary scheduler 148 to determine whether there is at least one available memory location in a transaction list (e.g., a list of transactions awaiting execution by the secondary scheduler).

The IN and OUT credit available inputs 452 and 454 reflect how many buffer entries are available in the port buffers (e.g., port buffers 351-354 and 371-374 in FIG. 3). The IN endpoint active array 450 indicates whether there is an active IN endpoint on a port. According to one embodiment, the primary scheduler 130 limits the number of active IN endpoints on a port to one. For example, if the asynchronous state machine 414 attempts to service a particular endpoint on a particular port (e.g., endpoint 5 on port 1) with an asynchronous IN transaction, the asynchronous state machine 414 checks the IN endpoint active array 450 to determine whether there are any active IN endpoints on port 1. If so, the asynchronous state machine 414 determines whether the active IN endpoint on port 1 is endpoint 5. If the active IN endpoint on port 1 is endpoint 5, additional asynchronous IN transactions can be sent (assuming there are sufficient port credits available after checking the IN credit available input 452). If the active IN endpoint on port 1 is not endpoint 5, additional asynchronous IN transactions cannot be sent even if there are sufficient port credits available.

The primary scheduler 130 also receives from the transfer manager 220 (FIG. 2) set mask and clear mask inputs 460 and 462 and set poll mask and clear poll mask inputs 470 and 472. The set mask and clear mask inputs 460 and 462 are used to update the periodic and asynchronous state memories 430 and 432 with an indication of whether any endpoints should be masked. For example, the set mask and clear mask inputs 460 and 462 specify an endpoint ID so that a bit in the mask fields in the periodic and asynchronous state memories 430 and 432 illustrated in FIGS. 5A and 5B can be set. The set poll mask and clear poll mask inputs 470 and 472 are used to update the asynchronous state memory 432 with an indication of whether any endpoints should be serviced using the polling state machine 420. For example, the set poll mask and clear poll mask inputs 470 and 472 specify an endpoint ID so that a bit in the polling field in the asynchronous state memory 432 illustrated in FIG. 5B can be set.

For each endpoint that the primary scheduler 130 is attempting to service, the primary scheduler 130 pulls context information from the control memory 260 (FIG. 2) via a scheduler context fetch input/output 480. The context information may be slot specific (e.g., root hub number, device speed, and device address) and endpoint specific (e.g., endpoint type, endpoint direction, endpoint state, the service interval for periodic transfers, and an indication of whether the transaction involves a split transaction).

After determining that a particular endpoint should be serviced, the primary scheduler 130 sends to the transfer manager 220 via a transfer manager request input/output 490 a request to service the scheduled endpoint task. The primary scheduler 130 may also send to the transfer manager 220 via the transfer manager request input/output 490 information about the endpoint that the transfer manager 220 uses to execute the transaction. According to one embodiment, the primary scheduler 130 services endpoints based upon certain thresholds (e.g., data provided by IN and OUT credit available inputs 452 and 454 and the IN endpoint active array 450) and the transfer manager 220 examines the credits remaining and serves a number of packets up to the remaining credits for a buffer (e.g., the transfer manager 220 should not deny service from a scheduled request based upon insufficient port credits).

FIG. 5A is a block diagram illustrating additional details of the periodic state memory 430 of the primary scheduler 130 of FIG. 4, according to one embodiment. The periodic state memory 430 illustrated in FIG. 5A includes a plurality of state fields for each endpoint, such a pending state field 510, a not first (nFirst) state field 512, a done state field 514, a ping done state field 516, and a mask state field 518. The periodic state memory 430 according to other embodiments may include additional or fewer state fields. If the host controller 140 supports 1,024 endpoints, each additional state field requires an additional 1,024 bits. Accordingly, it may be advantageous to minimize the number of state fields. The state memory 430 may be implemented in any suitable machine readable medium, such as registers (flip-flops or latches), RAM, flash memory, and EEPROM. According to one embodiment, the periodic state memory 430 is sized to store state fields for 1,024 endpoints (e.g., if the host controller 140 supports thirty-two slots each of which can include thirty-two endpoints). The periodic state memory 430 according to other embodiments may be sized to store more or less than 1,024 endpoints.

The pending state field 510 indicates whether service (e.g., periodic transactions) has been requested for a particular endpoint. According to one embodiment, a bit in the pending field 510 is set to "1" after the doorbell manager 240 (FIG. 2) generates the periodic pending level indication 242 for a particular endpoint (e.g., after the doorbell for a particular endpoint has been rung).

The nFirst state field 512 indicates whether or not the endpoint is being serviced for the first time. According to one embodiment, a bit in the nFirst state field 512 is set to "0" when the bit in the pending field 510 goes to "0" (e.g., as reflected by the periodic pending level indication 242). After the bit in the pending field 510 is set to "1", the bit in the nFirst state field 512 remains in the same state (e.g., "0"), which indicates that the endpoint is being serviced for the first time. After the endpoint is serviced for the first time, the bit in the nFirst state field 512 is set to "1", which indicates that the endpoint is not being serviced for the first time. The nFirst state field 512 allows the periodic state machine 412 to wait until a new service interval before servicing an endpoint. For example, if the bit in the pending field 510 is set to "1" in the middle or the end of a service interval, it may be better to wait for a new service interval before attempting to service the endpoint instead of attempting to force a transaction for the endpoint to dispatch at the end of a service interval. After the periodic state machine 412 detects a new service interval for that endpoint, the bit in the nFirst state field 512 is set to "1" and the periodic state machine 412 attempts to service the endpoint.

Certain periodic transactions, such as isochronous transactions, may require an endpoint to be serviced in a particular sub-frame. For example, certain endpoints may have a SIA bit associated therewith. If the SIA bit is set to "1", an isochronous transaction should be dispatched as soon as possible. If the SIA bit is set to "0", an isochronous transaction should be dispatched in a particular sub-frame specified by the host. Thus, if the SIA bit is set to "0", the periodic state machine 412 would wait until the sub-frame ID specified by the host matches the current sub-frame number before setting the bit in nFirst state field 512 to "1".

The done state field 514 indicates whether an endpoint has already been serviced in a particular service interval. According to one embodiment, a bit in the done state field 514 is "0" when an endpoint has not yet been serviced in a particular service interval and is "1" if an endpoint has already been serviced in a particular service interval. The setting and clearing of the bit in the done state field 514 is described in FIG. 6A.

The ping done state field 516 indicates whether a ping packet has been dispatched to an endpoint downstream from a link that may be in a sleep state. For example, certain endpoints (e.g., super-speed transactions with USB 3.0 isochronous endpoints) autonomously enter a low-power link state between service intervals. Thus, the periodic state machine 412 sends a ping packet to the targeted endpoint before the service interval to allow time for the path to transition back to an active power state before initiating a transaction (e.g., isochronous transfer). Together, the done and ping done state fields 514 and 516 have four state codings. If the bits in the state fields 514 and 516 start with "00" and a ping packet is dispatched, the bits in the state fields 514 and 516 are set to "01", which indicates that a ping packet has been dispatched. As will be described in more detail with respect to FIG. 6A, the bits in the state fields 514 and 516 are set to "11" if a transaction is fully dispatched to an endpoint (state S6 in FIG. 6A) and the bits in the state fields 514 and 516 are set to "10" if a transaction is partially dispatched to an endpoint (state S5 in FIG. 6A). If a ping packet is sent before a transaction is initiated (e.g., a USB 3.0 isochronous transfer), the bits in the state fields 514 and 516 would transition from "00" to "01" (indicating that a ping packet has been dispatched) and from "01" to "10" (indicating that a ping packet was sent and the transaction was partially dispatched) or from "01" to "11" (indicating that a ping packet was sent and the transaction was fully dispatched).

The mask state field 518 may be used for different purposes. According to one embodiment, the mask state field 518 is used in combination with the ping done state field 516 to indicate that an endpoint has acknowledged receiving a ping packet and is ready for a transaction to be initiated. For example, after a ping packet has been dispatched, the transfer manager 220 (FIG. 2) notifies the primary scheduler 130 via the set mask input 460 (FIG. 4) to set a bit in the mask state field 518 associated with the endpoint to "1". After the endpoint responds with an acknowledgement that it received the ping, the transfer manager 220 notifies the primary scheduler 130 via the clear mask input 462 to set a bit in the mask state field 518 associated with the endpoint to "0".

The mask state field 518 may also be used for interrupt pipes. For example, certain endpoints (e.g., transactions with USB 3.0 interrupt endpoints) can respond to an interrupt transaction with a not ready (NRDY) handshake packet that indicates that the endpoint is busy. After the endpoint responds with the not ready handshake, the transfer manager 220 notifies the primary scheduler 130 via the set mask input 460 to set the bit in the mask state field 518 associated with the endpoint to "1", which will block the servicing of any periodic transactions for that endpoint. After the endpoint is ready to receive transactions again, the endpoint sends an endpoint ready notification and the transfer manager 220 notifies the primary scheduler 130 via the clear mask input 462 to set the bit in the mask state field 518 associated with the endpoint to "0", which will allows that endpoint to be serviced.

According to one embodiment, the pending field 510, the done field 514, and the ping done field 516 are used to calculate the value of a bit in the periodic active array 132 (conceptually illustrated with a dashed arrows) as illustrated by Equation 1.

$$\text{periodic\_active}[n] = (\text{pending}[n]) \text{ AND (NOT done }[n] \text{ OR NOT ping\_done}[n] \text{ OR first\_pass)} \quad \text{(Equation 1)}$$

In Equation 1, n corresponds to the endpoint ID, which has a value ranging from 0 to N−1, periodic_active[n] corresponds to the bit in the active array 132, pending[n] corresponds to the bit in the pending field 510, done[n] corresponds to the bit in the done field 516, ping_done[n] corresponds to the bit in the ping done field 516, and first_pass indicates whether the periodic state machine 412 is performing a first pass through the active array, such as at a sub-frame boundary (e.g., first_pass is "1" if the periodic state machine 412 is performing a first pass through the active array).

Although the nFirst field 512 and the mask field 518 are not used in Equation 1 to create a bit in the active array 132, the nFirst and mask fields 512 and 518 are inspected by the periodic state machine 412 as the active array 132 is processed. At a sub-frame boundary (e.g., every 125 microseconds), the periodic state machine 412 performs a first pass through the active array 132 and resets the bits in the done and ping done fields 514 and 516 (e.g., to "0") if the endpoint is starting a new service interval. During the first pass, the periodic state machine 412 may also inspect the mask field 518 to determine whether the device is not ready (e.g., for interrupt transactions). If the device is not ready, the periodic state machine 412 may set the bits in the done and ping done fields 514 and 516 to "1", so the periodic state machine 412 can skip processing that endpoint during the service interval (e.g., the done bits will be reset to "0" at the start of the next service interval).

According to one embodiment, each time the periodic state machine 412 performs a pass through the active array 132 (e.g., for a particular sort level), the periodic state machine 412 starts at the beginning of the active array 132 (e.g., with the active bit associated with $EP_0$) as conceptually illustrated by arrow 520.

FIG. 5B is a block diagram illustrating additional details of the asynchronous state memory 432 of the primary scheduler 130 of FIG. 4, according to one embodiment. The asynchronous state memory 432 illustrated in FIG. 5B includes a plurality of state fields for each endpoint, such a pending state field 530, a mask state field 532, and a polling state field 534. The asynchronous state memory 432 according to other embodiments may include additional or fewer state fields. If the host controller 140 supports 1,024 endpoints, each additional state field requires an additional 1,024 bits. Accordingly, it may be advantageous to minimize the number of state fields. The state memory 432 may be implemented in any suitable machine readable medium, such as registers (flip-flops or latches), RAM, flash memory, and EEPROM. According to one embodiment, the asynchronous state memory 432 is sized to store state fields for 1,024 endpoints (e.g., if the host controller 140 supports thirty-two slots each of which can include thirty-two endpoints). The asynchronous state memory 432 according to other embodiments may be sized to store more or less than 1,024 endpoints.

The pending state field 530 indicates whether service (e.g., asynchronous transactions) has been requested for a particular endpoint. According to one embodiment, a bit in the pending field 530 is set to "1" after the doorbell manager 240 (FIG. 2) generates the asynchronous pending level indication 244 for a particular endpoint (e.g., after the doorbell rings the doorbell for a particular endpoint).

The mask state field 532 may be used to stop an endpoint (e.g., block the servicing of any asynchronous transactions for an endpoint). According to one embodiment, the mask state field 532 may be used if an endpoint is not ready to receive data. For example, certain endpoints (e.g., transactions with USB 3.0 endpoints) can respond to a transaction with a not ready (NRDY) handshake packet that indicates that the endpoint is busy. After the endpoint responds with the not ready handshake, the transfer manager 220 notifies the primary scheduler 130 via the set mask input 460 to set the bit in the mask state field 532 associated with the endpoint to "1", which will block the servicing of any asynchronous transactions for that endpoint. After the endpoint is ready to receive transactions again, the endpoint sends an endpoint ready notification and the transfer manager 220 notifies the primary scheduler 130 via the clear mask input 462 to set the bit in the mask state field 532 associated with the endpoint to "0", which will allows that endpoint to be serviced. The mask state field 532 may also be used for control endpoints. For example, after sending a transaction to a control endpoint, it may be desirable to prevent additional transactions from being dispatched to the control endpoint until it responds with a handshake.

The polling state field 534, according to one embodiment, is used resend asynchronous transactions at a slower rate. For example, if a transaction is sent to an endpoint and the endpoint responds with a negative acknowledgment (NAK) handshake, the polling state machine 420 may service that endpoint (instead of the asynchronous state machine 414) and attempt to resend the transaction at a slower pace. After the endpoint responds with negative acknowledgment (NAK) handshake, the transfer manager 220 notifies the primary scheduler 130 via the set poll mask input 470 (FIG. 4) to set the bit in the polling state field 534 associated with the endpoint to "1", which causes the polling state machine 420 to service that endpoint. After the endpoint is ready to send or receive transactions again (e.g., the endpoint sends a positive acknowledgment (ACK) handshake or sends a data payload), the transfer manager 220 notifies the primary scheduler 130 via the clear poll mask input 472 to set the bit in the polling state field 534 associated with the endpoint to "0", which causes the asynchronous state machine 414 to service that endpoint.

According to one embodiment, the pending field 530, the mask field 532, and the polling field 534 are used to calculate the value of a bit in the asynchronous active array 134 (conceptually illustrated with dashed arrows) as illustrated by Equation 2.

$$\text{async\_active}[n] = \text{pending}[n] \text{ AND NOT mask}[n] \text{ AND NOT polling}[n] \quad \text{(Equation 2)}$$

In Equation 2, n corresponds to the endpoint ID, which has a value ranging from 0 to N−1, async_active[n] corresponds to the bit in the asynchronous active array 134, pending[n] corresponds to the bit in the pending field 530, mask[n] corresponds to the bit in the mask field 532, and polling[n] corresponds to the bit in the polling field 534.

The pending field 530, the mask field 532, and the polling field 534 are also used to calculate the value of a bit in the asynchronous polling active array 540 (conceptually illustrated with dashed arrows) as illustrated by Equation 3.

$$\text{async\_active\_polling}[n] = \text{pending}[n] \text{ AND NOT mask}[n] \text{ AND polling}[n] \quad \text{(Equation 3)}$$

In Equation 3, n corresponds to the endpoint ID, which has a value ranging from 0 to N−1, async_active_polling[n] corresponds to the bit in the asynchronous polling active array 540, pending[n] corresponds to the bit in the pending field 530, mask[n] corresponds to the bit in the mask field 532, and polling[n] corresponds to the bit in the polling field 534.

According to one embodiment, the asynchronous state machine 414 processes the asynchronous active array 134 in a round-robin manner. In other words, the asynchronous state machine 414 keeps cycling through the asynchronous active array 134 until there are no more active endpoints, which is conceptually illustrated by arrows 550 and 552. In contrast, according to one embodiment, each time the polling state machine 420 performs a pass through the asynchronous polling active array 540, the polling state machine 420 starts at the beginning of the array 540 (e.g., with the active bit associated with $EP_0$) as conceptually illustrated by arrow 560.

Figure 6A:
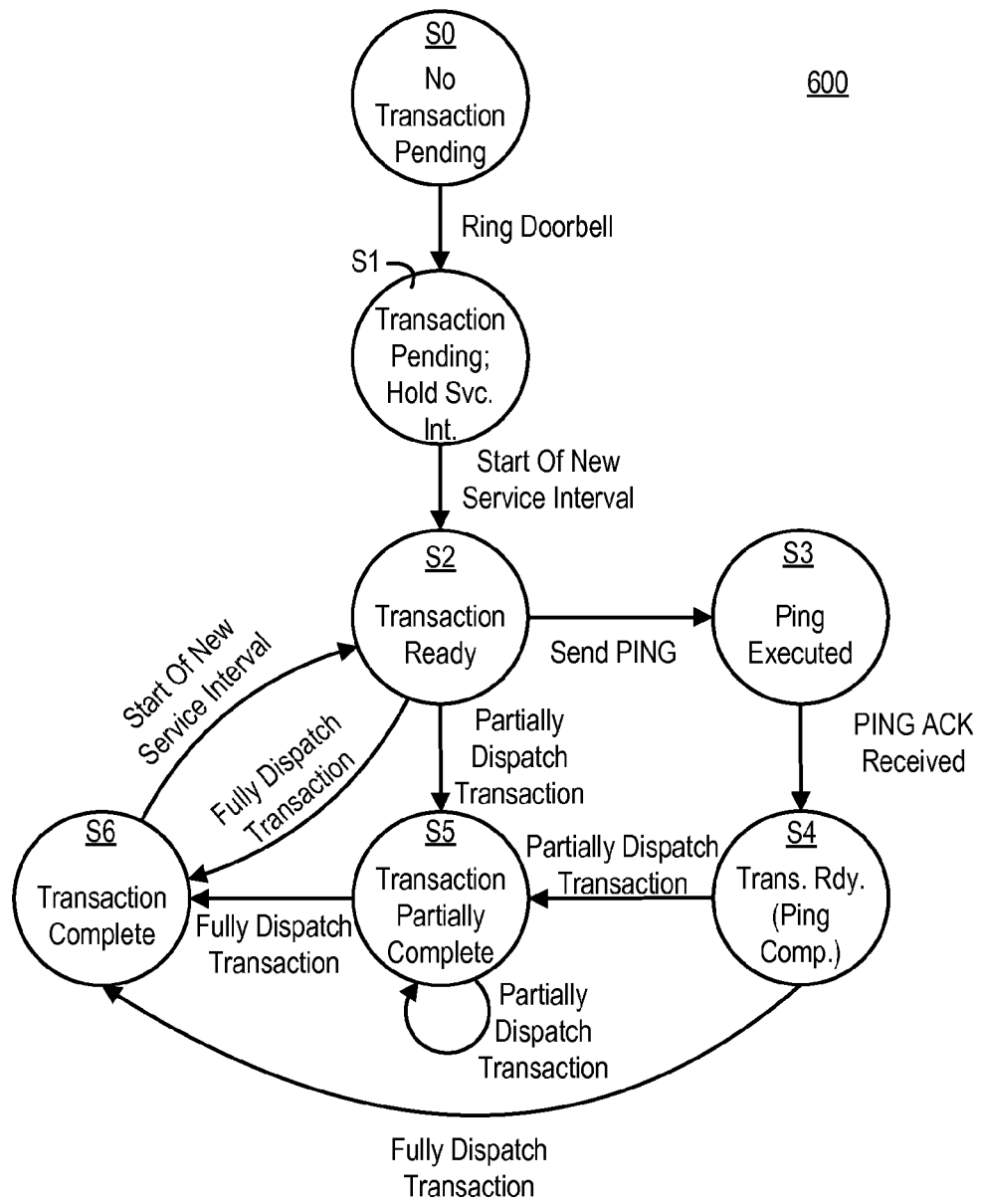
FIGS. 6A and 6B are simplified state diagrams illustrating various endpoint states for periodic and non-periodic transactions, according to various embodiments.

FIG. 6A is a high-level state transition diagram 600 illustrating various endpoint states for periodic transactions, according to one embodiment. An endpoint (e.g., one of the endpoints $EP_0$-$EP_{N-1}$ in FIG. 5A) starts in state S0 with no transactions pending. As illustrated in Table 1, below, the bit in the pending state field 510 (FIG. 5A) is set to "0" when an endpoint is in state S0 and the value of the other fields 512-518 do not matter and are marked with an "X" (representing a don't-care condition). An endpoint remains in state S0 until the doorbell manager 240 (FIG. 2) alerts the primary scheduler 130 that the endpoint needs servicing (e.g., by generating a periodic pending level indication 242).

After the doorbell manager 240 (FIG. 2) alerts the primary scheduler 130 that the endpoint needs servicing, the endpoint transitions to state S1 in which a transaction is pending for the endpoint but the endpoint must wait until a new service interval before the periodic state machine 412 will service the endpoint. As illustrated in Table 1 the bit in the pending state field 510 is set to "1" when an endpoint is in state S1 and the bit in the nFirst state field 512 is set to "0", which indicates that the endpoint is being serviced for the first time. The value of the other fields 514-518 do not matter in state S1 and are marked with an "X". An endpoint remains in state S1 until the start of a new service interval. As previously discussed, certain periodic transactions, such as isochronous transactions, may require an endpoint to be serviced in a particular sub-frame and have a SIA bit associated therewith. If the SIA bit is set to "1", an isochronous transaction should be dispatched as soon as possible and the endpoint will transition to state S2 at the start of a new service interval. If the SIA bit is set to "0", an isochronous transaction should be dispatched in a particular sub-frame specified by the host. Thus, if the SIA bit is set to "0", the endpoint will not transition to state S2 until the sub-frame ID specified by the host matches the current sub-frame number.

After the start of a new service interval (and the sub-frame ID specified by the host matches the current sub-frame number in the case of SIA=0), the endpoint transitions to state S2 in which a transaction for the endpoint is ready to be dispatched. As illustrated in Table 1 the bit in the pending and nFirst state fields 510 and 512 are set to "1" when an endpoint is in state S2 and the bit in state fields 514-518 are set to "0".

If the endpoint, such as a USB 3.0 isochronous endpoint, enters a low-power link state between service intervals, the periodic state machine 412 may send a ping packet to the endpoint to cause the path to transition back to an active power state before initiating a transaction (e.g., isochronous transfer). After the periodic state machine 412 sends a ping packet to the endpoint, the endpoint transitions to state S3. As illustrated in Table 1 the bit in the pending, nFirst, ping done, and mask state fields 510, 512, 516, and 518 are set to "1" when an endpoint is in state S3 and the bit in the done state field 514 is set to "0". After the endpoint responds with an acknowledgement that it received the ping, the transfer manager 220 notifies the primary scheduler 130 via the clear mask input 462 to set a bit in the mask state field 518 associated with the endpoint to "0", which causes the endpoint to enter state S4. As illustrated in Table 1 the bit in the pending, nFirst, and ping done state fields 510, 512, and 516 are set to "1" when an endpoint is in state S4 and the bits in the done and mask state fields 514 and 518 are set to "0". It should be noted that states S3 and S4 are not used for all transactions and states S3 and S4 may be bypassed.

The endpoint transitions to state S5 if a transaction is dispatched, but the port credits prevented the transaction from being fully executed. For example, if a transaction includes sixteen data payload packets and, after performing a credit check, the periodic state machine 412 requests four of the sixteen packets to be dispatched during a pass through the active array 132, the endpoint will transition to state S5 indicating that the transaction is partially complete. The periodic state machine 412 will attempt to dispatch the remaining twelve packets in subsequent passes through the active array 132. The endpoint can transition to state S5 from any one of states S2, S4, and S5. As illustrated in Table 1 the bit in the pending, nFirst, and done state fields 510, 512, and 514 are set to "1" when an endpoint is in state S5 and the bit in the ping done state field 516 is set to "0". The value of the mask state field 518 does not matter and is marked with an "X".

The endpoint transitions to state S6 if a transaction is fully dispatched and the transaction associated with the endpoint is complete (at least during the current service interval). The endpoint can transition to state S6 from any one of states S2, S4, and S5. As illustrated in Table 1 the bit in the pending, nFirst, done, and ping done state fields 510, 512, 514, and 516 are set to "1" when an endpoint is in state S6. The value of the mask state field 518 does not matter and is marked with an "X".

At the start of a new service interval for the endpoint, the done and ping done bits are cleared and the endpoint transitions from state S6 to state S2. If a new service interval for the endpoint begins and the endpoint is still in one of states S2, S3, and S5, the endpoint may transition to state S2 and a missed service interval (MSI) error is asserted (e.g., a driver associated with the endpoint will be notified that the endpoint missed a service interval). In addition, if a new service interval for the endpoint begins and the endpoint is still in state S3 (e.g., the endpoint has not sent a ping acknowledgment), the endpoint may transition to state S2 and a ping response error is asserted. The endpoint may also transition back to state S0 if the transfer manager discovers that there are no more transfer request block (TRBs) to process (e.g., in an overflow, underflow, or stopped endpoint condition).

Table 1 describes the endpoint state bits in the state fields 510-518 (FIG. 5A) when an endpoint (e.g., one of the endpoints $EP_0$-$EP_{N-1}$ in FIG. 5A) is in the various states S0-S6 described with reference to FIG. 6A, according to one embodiment.

TABLE 1

| State Description | Pending 510 | n First 512 | Done 514 | Ping Done 516 | Mask 518 |
|---|---|---|---|---|---|
| S0: No transaction pending | 0 | X | X | X | X |
| S1: Transaction pending and holding for first new interval to start or interval match (e.g., SIA = 0 for an isochronous transaction) | 1 | 0 | X | X | X |
| S2: Transaction ready | 1 | 1 | 0 | 0 | 0 |
| S3: Ping Executed (e.g., USB 3.0) | 1 | 1 | 0 | 1 | 1 |
| S4: Transaction ready (PING Complete) | 1 | 1 | 0 | 1 | 0 |
| S5: Transaction partially complete | 1 | 1 | 1 | 0 | X |
| S6: Transaction complete | 1 | 1 | 1 | 1 | X |

Figure 6B:
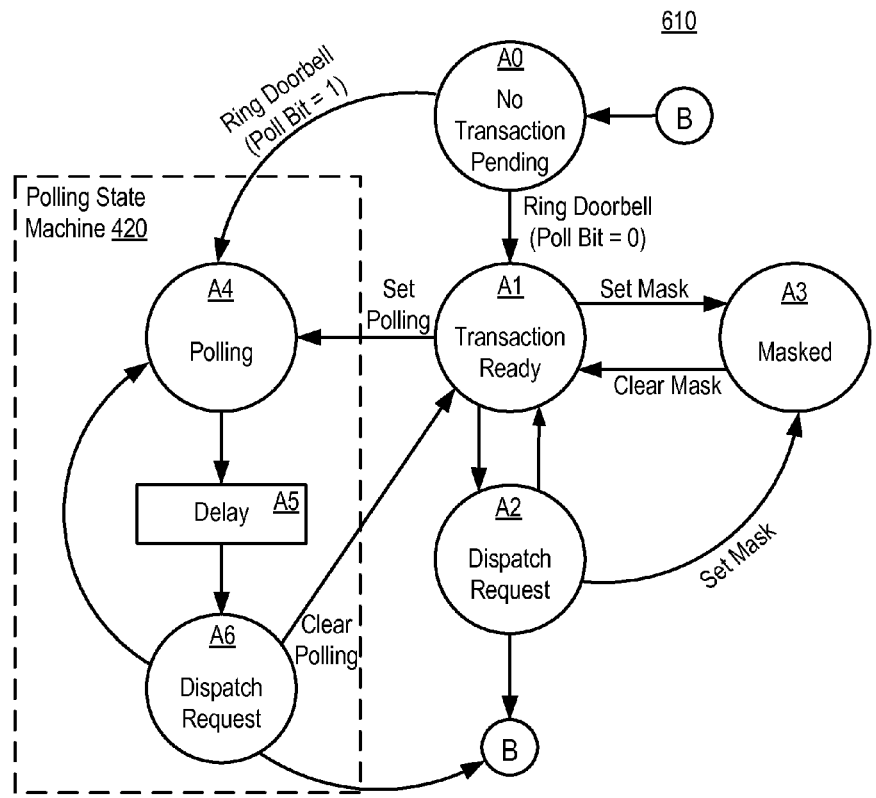

FIG. 6B is a high-level state transition diagram 610 illustrating various endpoint states for asynchronous transactions, according to one embodiment. An endpoint (e.g., one of the endpoints $EP_0$-$EP_{N-1}$ in FIG. 5B) starts in state A0 with no transactions pending. An endpoint remains in state A0 until the doorbell manager 240 (FIG. 2) alerts the primary scheduler 130 that the endpoint needs servicing (e.g., by generating an asynchronous pending level indication 244).

After the doorbell manager 240 (FIG. 2) alerts the primary scheduler 130 that the endpoint needs servicing, the endpoint transitions to state A1 (e.g., if the polling bit in the polling state field 534 is set to zero) in which a transaction for the endpoint is ready to be dispatched. After the asynchronous state machine 414 is ready to dispatch a transaction to the endpoint, the endpoint transitions from state A1 to state A2 and a transaction is dispatched to the endpoint. After a transaction is dispatched to the endpoint, the endpoint transitions from state A2 to state A1 if there are more asynchronous transactions pending for the endpoint. If there are no more transactions pending for the endpoint, the bit in the pending field 530 (FIG. 5B) is cleared and the endpoint transitions back to state A0.

If the transfer manager 220 notifies the primary scheduler 130 via the set mask input 460 (FIG. 4) to set the bit in the mask state field 532 (FIG. 5B) associated with the endpoint to "1", the endpoint transitions to state A3 in which servicing of the endpoint is blocked. The endpoint can transition to state A3 from any one of states A1 or A2. The endpoint will remain in state A3 until the transfer manager 220 notifies the primary scheduler 130 via the clear mask input 462 to set the bit in the mask state field 532 associated with the endpoint to "0". After the mask bit is cleared, the endpoint transitions to state A1 in which a transaction for the endpoint is ready to be dispatched.

If the transfer manager 220 notifies the primary scheduler 130 via the set poll mask input 470 (FIG. 4) to set the bit in the polling state field 534 (FIG. 5B) associated with the endpoint to "1", the endpoint transitions to state A4 in which the endpoint is serviced by the polling state machine 420. The endpoint can transition to state A4 from states A0 or A1. For example, if a transaction is sent to an endpoint and the endpoint responds with a negative acknowledgment (NAK) handshake, the endpoint may transition from state A1 to state A4. By way of another example, the endpoint may transition from state A0 directly to state A4 if the bit in the polling field 534 is already set when the bit in the pending field 530 is set (e.g., if a transaction is sent to the endpoint and the endpoint responds with a NYET packet, the bit in the polling field 534 may be set to "1" and the bit in the pending field 530 may be cleared).

After the polling state machine 420 is ready to dispatch a transaction to the endpoint, the endpoint transitions from state A4 to state A5 in which the polling state machine 420 waits for a predetermined amount of time (e.g., 20 microseconds) before proceeding to state A6 (e.g., the polling state machine 420 enters a sleep state). According to one embodiment, the predetermined amount of time is configurable (e.g., the host controller 140 and/or the OS or drivers running on the host 120 adjust the amount of delay). After waiting the predetermined amount of time, the endpoint transitions to state A6 in which a request to dispatch a transaction is made to the asynchronous state machine 414. After the asynchronous state machine 414 services the request (or denies the request), the endpoint may transition to state A4. If there are no more transactions pending for the endpoint, the bit in the pending field 530 (FIG. 5B) may be cleared and the endpoint may transition back to state A0.

After the endpoint is ready to send or receive transactions again (e.g., the endpoint sends a positive acknowledgment (ACK) handshake or sends a data payload), the transfer manager 220 notifies the primary scheduler 130 via the clear poll mask input 472 to set the bit in the polling state field 534 (FIG. 5B) associated with the endpoint to "0". After the polling bit is cleared, the endpoint transitions to state A1 in which the asynchronous state machine 414 services the endpoint.

Figure 7:
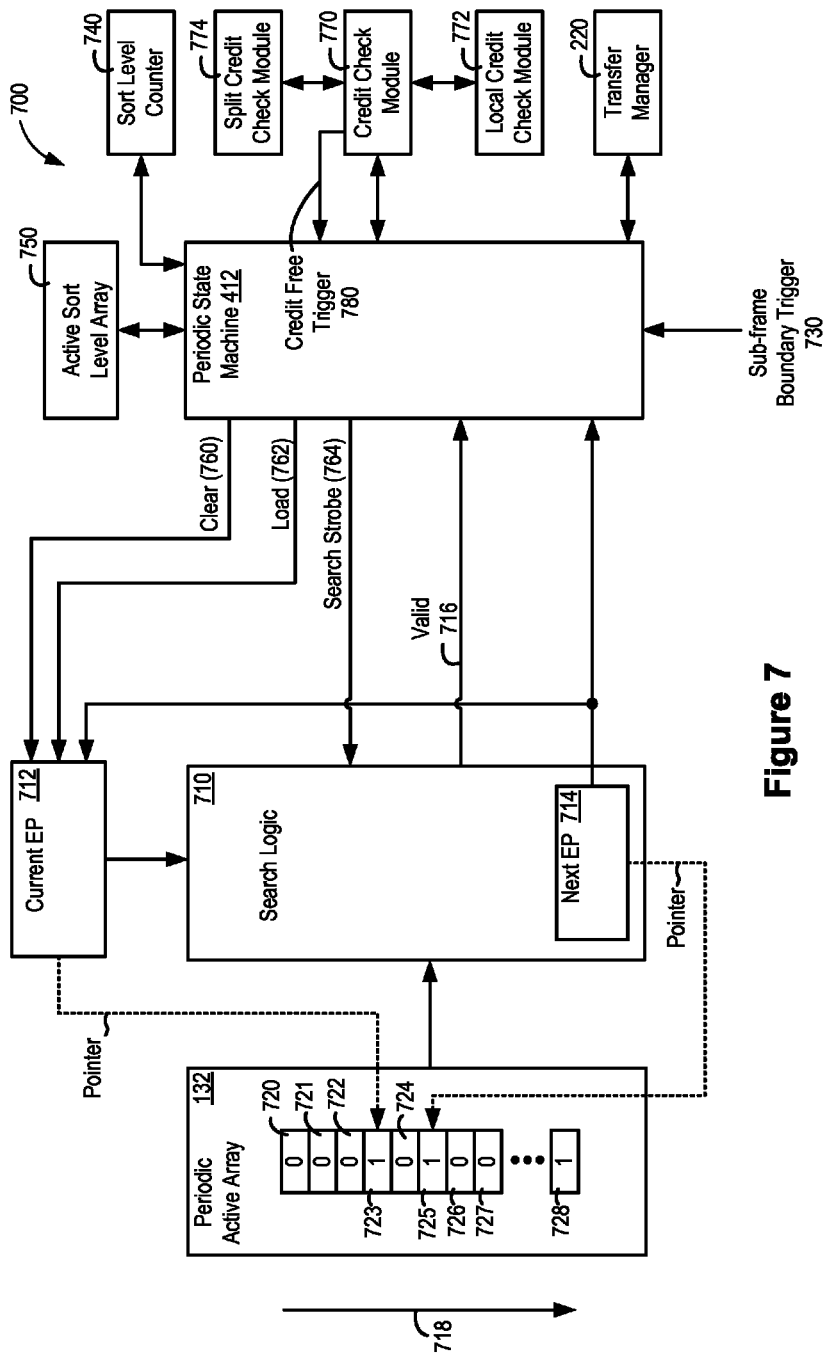
FIG. 7 is block diagram illustrating the interaction between a periodic state machine, search logic, and an active array that facilitate scheduling and dispatching periodic transactions to device endpoints, according to one embodiment.

FIG. 7 is block diagram of a system 700 that schedules and dispatches periodic transactions to device endpoints, according to one embodiment. The system 700 includes the periodic state machine 412, the active array 132, and search logic 710. The active array 132 includes a plurality of elements 720-728, each of which stores an indication of whether an endpoint corresponding to the element is active. According to a preferred embodiment, the active array 132 includes an element corresponding to each the endpoints in the periodic state memory 430 (FIGS. 4 and 5A). Thus, if the periodic state memory 430 is sized to store state fields for 1,024 endpoints (e.g., if the host controller 140 supports thirty-two slots each of which can include thirty-two endpoints), the active array 132 may include 1,024 elements. The active array 132 illustrated in FIG. 7 includes active elements 723, 725, and 728 and inactive elements 720-722, 724, 726, and 727. As described with reference to FIG. 5A, the pending field 510, the done field 516, and the ping done field 516 are used to determine the value of a bit stored in the elements 720-728, according to one embodiment. Thus, the value of the bits stored in the pending field 510, the done field 516, and the ping done field 516 determine whether a corresponding element in the active array 132 is active.

The active array 132 is input into the search logic 710 along with a current endpoint field 712. The current endpoint field 712 stores a value pointing to one of the elements in the active array 132. For example, as illustrated in FIG. 7, the current endpoint field 712 is storing a value pointing to element 723 in the active array 132. Using the value stored in the current endpoint field 712, the search logic 710 is configured to search the active array 132 for the next active element in the active array 132. The next active element found or identified by the search logic 710, which is depicted as a next endpoint output 714, is output to the periodic state machine 412. As illustrated in FIG. 7, the current endpoint field 712 is storing a value pointing to element 723 in the active array 132 and the next endpoint output 714 is pointing to element 725, which is the next active element in the active array 132 identified by the search logic 710. At the start of a new search, the value in the current endpoint field 712 is set to zero and the search logic 710 finds or identifies the first active element in the active array 132, which is depicted in the next endpoint output 714.

The periodic state machine 412 examines the next active element found by the search logic 710 and determines whether an endpoint corresponding to the next active element satisfies predetermined dispatch criteria (e.g., sort criteria for a particular sort level and a port credit check). If the endpoint satisfies the predetermined dispatch criteria, the periodic state machine 412 dispatches a transaction to the endpoint by, for example, sending a request to the transfer manager 220 to service the endpoint. In other words, the periodic state machine 412 effects dispatch of a transaction if the endpoint satisfies the predetermined dispatch criteria. After the periodic state machine 412 examines the next active element found by the search logic 710 and possibly dispatches a transaction, the next active element found by the search logic 710 is stored in the current endpoint field 712. Starting with the new value stored in the current endpoint field 712, the search logic 710 identifies the next active element in the active array 132 and the periodic state machine 412 examines that element and determines whether to dispatch a transaction to the corresponding endpoint.

The search logic 710 continues to sequence through the active endpoints in the active array 132 until no additional active endpoints are found in the remainder of the array. If the search logic 710 reaches the end of the active array (e.g., element 728) and does not find any additional active endpoints, the search logic 710 outputs to the periodic state machine 412 a valid flag 716 indicating no additional active endpoints were found in the array 132. According to one embodiment, the search logic 710 walks through the active array 132 in order. In other words, the search logic 710 starts at the beginning of the active array 132 with element 720 and traverses the elements in order until the last active element is found (e.g., element 728), which is conceptually illustrated by arrow 718.

The search logic 710 comprises a multi-cycle priority encoder, according to one embodiment. Because the active array 132 may contain a relatively large number of elements, the search logic 710 may process the elements in multiple cycles instead of processing the elements in a single cycle (which may take too long with a large number of elements). For example, if the active array 132 includes 1,024 elements, the search logic 710 may process elements in two cycles (e.g., the search logic may process 32 elements in parallel and perform a final stage of 32).

According to one embodiment, the periodic state machine 412 makes one or more initial service passes through the active array 132 before attempting to dispatch any transactions. During the service passes, the periodic state machine 412 inspects all of the elements in the active array (e.g., not just the active elements). For example, with reference to Table 1, above, the periodic state machine 412 inspects states S1-S6 during a first pass. During subsequent passes the periodic state machine 412 visits endpoints having states S1-S5.

According to one embodiment, the periodic state machine 412 does not visit endpoints having a S0 state (e.g., non-pending endpoints are never visited by the periodic state machine 412 on any pass). A first service pass is initiated after the periodic state machine 412 receives a sub-frame boundary trigger 730 (e.g., after the frame index 440 in FIG. 4 increments to a new sub-frame). In the first service pass through the active array 132, the periodic state machine 412 may perform a number of tasks, such as clearing the bits in the done and ping done fields 514 and 516 (FIG. 5A), setting one or more pending flags, resetting a sort level counter 740, and identifying any misses service intervals.

During the first service pass through the active array 132, the periodic state machine 412 inspects all of the elements in the active array and clears the bits in the done and ping done fields 514 and 516 if an endpoint corresponding to an element is beginning a new service interval. Because, according to one embodiment, the active array 132 is created from the pending field 510, the done field 516, and the ping done field 516, the periodic state machine 412 masks out (e.g., ignores) the values in the done and ping done fields 514 and 516 during the first service pass. As the periodic state machine 412 inspects each element in the active array, the periodic state machine 412 may access the control memory 260 (FIG. 2) to determine the service interval for the associated endpoint. If the periodic state machine 412 determines that an endpoint is entering a new service interval, the periodic state machine 412 clears (e.g., sets to "0") the bits in the done and ping done fields 514 and 516 for the endpoint.

During the first service pass through the active array 132, the periodic state machine 412 also sets one or more pending flags. For example, the periodic state machine 412 may set per interval flags in an active sort level array 750 to indicate which sort levels include active endpoints. As will be discussed in more detail below, the periodic state machine 412 will make one or more search passes through the active array 132 and attempt to dispatch transactions to active endpoints that match the sort level criteria associated with the search pass. According to one embodiment, the periodic state machine 412 sorts the endpoints by sixteen sort levels, each of which corresponds to a service interval (e.g., every sub-frame, every two sub-frames, every four sub-frames, and so forth). According to another embodiment, the periodic state machine 412 sorts the endpoints by 64 sort levels, each of which corresponds to a service interval, a transfer type (e.g., isochronous or interrupt), and USB protocol (e.g., USB 2.0 or 3.0). During the first service pass through the active array 132, the periodic state machine 412 determines which endpoints are active (e.g., by inspecting the done and ping done fields 514 and 516 for the endpoint) and in which sort levels those active endpoints are categorized. After determining which sort levels include active endpoints, the periodic state machine 412 sets an interval pending flag associated with each sort level that includes an active endpoint (i.e., the periodic state machine 412 marks the active sort levels). According to one embodiment, the active sort level array 750 includes an element corresponding to each sort level (e.g., the active sort level array 750 may include 64 bits if 64 sort levels are used). Marking the active sort levels helps minimize the number of search passes through the active array 132 during each sub-frame. According to certain embodiments, the periodic state machine 412 does not mark the active sort levels and instead performs a search pass corresponding to each sort level every sub-frame.

The periodic state machine 412 may also set per port and per direction flags so that the periodic state machine 412 can determine which ports have active periodic endpoints associated therewith and the direction of the active endpoints (e.g., IN or OUT). The periodic state machine 412 may also set a split transaction flag, which indicates that at least one active endpoint will be serviced by the encapsulator 146. The per port, per direction, and split transaction flags may be stored in the periodic runtime state 413 (FIG. 4) along with the active sort level array 750.

The periodic state machine 412 may use the pending flags for various purposes. For example, the periodic state machine 412 may inspect the per port and per direction flags after receiving an indication that one or more port credits have freed. If a port credit frees for an active port (e.g., a port marked with an active port flag), the periodic state machine 412 may rewind to a higher priority sort level, which will be discussed in more detail below. By way of another example, the scheduler master state machine 410 (FIG. 4) may inspect the per port and per direction flags when attempting to service an asynchronous endpoint. If the periodic state machine 412 has finished processing the active endpoints in the active array 132 and is waiting for port credits to free, the scheduler master state machine 410 may attempt to dispatch an asynchronous transaction. Before dispatching an asynchronous transaction, the per port and per direction flags may be inspected to avoid sending an asynchronous transaction to a port that still has a periodic transaction pending (e.g., if an asynchronous transaction is dispatched to a port with a pending periodic transaction, the asynchronous transaction may slip in between periodic transactions and further delay the execution of the pending periodic transactions).

During the first service pass through the active array 132, the periodic state machine 412 may also identify if any of the endpoints missed a service interval. For example, as the periodic state machine 412 inspects each element in the active array, the periodic state machine 412 may determine whether an endpoint is entering a new service interval and, if so, check the bits in the done and ping done fields 514 and 516 to determine whether the transaction was dispatched. If the transaction has not been dispatched, the periodic state machine 412 may notify a driver that the endpoint missed its service interval. The periodic state machine 412 may provide the driver with an indication of whether a transaction was not dispatched at all or whether a transaction was partially dispatched. If a transaction was partially dispatched, the periodic state machine 412 may provide the driver with an indication of the number of packets dispatched. The periodic state machine 412 may also provide the driver with an indication of whether the device responded with an acknowledgment or payload data. According to one embodiment, if an endpoint misses a service interval, the periodic state machine 412 does not clear the bits in the done and ping done fields 514 and 516. Instead, the periodic state machine 412 may allow the system to complete the transaction during one or more subsequent service intervals. The periodic state machine 412 may count the number of service intervals an endpoint misses and send the number of missed service intervals to the driver so that the driver can take the appropriate action (e.g., drop a certain number of TRBs from the data list).

According to one embodiment, the periodic state machine 412 makes a second service pass through the active array 132 to send ping packets to endpoints (if necessary) before attempting to dispatch any transactions. For example, if the endpoint, such as a USB 3.0 isochronous endpoint, enters a low-power link state between service intervals, the periodic state machine 412 may send a ping packet to the endpoint to cause the path to transition back to an active power state before initiating a transaction (e.g., isochronous transfer). After the periodic state machine 412 sends a ping packet to the endpoint, the periodic state machine 412 sets the bit in the mask state field 518 to "1". After the endpoint responds with an acknowledgement that it received the ping, the transfer manager 220 notifies the primary scheduler 130 via the clear mask input 462 to set the bit in the mask state field 518 associated with the endpoint to "0".

After making one or more service passes through the active array 132, the periodic state machine 412 makes one or more search passes through the active array 132 and attempts to dispatch transactions to active endpoints. During the search passes, the periodic state machine 412 inspects the active elements in the active array 132. According to one embodiment, each search pass through the active array 132 corresponds to a sort level having a unique set of sort criteria associated therewith. A sort level counter 740 may be provided so that each search pass through the active array 132 is for a specific sort level. Any number of sort levels may be used. According to one embodiment, sixteen sort levels are provided, each of which corresponds to a service interval. Table 2 illustrates the service intervals (e.g., period of time between consecutive requests to an endpoint to send or receive data) associated with various sort levels, according to one embodiment. The periodic state machine 412 preferably prioritizes the smallest service intervals. For example, the first search pass may correspond to sort level 0, the second search pass may correspond to sort level 1, and so forth.

TABLE 2

| Sort Level | Service Interval |
| --- | --- |
| 0 | once every sub-frame |
| 1 | once every 2 sub-frames |
| 2 | once every 4 sub-frames |
| 3 | once every 8 sub-frames (e.g., every millisecond frame) |
| 4 | once every 16 sub-frames |
| . | . |
| . | . |
| . | . |
| 15 | once every 32,768 sub-frames |

According to another embodiment, 64 sort levels are provided so that the periodic state machine 412 can sort by three fields, such as the service interval, transfer type (e.g., isochronous or interrupt), and USB protocol (e.g., USB 2.0 or 3.0). The sort parameters are preferably programmable (e.g., by the host controller driver). For example, the host controller driver can select which fields to sort by and the order in which to perform the sort (e.g., isochronous before interrupt and USB 2.0 before 3.0). Table 3 illustrates the sort criteria associated with various sort levels, according to one example configuration. The periodic state machine 412 preferably prioritizes the smallest sort levels. For example, the first search pass may correspond to sort level 0, the second search pass may correspond to sort level 1, and so forth.

TABLE 3

| Sort Level | Protocol | Transfer Type | Service Interval |
| --- | --- | --- | --- |
| 0 | USB 2.0 | isochronous | once every sub-frame |
| 1 | USB 3.0 | isochronous | once every sub-frame |
| 2 | USB 2.0 | interrupt | once every sub-frame |
| 3 | USB 3.0 | interrupt | once every sub-frame |
| 4 | USB 2.0 | isochronous | once every 2 sub-frames |
| . | . | . | . |
| . | . | . | . |
| . | . | . | . |
| 60 | USB 2.0 | isochronous | once every 32,768 sub-frames |

TABLE 3-continued

| Sort Level | Protocol | Transfer Type | Service Interval |
|---|---|---|---|
| 61 | USB 3.0 | isochronous | once every 32,768 sub-frames |
| 62 | USB 2.0 | interrupt | once every 32,768 sub-frames |
| 63 | USB 3.0 | interrupt | once every 32,768 sub-frames |

If the periodic state machine 412 performs the first and second service passes and performs 64 search passes, the periodic state machine 412 may make 66 passes through the active array 132 during a sub-frame or microframe (e.g., every 125 milliseconds). Marking the active sort levels during the first service pass helps minimize the number of search passes that the periodic state machine 412 needs to make through the active array 132 during each sub-frame. For example, if the periodic state machine 412 determines during the first service pass that only sort levels 0, 5, and 8 are active, the periodic state machine 412 only needs to perform three search passes through the array (one for each of sort levels 0, 5, and 8). The sort level counter 740 may be loaded with an active sort level value (e.g., one of sort levels 0, 5, and 8) so that the periodic state machine 412 performs a search pass through the active array 132 corresponding to that sort level.

Before performing a search pass, the periodic state machine 412 clears (760) the value in the current endpoint field 712 (e.g., sets the current endpoint field 712 to zero) and sends a search strobe 764 to the search logic 710 to begin a search. The search logic 710 finds or identifies the first active element in the active array 132, which is depicted in the next endpoint output 714. The periodic state machine 412 examines the endpoint corresponding to the first active element and determines whether the endpoint matches the sort criteria associated with the search pass. For example, if the periodic state machine 412 is performing a search pass for sort level 0 in Table 3 (e.g., the highest priority sort level), the periodic state machine 412 may access the control memory 260 (FIG. 2) to determine whether the service interval associated with the endpoint is once every sub-frame, the transfer type associated with the endpoint is isochronous, and USB protocol associated with the endpoint is USB 2.0.

If the endpoint does not match the sort criteria associated with the search pass, the periodic state machine 412 sends a load flag (762) to the current endpoint field 712, which causes the next endpoint output 714 to be stored in the current endpoint field 712. Starting with the new value stored in the current endpoint field 712, the search logic 710 identifies the next active element in the active array 132 and the periodic state machine 412 determines whether the next active endpoint matches the sort criteria associated with the search pass.

If, on the other hand, the endpoint matches the sort criteria associated with the search pass, the periodic state machine 412 performs a credit check to determine whether a port associated with the endpoint has sufficient port credits. For example, the periodic state machine 412 may send a request to a credit check module 770, which performs a split credit check via a split credit check module 774 if the transaction involves a split transaction or a local credit check via a local credit check module 772 if the transaction does not involve a split transaction. Additional details of performing a credit check are described with reference to FIG. 8. If the credit check passes, the periodic state machine 412 dispatches a transaction to the endpoint by, for example, sending a request to the transfer manager 220 to service the endpoint.

If the credit check fails, the periodic state machine 412 marks the sort level with an indication that the sort level still has active endpoints that need servicing and the periodic state machine 412 moves on to the next sort level (e.g., lower priority sort level). For example, when the periodic state machine 412 performs a search pass for a particular sort level, the periodic state machine 412 clears the interval pending flag associated with the sort level (e.g., in the active sort level array 750) and attempts to dispatch transactions to active endpoints that match the sort level criteria. If the periodic state machine 412 services all active endpoints in the sort level, the interval pending flag is left cleared. If, on the other hand, the periodic state machine 412 does not service all active endpoints in the sort level, the periodic state machine 412 sets the interval pending flag associated with that sort level to indicate that the sort level includes an active endpoint.

After one or more port credits free from a blocked port, a credit free trigger 780 will be asserted (e.g., from the credit check module 770) and the periodic state machine 412 will again attempt to service the highest priority sort level that is active. For example, after receiving the credit free trigger 780, the sort level counter 740 will be loaded with the highest priority sort level that is marked active in the active sort level array 750. After servicing the highest priority sort level, the periodic state machine 412 moves on to the lower priority sort levels.

Figure 8:
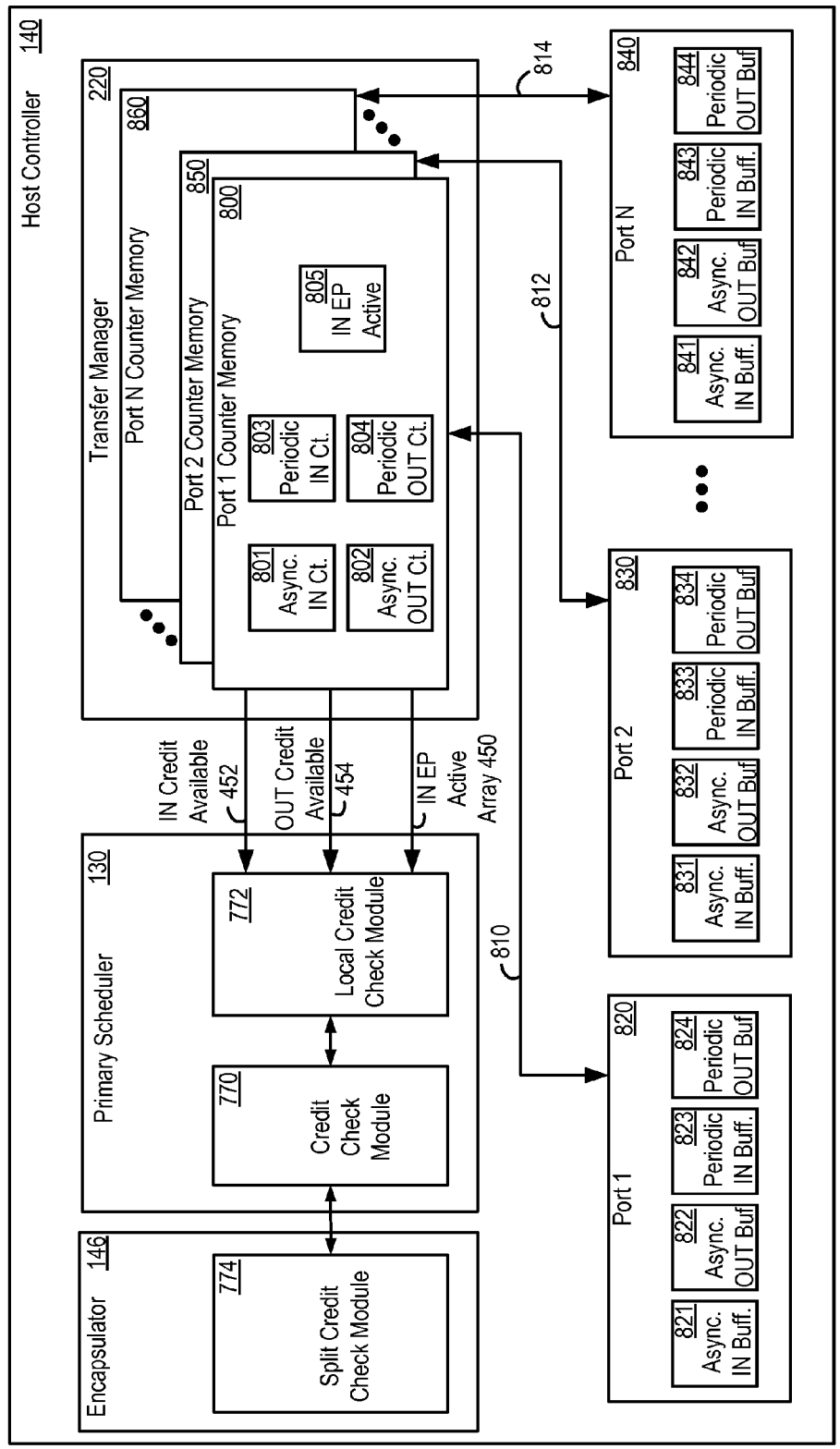
FIG. 8 is a block diagram illustrating the interaction between various components within the host controller of FIG. 1 that facilitate performing a credit check, according to one embodiment.

FIG. 8 is block diagram illustrating the interaction between various components within the host controller 140 that facilitate performing credit checks, according to one embodiment. Before dispatching a transaction to an endpoint, the periodic and asynchronous state machines 412 and 414 (FIG. 4) perform one or more port credit checks. If the transaction fails the credit check (e.g., if a port does not have sufficient port credits), the transaction is not dispatched and may be retried at some later time.

The host controller 140 may include any number of ports, each of which includes a plurality of buffers to temporarily store transactions being transferred between the host and any attached devices. For example, port 820 in FIG. 8 includes asynchronous IN and OUT buffers 821 and 822 and periodic IN and OUT buffers 823 and 824. Likewise, ports 830 and 840 include buffers 831-834 and 841-844. The buffers 821-824, 831-834, and 841-844 may be sized to store any number of transactions. According to one embodiment, the buffers 821-824, 831-834, and 841-844 are associated with a USB 3.0 interface (e.g., buffers 351-354 in the USB 3.0 interface 350 in FIG. 3) and are each sized to accommodate four data packets. The ports 820, 830, and 840 may include additional or fewer buffers. For example, the ports 820, 830, and 840 may include another set of asynchronous and periodic IN and OUT buffers for a USB 2.0 interface (e.g., buffers 371-374 and 375-378 in the 2.0/1.x interface 370 in FIG. 3). The asynchronous IN and OUT buffers for the USB 2.0 interface may be sized to accommodate two data packets and the periodic IN and OUT buffers may be sized to accommodate three data packets.

According to one embodiment, the transfer manager 220 includes a plurality of counters to track the number of transactions that are stored or about to be stored in the buffers 821-824, 831-834, and 841-844. For example, port 1 counter memory 800 includes counters 801-804, which indicate how many transactions are stored or about to be stored in buffers 821-824 (e.g., counter 801 corresponds to buffer 821, counter 802 corresponds to buffer 822, counter 803 corresponds to buffer 823, and counter 804 corresponds to buffer 824). The port 1 counter memory 800 also includes an IN EP active memory 805, which stores an indication of whether there are any active IN endpoints associated with port 820 and the endpoint IDs of any active IN endpoints associated with port 820. In a similar vein, port 2 and port N counter memories 850 and 860 include an IN EP active memory and a plurality of counters to track the number of transactions that are stored or about to be stored in buffers 831-834 and 841-844. The counters in port 1, port 2, and port N counter memories 800, 850, and 860 essentially mirror what is stored or will be stored in the buffers 821-824, 831-834, and 841-844, which is conceptually illustrated with arrows 810, 812, and 814. Each of the port counter memories 800, 850, and 860 may include additional or fewer counters and the port counter memories 800, 850, and 860 may be located elsewhere, such as in their respective ports 820, 830, 840, the primary scheduler 130, or a DMA engine.

After a transaction is dispatched to a buffer (e.g., the asynchronous OUT buffer 822), the corresponding counter (e.g., counter 801) is incremented. After the device responds with a handshake (e.g., ACK packet) or a data payload, the counter associated with the transaction (e.g., counter 801) is decremented. If a device is not expected to respond with a handshake (e.g., an isochronous transaction), the ports 820, 830, and 840 may be configured to generate a strobe indicating that the transaction has been dispatched so that the appropriate counter can be decremented.

According to one embodiment, watermark flags are communicated to the local credit check module 772 via the IN endpoint active array 450, the IN credit available input 452, and the OUT credit available input 454. For example, the local credit check module 772 may receive an indication of whether the asynchronous counters for each port are zero (e.g., empty), not zero, or a maximum value (e.g., the buffers are full). By way of another example, the local credit check module 772 may receive an indication of whether the periodic counters for each port are zero (e.g., empty) or at a maximum value (e.g., the buffers are full). By way of yet another example, the local credit check module 772 may receive an indication of whether a port includes any active IN endpoints and the endpoint IDs of any active IN endpoints associated with the port. According to other embodiments, the counter values are transferred to the local credit check module 772. The local credit check module 772 uses the watermark flags received via the IN endpoint active array 450, the IN credit available input 452, and the OUT credit available input 454 to determine whether a transaction passes a credit check.

The determination of whether a transaction passes a credit check may vary depending on the nature of the transaction. For example, if the transaction is an asynchronous OUT transaction and there is already another asynchronous OUT transaction in progress at the buffer, the local credit check module 772 determines whether all asynchronous OUT credits are available at the target port. If not, the transaction fails the credit check and a reservation will be made, which is described in more detail with respect to FIG. 11. If the asynchronous OUT transaction in progress at the buffer is for the same endpoint, the local credit check module 772 determines whether there is at least one asynchronous OUT credit available for the target port. If so, the transaction passes the credit check.

If the transaction is an asynchronous IN transaction, the local credit check module 772 checks the IN endpoint active array 450 to determine whether there are any active IN endpoints on the target port. If so, the local credit check module 772 determines whether the active IN endpoint on the target port matches the endpoint associated with the transaction. If the active IN endpoint on the target port is the same endpoint involved with the transaction and the local credit check module 772 determines that there is at least one asynchronous IN credit available for the target port, the transaction passes the credit check. If the active IN endpoint on the target port is not the same endpoint involved with the transaction, the transaction fails the credit check.

If the transaction is a USB 2.0 periodic OUT transaction, the local credit check module 772 determines whether all periodic OUT credits are available at the target port. If not, the transaction fails the credit check (e.g., for USB 2.0 OUT transactions, the local credit check module 772 attempts to maintain burst integrity). If the transaction is a USB 3.0 periodic OUT transaction, the local credit check module 772 determines whether there is at least one periodic OUT credit available for the target port. If so, the transaction passes the credit check.

If the transaction is a USB 2.0 periodic IN transaction, the local credit check module 772 determines whether all periodic IN credits are available at the target port. If not, the transaction fails the credit check. Likewise, if the transaction is a USB 3.0 periodic IN transaction, the local credit check module 772 determines whether all periodic IN credits are available at the target port. If not, the transaction fails the credit check.

According to one embodiment, the periodic and asynchronous state machines 412 and 414 perform a credit check by sending a request to the credit check module 770, which returns a pass or fail indication after performing the appropriate credit check using the local credit check module 772 or the split credit check module 774. If the transaction does not involve a split transaction, a local credit check is performed using the local credit check module 772 as discussed above.

If the transaction involves a split transaction, a split credit check is performed using the split credit check module 774. According to one embodiment, the split credit check module 774 is incorporated within the encapsulator 146. For example, the credit check module 770 may issue a request to the split credit check module 774 to determine whether there is at least one available memory location in a transaction list (e.g., a list of transactions awaiting execution by the secondary scheduler 148 in FIG. 3). Additional details of performing a split credit check using a credit check module within the encapsulator 146 are described wither reference to FIG. 19 in U.S. application Ser. No. 13/032,240, filed Feb. 22, 2011, entitled "Method And Apparatus For Scheduling Transactions In A Multi-Speed Bus Environment," which is hereby incorporated by reference in its entirety. In certain embodiments, the encapsulator 146 and the split credit check module 774 are omitted (e.g., if the host controller 140 does not support split transactions). Thus, according to certain embodiments, a credit check may only involve performing a local credit check using the local credit check module 772.

Figure 9A:
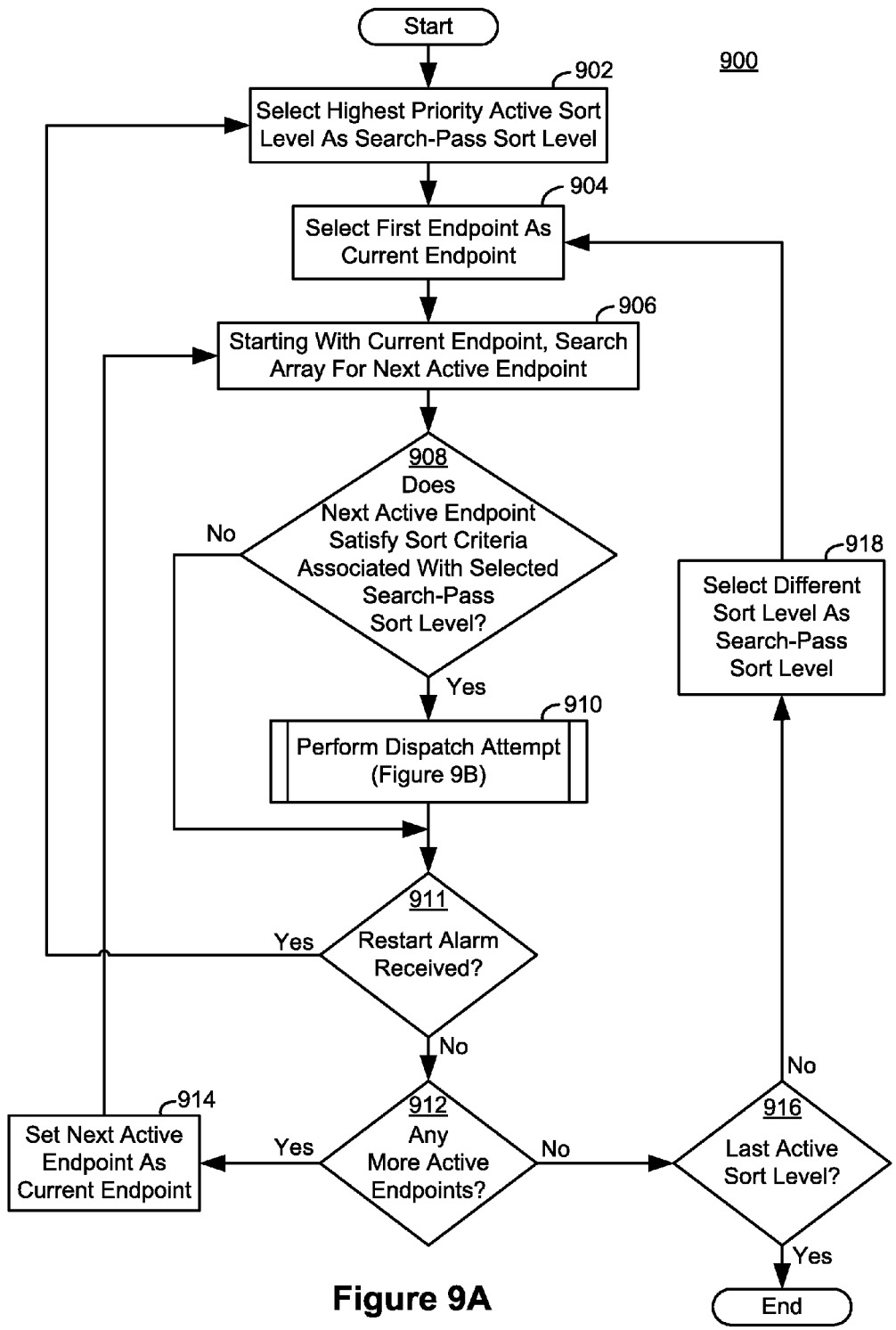
FIG. 9A is a flow chart of a method of servicing periodic endpoints included in an array of endpoints, according to one embodiment.

FIG. 9A is a flow chart of a method 900 of servicing periodic endpoints included in an array of endpoints (e.g., the active array 132), according to one embodiment. The periodic state machine 412 (FIG. 7) services active endpoints in the periodic active array 132 by making one or more search passes through the active array 132. Before dispatching a transaction to an active endpoint in the array 132, the periodic state machine 412 determines whether the active endpoint meets sort criteria associated with a particular search pass and determines whether the transaction passes a credit check. If the endpoint satisfies the sort criteria associated with the search pass but the transaction fails the credit check (e.g., due to insufficient port credits), the periodic state machine 412 marks the sort level as active and attempts to service other active endpoints. In response to receiving a trigger that port credits have freed from a blocked port, the periodic state machine 412 revisits the highest priority sort level that is active and attempts to service endpoints, including any endpoints that were previously skipped due to insufficient port credits.

At step 902, the periodic state machine 412 selects a highest priority active sort level as the sort level to process during a pass through the active array 132. According to one embodiment, the periodic state machine 412 accesses the active sort level array 750 and selects the highest priority sort level that is marked active. For example, if sort levels 0, 7, and 15 are marked active in the active sort level array 750, the periodic state machine 412 selects sort level 0 as the sort level to process during the pass through the active array 132 (assuming the lowest numerical sort level is the highest priority sort level). According to another embodiment, the periodic state machine 412 may simply start with sort level 0 and sequence through the sort levels one-by-one.

Attempting to service the highest priority sort levels first helps ensure that the active endpoints included in the array 132 do not miss their service intervals. For example, the active array 132 may include endpoints having a mix of service intervals, such a first endpoint having a service interval of once every sub-frame, a second endpoint having a service interval of once every eight sub-frames (e.g., every millisecond frame), and a third endpoint having a service interval of once every sixty-four sub-frames (e.g., once every eight millisecond frames). There may not be enough time to service all three endpoints in the first sub-frame (e.g., sub-frame $S_0$ in FIG. 10), so the endpoints having longer service intervals (e.g., lower priority sort levels), such as the third endpoint, can be serviced in a subsequent sub-frame without missing its service interval. In other words, the third endpoint will not miss its service interval as long as it is serviced within its sixty-four sub-frame window.

At step 904, the periodic state machine 412 selects the first endpoint (e.g., the endpoint corresponding to the element 720 in FIG. 7) in the active array 132 as the current endpoint. For example, the periodic state machine 412 may clear or set to zero the value in the current endpoint field 712. According to one embodiment, when the periodic state machine 412 performs a search pass for a particular sort level, the periodic state machine 412 marks the sort level as inactive (e.g., in the active sort level array 750). If the periodic state machine 412 does not service all of the active endpoints in the sort level, the periodic state machine 412 remarks the sort level as active (e.g., in the active sort level array 750). At step 906, starting with the current endpoint point, the search logic 710 searches the array 132 for the next active endpoint. For example, if the current endpoint field 712 stores a value corresponding to element 720, the search logic 710 finds or identifies the next active endpoint, which is the endpoint corresponding to element 723 in the array 132 illustrated in FIG. 7. After finding the next active endpoint, the search logic 710 may optionally store a value corresponding to element 723 in a next endpoint field.

The periodic state machine 412 determines at step 908 whether the next active endpoint satisfies the sort level criteria associated with the selected sort level for the search pass. For example, if the periodic state machine 412 is performing a search pass for sort level 0 in Table 3, above, (e.g., the highest priority sort level), the periodic state machine 412 may access the control memory 260 (FIG. 2) to determine whether the service interval associated with the next active endpoint meets the sort criteria for sort level 0 (e.g., the periodic state machine 412 will determine whether the endpoint's service interval is once every sub-frame, the transfer type associated with the endpoint is isochronous, and USB protocol associated with the endpoint is USB 2.0).

If it is determined at step 908 that the next active endpoint satisfies the sort level criteria, the method 900 proceeds to step 910 and the periodic state machine 412 performs a dispatch attempt. Additional details of performing a dispatch attempt according to one embodiment are described with reference to FIG. 9B. If, on the other hand, it is determined at step 908 that the next active endpoint does not satisfy the sort level criteria, the method 900 skips step 910 and proceeds to step 911. Steps 902, 904, 906, and 908 may be performed in any order or in parallel (e.g., at the same time).

At step 911, the periodic state machine 412 determines whether an alarm has been triggered indicating that the periodic state machine 412 should restart from the highest remaining active sort level. If it is determined at step 911 that the restart alarm (e.g., a credit free alarm) has been triggered, the method 900 proceeds to step 902 and the periodic state machine 412 selects a highest priority active sort level as the sort level to process during a pass through the active array 132. For example, the periodic state machine 412 may access the active sort level array 750 and select the highest priority sort level that is marked active. If sort levels 0, 7, and 15 were previously marked active in the active sort level array 750 and sort level 0 was marked inactive (e.g., transactions were dispatched to the active endpoints in sort level 0), for example, the periodic state machine 412 may select sort level 7 as the sort level to process during the pass through the active array 132. Before proceeding to step 902, the periodic state machine 412 may remark as active the sort level that was being processed (e.g., there still may be active endpoints in the sort level that need servicing). Step 911 may be performed before step 910, after step 910, or both. In certain embodiments, step 911 is omitted.

If it is determined at step 911 that the restart alarm has not been triggered, the method 900 proceeds to step 912 and the periodic state machine 412 determines whether there are any more active endpoints in the array 132. For example, the periodic state machine 412 may inspect the valid flag 716, which indicates whether there are any additional active endpoints in the array 132. If there is at least one additional active endpoint in the array, the method 900 may proceed to step 914 and the periodic state machine 412 sets the next active endpoint as the current endpoint. For example, the periodic state machine 412 may send a load flag (762) to the current endpoint field 712, which causes the next endpoint output 714 to be stored in the current endpoint field 712. After setting the next active endpoint as the current endpoint at step 914, the method 900 returns to step 906 and repeats steps 906 and 908. For example, starting with the new value stored in the current endpoint field 712 (e.g., a value corresponding to element 723), the search logic 710 identifies the next active element in the active array 132 at step 906 and the periodic state machine 412 determines whether the next active endpoint matches the sort criteria associated with the search pass at step 908. The loop formed by repeating steps 906, 908, 910, 911, 912, and 914 multiple times corresponds to performing a search pass through the active array 132.

If it is determined at step 912 that there are no additional active endpoints in the array, the method 900 proceeds to step 916. According to one embodiment, if the periodic state machine 412 services all active endpoints in the sort level, the sort level that was processed during the search pass is left marked inactive (e.g., a sort level pending flag associated with the sort level is left cleared in the active sort level array 750). According to another embodiment, if the periodic state machine 412 services all active endpoints in the sort level, the periodic state machine 412 may optionally mark the sort level for the search pass as complete (e.g., inactive) in the active sort level array 750. At step 916, the periodic state machine 412 determines whether to perform another search pass through the array 132 using a different set of sort criteria. For example, the periodic state machine 412 may access the active sort level array 750 and determine whether there are any other sort levels (e.g., lower priority sort levels) marked as active. If so, the periodic state machine 412 may perform another search pass.

If it is determined at step 916 to perform another search pass through the array 132 using a different set of sort criteria (e.g., the previous sort level was not the last active sort level), the method 900 proceeds to step 918 and the periodic state machine 412 selects a different sort level (e.g., the next highest priority sort level that is active) to process during the next pass through the active array 132. For example, if sort levels 0, 7, and 15 were previously marked as active in the active sort level array 750 and the periodic state machine 412 has already performed a search pass for sort level 0, the periodic state machine 412 may select sort level 7 as the sort level to process during the next pass through the active array 132.

If it is determined at step 916 that another search pass through the array 132 using a different set of sort criteria should not be performed (e.g., the previous sort level was the last active sort level), the method 900 ends. For example, the periodic state machine 412 may have already serviced all of the active endpoints in the array 132 (e.g., the done and ping done fields 514 and 516 (FIG. 5A) for all of the endpoints may all be set to "0") and the periodic state machine 412 may be waiting for a new sub-frame boundary. By way of another example, the periodic state machine 412 may be waiting for one or more port credits to free. After the method 900 ends, the asynchronous state machine 414 may be given an opportunity to service active asynchronous endpoints.

Figure 9B:
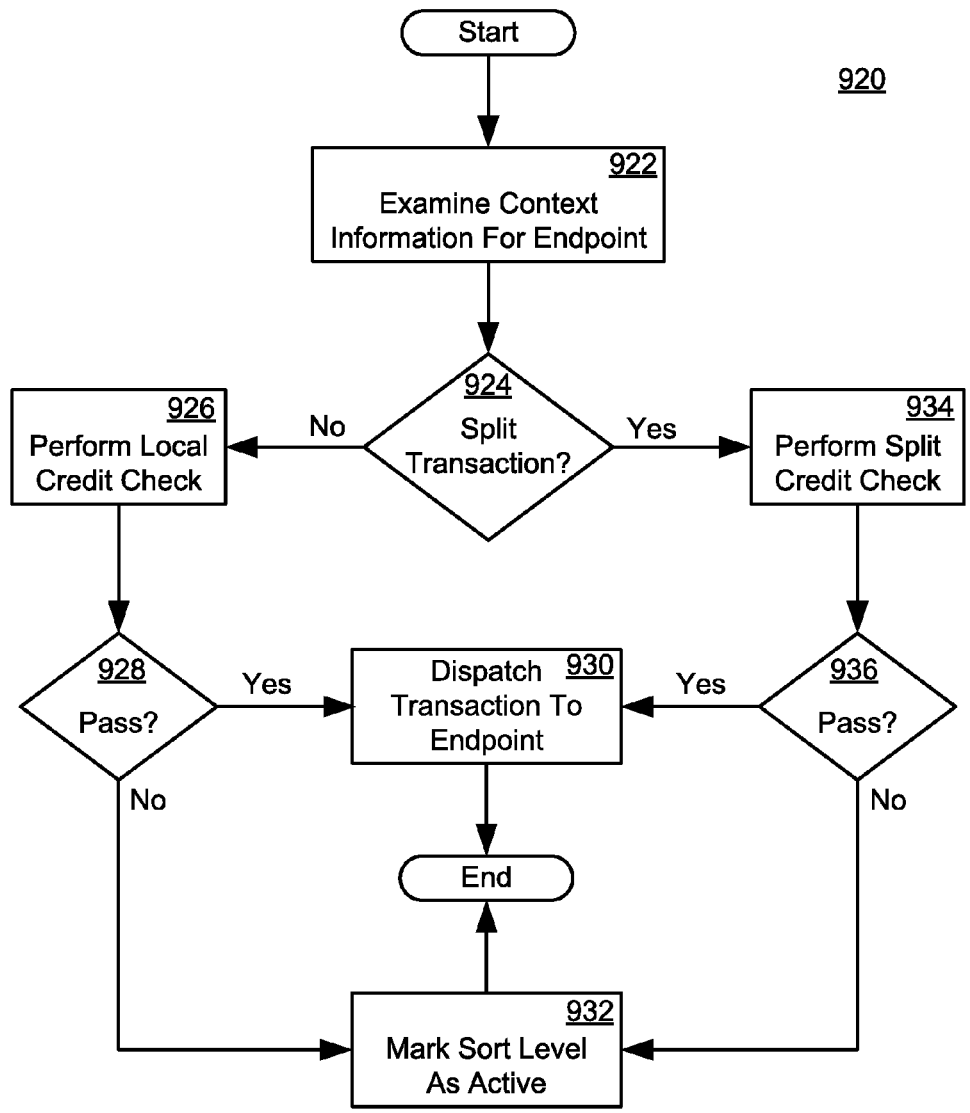
FIG. 9B is a flow chart of a method of performing a dispatch attempt, according to one embodiment.

FIG. 9B is a flow chart of a method 920 of performing a dispatch attempt, according to one embodiment. The method 920 may be performed, for example, if it is determined at step 908 in FIG. 9A that the next active endpoint satisfies the sort level criteria. At step 922, the method 920 examines context information for the endpoint (e.g., the next active endpoint identified at step 906 in FIG. 9A). For example, the credit check module 770 (FIG. 8) or the primary scheduler 130 may access the control memory 260 (FIG. 2) to gather information about the endpoint that will be used to perform a credit check, such as the root hub number (e.g., a value specifying the root hub port number to which the endpoint is connected), endpoint direction (e.g., IN or OUT), speed (e.g., full-speed, low-speed, high-speed, or super-speed), endpoint type (e.g., interrupt or isochronous), maximum packet size, packet burst and multiplier, and an indication of whether the transaction involves a split transaction (and, if the transaction involves a split transaction, the hub address, hub port number, and multi-TT indicator, which may be used to perform a lookup in the identifier memory 331 of FIG. 3). At step 924, the method 920 determines whether the endpoint should be serviced by a split transaction. For example, the credit check module 770 may determine whether the endpoint specific information stored in the control memory 260 includes an indication that the endpoint should be serviced using split transactions. Steps 922 and 924 may be performed in any order or in parallel (e.g., at the same time).

If it is determined at step 924 that the endpoint should not be serviced using a split transaction, the method 920 proceeds to step 926 and a local credit check is performed as described with reference to FIG. 8, for example. If it is determined that the transaction passed the credit check at step 928, the periodic state machine 412 dispatches, at step 930, a transaction to the endpoint by, for example, sending a request to the transfer manager 220 to service the endpoint. If, on the other hand, it is determined that the transaction failed the credit check at step 928, the sort level associated with the search pass is marked as active (e.g., incomplete) at step 932. For example, the periodic state machine 412 may access the active sort level array 750 and mark the sort level associated with the search pass (i.e., the search pass that was being performed when method 920 was initiated after step 908 in FIG. 9A) with an indication that the sort level still has active endpoints that need servicing. After the sort level is marked as active at step 932 or a transaction is dispatched to the endpoint at step 930, the method 920 ends. The method 900 (FIG. 9A) may then resume at step 912 so that the periodic state machine 412 can process other active endpoints in the array 132 (e.g., using the same sort criteria) or perform another pass through the array 132 using a different set of sort criteria (e.g., process the array 132 using sort criteria associated with a lower priority sort level).

If it is determined at step 924 that the endpoint should be serviced using a split transaction, the method 920 proceeds to step 934 and a split credit check is performed as described with reference to FIG. 8. If it is determined that the transaction passed the credit check at step 936, the periodic state machine 412 dispatches, at step 930, a transaction to the endpoint by, for example, sending a request to the transfer manager 220 to service the endpoint. If, on the other hand, it is determined that the transaction failed the credit check at step 936, the sort level associated with the search pass is marked as incomplete at step 932. According to certain embodiments, steps 924, 934, and 936 may be omitted.

Referring again to FIG. 9A, after one or more port credits free from a blocked port, the credit free trigger 780 will be asserted (e.g., from the credit check module 770) and method 900 (FIG. 9A) may be performed again starting with step 902. For example, the periodic state machine 412 may access the active sort level array 750 and select the highest priority sort level that is marked active. If, for example, sort levels 0, 7, and 15 were previously marked as active in the active sort level array 750 and the periodic state machine 412 serviced all active endpoints in sort level 0 and 15 but was not able to service an endpoint in sort level 7 (e.g., due to insufficient port credits), sort level 7 should still be marked as active and the periodic state machine 412 would select sort level 7 as the sort level to process during the pass through the active array 132. The method 900 (FIG. 9A) and the method 920 (FIG. 9B) return to step 902 in FIG. 9A after the credit free trigger 780 is received. In other words, after the periodic state machine 412 receives the credit free trigger 780, the method 900 may return to step 902 from any one of step 902-918 and the method 920 may return to step 902 from any one of step 924-936.

Figure 10:
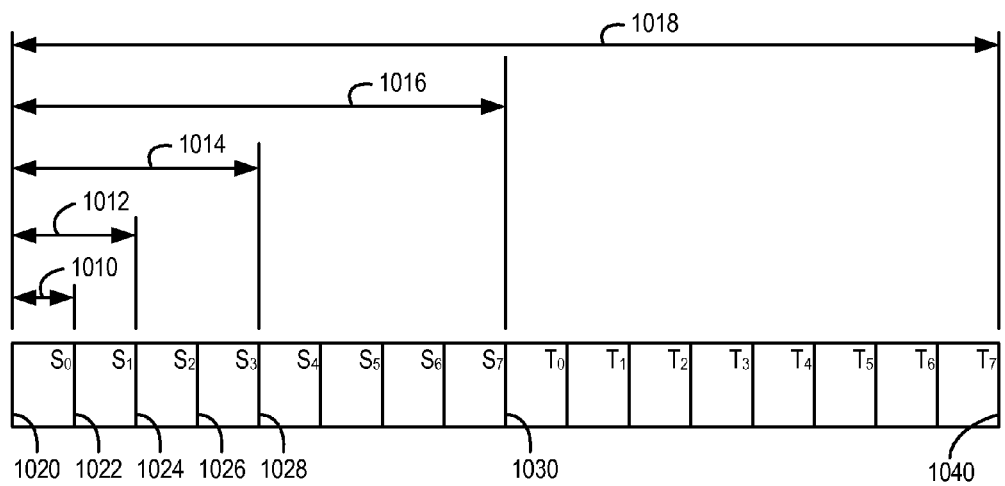
FIG. 10 is a diagram illustrating example service intervals and sub-frame boundaries.

FIG. 10 is a diagram illustrating example service intervals 1010-1018 and sub-frame boundaries 1020-1028. In FIG. 10, each block $S_0$-$S_7$ and $T_0$-$T_7$ represents a sub-frame or microframe that is separated by a sub-frame boundary (e.g., sub-frame boundaries 1020-1028). According to one embodiment, each block represents a 125 microsecond (μsec) block of time aligned with a start of frame, such as a USB start of frame (SOF). A USB SOF is the first transaction in each millisecond frame interval and microframe interval and allows endpoints to identify the start of the millisecond frame or microframe. Because eight sub-frame or microframe intervals may comprise a millisecond frame interval, sub-frame boundaries 1030 and 1040 may also be considered frame boundaries. According to one embodiment, the subscripted number noted on the sub-frame blocks represents the lowest three bits of a sub-frame counter value (e.g., the frame index 440 in FIG. 4). For example, for sub-frame $S_5$, the subscripted "5" represents the lowest three bits of the sub-frame counter value of 0101, as illustrated in Table 4.

TABLE 4

| Bit 3 | Bit 2 | Bit 1 | Bit 0 | Sub-frame |
|---|---|---|---|---|
| 0 | 0 | 0 | 0 | $S_0$ |
| 0 | 0 | 0 | 1 | $S_1$ |
| 0 | 0 | 1 | 0 | $S_2$ |
| 0 | 0 | 1 | 1 | $S_3$ |
| 0 | 1 | 0 | 0 | $S_4$ |
| 0 | 1 | 0 | 1 | $S_5$ |
| 0 | 1 | 1 | 0 | $S_6$ |
| 0 | 1 | 1 | 1 | $S_7$ |
| 1 | 0 | 0 | 0 | $T_0$ |
| 1 | 0 | 0 | 1 | $T_1$ |
| 1 | 0 | 1 | 0 | $T_2$ |
| 1 | 0 | 1 | 1 | $T_3$ |
| 1 | 1 | 0 | 0 | $T_4$ |
| 1 | 1 | 0 | 1 | $T_5$ |
| 1 | 1 | 1 | 0 | $T_6$ |
| 1 | 1 | 1 | 1 | $T_7$ |

As discussed with reference to FIGS. 7, 9A, and 9B, a first service pass may be initiated after the periodic state machine 412 receives a sub-frame boundary trigger 730 (e.g., after the frame index 440 in FIG. 4 increments to a new sub-frame). Thus, a first service pass may be initiated as soon as possible after each of the sub-frame boundaries 1020-1028.

FIG. 10 also illustrates several example service intervals 1010-1018. The service interval 1010 illustrates a service interval of once every sub-frame, the service interval 1012 illustrates a service interval of once every 2 sub-frames, the service interval 1014 illustrates a service interval of once every 4 sub-frames, the service interval 1016 illustrates a service interval of once every 8 sub-frames (e.g., once every frame), and the service interval 1018 illustrates a service interval of once every 16 sub-frames (e.g., once every 2 frames). Each periodic bound of a service interval may be defined by a shift and mask of the sub-frame counter. For example, for the service interval 1012, a new service interval may be identified every time bit 0 of the sub-frame counter is "0". By way of another example, for the service interval 1014, a new service interval may be identified every time bits 1 and 0 of the sub-frame counter are "00".

Figure 11:
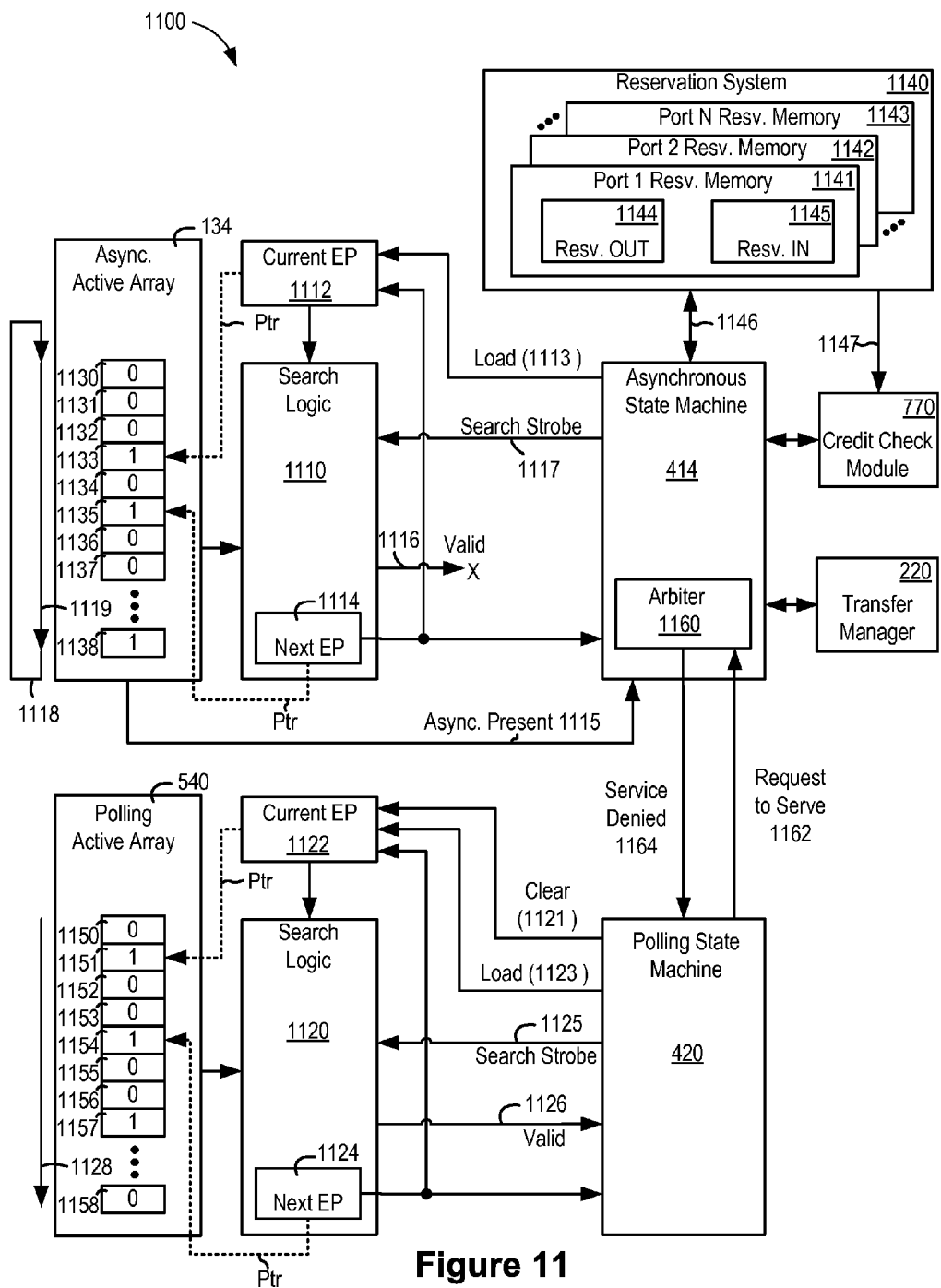
FIG. 11 is block diagram illustrating the interaction between an asynchronous state machine, asynchronous search logic, an asynchronous active array, a polling state machine, polling search logic, and a polling active array that facilitate scheduling and dispatching non-periodic transactions to device endpoints, according to one embodiment.

FIG. 11 is block diagram of a system 1100 that schedules and dispatches asynchronous transactions to device endpoints, according to one embodiment. The system 1100 includes the asynchronous state machine 414, the asynchronous active array 134, and search logic 1110. The system 1100 also includes the polling state machine 420, the asynchronous polling active array 540, and search logic 1120. The polling state machine 420 may be used to resend asynchronous transactions at a slower rate. For example, if a transaction is sent to an endpoint and the endpoint responds with a negative acknowledgment (NAK) handshake, the polling state machine 420 may service that endpoint (instead of the asynchronous state machine 414) and attempt to resend the transaction at a slower pace.

The asynchronous active array 134 includes a plurality of elements 1130-1138, each of which stores an indication of whether an endpoint corresponding to the element is active. According to a preferred embodiment, the array 134 includes an element corresponding to each the endpoints in the asynchronous state memory 432 (FIGS. 4 and 5B). Thus, if the asynchronous state memory 432 is sized to store state fields for 1,024 endpoints, the array 134 may include 1,024 elements. The array 134 illustrated in FIG. 11 includes active elements 1133, 1135, and 1138 and inactive elements 1130-1132, 1134, 1135, and 1137. As described with reference to FIG. 5B, the pending field 530, the mask field 532, and the polling field 534 are used to determine the value of a bit stored in the elements 1130-1138, according to one embodiment. Thus, the value of the bits stored in the pending field 530, the mask field 532, and the polling field 534 determine whether a corresponding element in the active array 134 is active.

The array 134 is input into the search logic 1110 along with a current endpoint field 1112. The current endpoint field 1112 stores a value pointing to one of the elements in the array 134. For example, as illustrated in FIG. 11, the current endpoint field 1112 is storing a value pointing to element 1133 in the array 134. Using the value stored in the current endpoint field 1112, the search logic 1110 is configured to search the array 134 for the next active element in the array 134. The next active element found or identified by the search logic 1110, which is depicted as a next endpoint output 1114, is output to the asynchronous state machine 414. As illustrated in FIG. 11, the current endpoint field 1112 is storing a value pointing to element 1133 in the array 134 and the next endpoint output 1114 is pointing to element 1135, which is the next active element in the array 134 identified by the search logic 1110. The search logic 1110 traverses the array 134 in a round-robin manner. In other words, the search logic 1110 keeps cycling through the array 134 until there are no more active endpoints, which is conceptually illustrated by arrows 1118 and 1119.

The asynchronous state machine 414 sends a search strobe 1117 to the search logic 1110 to initiate a search. Because the search logic 1110 traverses the array 134 in a round-robin manner, any endpoint may be set as the current endpoint when a search is initiated. Starting with the value stored in the current endpoint field 1112, the search logic 1110 searches the array 134 for the next active element, which is output to the asynchronous state machine 414. The asynchronous state machine 414 examines the next active element found by the search logic 1110 and determines whether an endpoint corresponding to the next active element satisfies predetermined dispatch criteria (e.g., a port credit check and a reservation system). If the endpoint satisfies the predetermined dispatch criteria, the asynchronous state machine 414 dispatches a transaction to the endpoint by, for example, sending a request to the transfer manager 220 to service the endpoint. In other words, the asynchronous state machine 414 effects dispatch of a transaction if the endpoint satisfies the predetermined dispatch criteria. After the asynchronous state machine 414 examines the next active element found by the search logic 1110 and possibly dispatches a transaction, the asynchronous state machine 414 sends a load flag 1113 to the current endpoint field 1112, which causes the next active element found by the search logic 1110 (e.g., the next endpoint output 1114) to be stored in the current endpoint field 1112. Starting with the new value stored in the current endpoint field 1112, the search logic 1110 identifies the next active element in the array 134 and the asynchronous state machine 414 examines that element and determines whether to dispatch a transaction to the corresponding endpoint.

If the search logic 1110 reaches the end of the array 134 (e.g., element 1138), the search logic 1110 continues searching at the beginning of the array 134 (e.g., element 1130). The asynchronous active array 134 provides an asynchronous present output 1115 to the asynchronous state machine 414 to indicate whether there are any active endpoints in the array 134. For example, all of the elements 1130-1138 may be compared to see if any elements are active (e.g., each of the elements 1130-1138 may be coupled to an OR gate, the output of which is coupled to the asynchronous state machine 414). According to one embodiment, a valid flag 1116 (e.g., indicating that no additional active endpoints were found in the array 134) is not coupled to the asynchronous state machine 414.

A reservation system 1140 is coupled to the asynchronous state machine 414. The reservation system 1140 allows the asynchronous state machine 414 to make a reservation for an endpoint if, for example, the transaction fails a credit check (e.g., there are not sufficient port credits to accommodate the transaction). Allowing reservations to be made for endpoints helps ensure that each endpoint has an equal chance of being serviced. According to one embodiment, the reservation system 1140 includes a reservation memory or register for each port. For example, a reservation memory 1141 is associated with port 1 (e.g., port 820 in FIG. 8), a reservation memory 1142 is associated with port 2 (e.g., port 830 in FIG. 8), and a reservation memory 1143 is associated with port N (e.g., port 840 in FIG. 8).

Each of the reservation memories 1141-1143 may include one or more reservation elements. For example, the reservation memory 1141 includes a reservation element 1144 for an asynchronous OUT transactions on port 1 and a reservation element 1145 for an asynchronous IN transactions on port 1. The reservation elements 1144 and 1145 are configured to store an indication that a reservation has been made for a respective asynchronous OUT or IN transaction on port 1 along with an endpoint ID of the endpoint that holds the reservation. The asynchronous state machine 414 may make and clear (1146) a reservation for an endpoint in the reservation system 1140 (e.g., by storing an endpoint ID for the endpoint in an appropriate reservation element or deleting an endpoint ID for the endpoint from an appropriate reservation element). The reservation memories 1141-1143 may include additional or fewer reservation elements. For example, the reservation memories 1141-1143 may include a reservation element for the asynchronous IN and OUT buffers 351 and 352 in the USB 3.0 interface 350 of FIG. 3 and the asynchronous IN and OUT buffers 371 and 372 in the USB 2.0/1.x interface 370 of FIG. 3. Moreover, the reservation memories 1141-1143 may include a reservation element for the split transaction buffers 375 and 376 in FIG. 3. The reservation register 1140 may be implemented in any suitable machine readable medium, such as registers (flip-flops or latches), RAM, flash memory, and EEPROM.

Before dispatching a transaction to the endpoint, the asynchronous state machine 414 performs a credit check to determine whether a port associated with the endpoint has sufficient port credits. For example, the asynchronous state machine 414 may send a request to the credit check module 770, which performs a split credit check via a split credit check module 774 if the transaction involves a split transaction or a local credit check via a local credit check module 772 if the transaction does not involve a split transaction. The credit check module 770 may also monitor the reservation system 1140 to determine whether a port associated with the endpoint has a reservation (e.g., for another endpoint). For example, the credit check module 770 may access (1147) an appropriate port reservation memory (e.g., reservation elements 1144 and 1145 depending on whether the transaction is an IN or OUT transaction) in the reservation system 1140 and determine whether a reservation has been made for the target port. If a reservation has been made for the target port for a different endpoint, the credit check module 770 may return a credit check failure notification to the asynchronous state machine 414. Additional details of performing a credit check are described with reference to FIG. 8.

If a second endpoint is blocked because, for example, the port credits are used by a first endpoint, the asynchronous state machine 414 may make a reservation for the second endpoint (e.g., by storing an endpoint ID for the second endpoint in an appropriate reservation element). Because the second endpoint holds a reservation for that port, the asynchronous state machine 414 will not dispatch transactions to that port for other endpoints. Thus, if the asynchronous state machine 414 loops through the active array and comes back to the first endpoint, the asynchronous state machine 414 will skip servicing the first endpoint because the second endpoint holds a reservation for the port. According to one embodiment, if the asynchronous state machine 414 comes back to the second endpoint (which holds the reservation) but the buffer has not fully drained, the asynchronous state machine 414 will keep looping through the active array (e.g., active array 134) until the buffer is fully drained. After the buffer is drained and the asynchronous state machine 414 comes back to the second endpoint, the asynchronous state machine 414 will dispatch transactions for the second endpoint.

By way of example, if the first and second endpoints both involve asynchronous OUT transactions for port 1 and the first endpoint fills up the asynchronous OUT buffer, an endpoint ID for the second endpoint is stored in reservation element 1144 to make a reservation for the second endpoint. Because the second endpoint holds a reservation for the buffer associated with the reservation element 1144, that buffer is allowed to fully drain before the asynchronous state machine 414 is allowed to send any more data to that buffer. Allowing the buffer to drain before allowing the second endpoint to fill it helps ensure that each endpoint has a chance to send or receive an equal number of transactions. For example, if the first endpoint filled the buffer with four transactions and only one transaction has been drained from the buffer when the asynchronous state machine 414 attempts to service the second endpoint, the second endpoint would only be able to send one transaction to that buffer before running out of port credits. Thus, according to one embodiment, when the asynchronous state machine 414 is switching between endpoints on a buffer, the buffer is allowed drain before servicing the other endpoint. If the second endpoint does not hold a reservation for the buffer, the asynchronous state machine 414 can keep sending transaction for the first endpoint to the port. For example, if the first endpoint filled the buffer with four transactions and two transactions have been drained from the buffer when the asynchronous state machine 414 attempts to service the first endpoint again, the asynchronous state machine 414 can send to that buffer two more transactions for the first endpoint.

By way of another example, if there were three endpoints and the first endpoint filled up the buffer, the second and third endpoints are blocked from sending transactions to that buffer. When the asynchronous state machine 414 attempts to service the second endpoint, a reservation can be made for the second endpoint without sending any transactions to the second endpoint. When the asynchronous state machine 414 attempts to service the third endpoint, the asynchronous state machine 414 skips servicing the third endpoint without making a reservation (because the second one already has a reservation). The asynchronous state machine 414 can then keep looping through the active array until the buffer has a chance to drain. After the buffer has drained and the asynchronous state machine 414 revisits the second endpoint (which holds a reservation), the asynchronous state machine 414 can fill the buffer with transactions for the second endpoint and clear the reservation for the second endpoint. When the asynchronous state machine 414 attempts to service the third endpoint, a reservation can be made for the third endpoint (because the reservation for the second endpoint has been cleared) without sending any transactions to the third endpoint. The asynchronous state machine 414 can then keep looping through the active array until the buffer has a chance to drain before servicing the third endpoint. After the asynchronous state machine 414 services the third endpoint and clears its reservation, the asynchronous state machine 414 can loop back around to the first endpoint and make a reservation for the first endpoint (because the reservation for the third endpoint has been cleared) without sending any transactions to the first endpoint. Thus, to help ensure that each endpoint has an equal chance to be serviced, the asynchronous state machine 414 can keep cycling through the active array in round-robin fashion and each time the asynchronous state machine 414 discovers a contention of port resources, the asynchronous state machine 414 can create a reservation.

According to one embodiment, the system 1100 also includes the polling state machine or controller 420, the asynchronous polling active array 540, and search logic 1120. The polling state machine 420, the asynchronous polling active array 540, and search logic 1120 may be omitted in certain embodiments. The polling active array 540 includes a plurality of elements 1150-1158, each of which stores an indication of whether an endpoint corresponding to the element is active. According to a preferred embodiment, the array 540 includes an element corresponding to each the endpoints in the asynchronous state memory 432 (FIGS. 4 and 5B). Thus, if the asynchronous state memory 432 is sized to store state fields for 1,024 endpoints, the array 540 may include 1,024 elements. The array 540 illustrated in FIG. 11 includes active elements 1151, 1154, and 1157 and inactive elements 1150, 1152-1153, 1155-1156, and 1158. As described with reference to FIG. 5B, the pending field 530, the mask field 532, and the polling field 534 are used to determine the value of a bit stored in the elements 1150-1158, according to one embodiment. Thus, the value of the bits stored in the pending field 530, the mask field 532, and the polling field 534 determine whether a corresponding element in the array 540 is active.

The array 540 is input into the search logic 1120 along with a current endpoint field 1122. The current endpoint field 1122 stores a value pointing to one of the elements in the array 540. For example, as illustrated in FIG. 11, the current endpoint field 1122 is storing a value pointing to element 1151 in the array 540. Using the value stored in the current endpoint field 1122, the search logic 1120 is configured to search the array 540 for the next active element in the array 540. The next active element found or identified by the search logic 1120, which is depicted as a next endpoint output 1124, is output to the polling state machine 420. As illustrated in FIG. 11, the current endpoint field 1122 is storing a value pointing to element 1151 in the array 540 and the next endpoint output 1124 is pointing to element 1154, which is the next active element in the array 540 identified by the search logic 1120. At the start of a new search, the value in the current endpoint field 1122 is set to zero and the search logic 1120 finds or identifies the first active element in the array 540, which is depicted in the next endpoint output 1124.

The polling state machine 420 sends a search strobe 1125 to the search logic 1120 to initiate a search. Before performing a search iteration through the polling array 540, the polling state machine 420 clears (1121) the value in the current endpoint field 1122 (e.g., sets the current endpoint field 1122 to zero). The search logic 1120 finds or identifies the next active element in the polling active array 540. The polling state machine 420 examines the next active element found by the search logic 1120 and sends a request for service (1162) to an arbiter 1160 included in the asynchronous state machine 414, which attempts to dispatch the transaction. According to one embodiment, the arbiter 1160 switches between serving requests from the asynchronous state machine 414 and the polling state machine 420 in an alternating fashion. Before dispatching a transaction to the endpoint, the asynchronous state machine 414 performs a credit check to determine whether a port associated with the endpoint has sufficient port credits. For example, the asynchronous state machine 414 may send a request to the credit check module 770, which performs a split credit check via a split credit check module 774 if the transaction involves a split transaction or a local credit check via a local credit check module 772 if the transaction does not involve a split transaction. Additional details of performing a credit check are described with reference to FIG. 8. If the transaction passes the credit check, the asynchronous state machine 414 dispatches a transaction to the endpoint by, for example, sending a request to the transfer manager 220 to service the endpoint. If the transaction fails the credit check, the arbiter 1160 sends a notification to the polling state machine 420 indicating that service was denied (1164) and the transaction could not be dispatched. According to one embodiment, the asynchronous state machine 414 does not make a reservation for the endpoint for which service was denied (e.g., the transactions being serviced from the polling active array 540 are lower priority than the transactions being serviced from the asynchronous active array 134). Other embodiments allow reservations to be made for polling endpoints. For example, a separate set of polling reservation memories may be provided so that the polling state machine 420 can make reservations for blocked ports and an arbiter may be provided to help ensure fairness between asynchronous and polling reservations (e.g., alternating between asynchronous and polling reservations).

After the polling state machine 420 examines the next active element found by the search logic 1120 and a transaction is dispatched (or the polling state machine 420 receives an indication that service was denied), the polling state machine 420 sends a load flag 1123 to the current endpoint field 1122, which causes the next active element found by the search logic 1120 (e.g., the next endpoint output 1124) to be stored in the current endpoint field 1122. Starting with the new value stored in the current endpoint field 1122, the search logic 1120 identifies the next active element in the array 540 and the polling state machine 1120 examines that element and sends a request for service (1162) to an arbiter 1160. In one embodiment, when the credit check fails a polling request, the polling state machine 420 simply re-requests the endpoint until it gets executed. This may help ensure that no polling endpoint gets left behind and helps eliminate the need for polling reservations. According to another embodiment, polling reservations are utilized. Polling reservations may help improve efficiency and reliability, but may consume more resources.

The search logic 1120 continues to sequence through the active endpoints in the array 540 until no additional active endpoints are found in the remainder of the array. If the search logic 1120 reaches the end of the active array (e.g., element 1158) and does not find any additional active endpoints, the search logic 1120 outputs to the polling state machine 420 a valid flag 1126 indicating no additional active endpoints were found in the array 540. According to one embodiment, the search logic 1120 walks through the array 540 in order. In other words, the search logic 1120 starts at the beginning of the array 540 with element 1150 and traverses the elements in order until the last active element is found, which is conceptually illustrated by arrow 1128.

The search logic 1110 and 1120 comprise multi-cycle priority encoders, according to one embodiment. Because the arrays 134 and 540 may contain a relatively large number of elements, the search logic 1110 and 1120 may process the elements in multiple cycles instead of processing the elements in a single cycle (which may take too long with a large number of elements). For example, if the array 134 and 540 include 1,024 elements, the search logic 1110 and 1120 may process elements in two cycles (e.g., the search logic may process 32 elements in parallel and perform a final stage of 32).

Figure 12A:
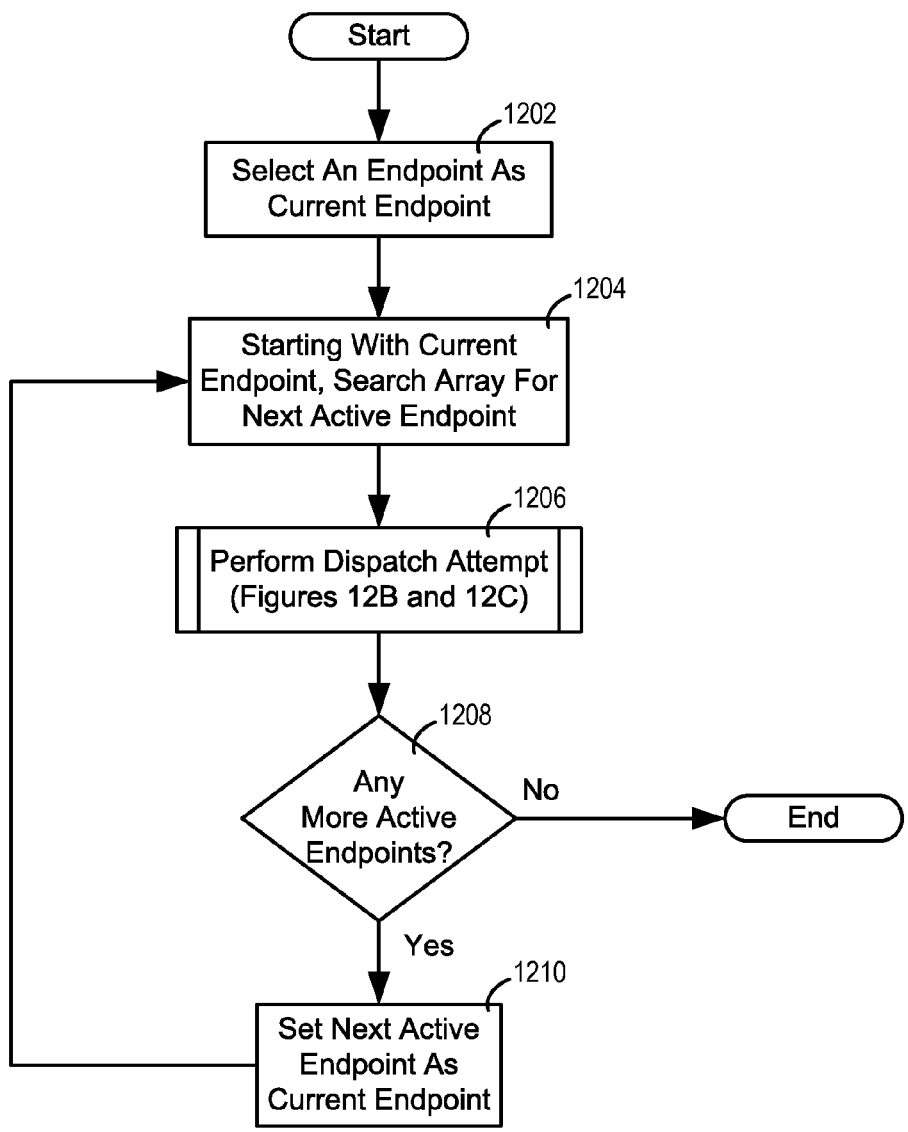
FIG. 12A is a flow chart of a method of servicing non-periodic endpoints included in an array of endpoints, according to one embodiment.

FIG. 12A is a flow chart of a method 1200 of servicing non-periodic endpoints included in an array of endpoints, according to one embodiment. The asynchronous state machine 414 (FIG. 11) services active endpoints in the asynchronous active array 134 in a round-robin manner and utilizes a reservation system to help ensure scheduling fairness between endpoints. Before the method 1200 begins, the asynchronous state machine 414 may determine whether there is at least one active endpoint in the active array 134. For example, the asynchronous state machine 414 may examine the asynchronous present output 1115 to determine whether there are any active endpoints in the array 134.

At step 1202, the asynchronous state machine 414 selects one of the endpoints in the active array 134 as the current endpoint. Because the search logic 1110 traverses the array 134 in a round-robin manner, any endpoint may be set as the current endpoint. According to one embodiment, the asynchronous state machine 414 may clear or set to zero the value in the current endpoint field 1112. Other embodiments may select a random number for the current endpoint field 1112. At step 1204, starting with the current endpoint point, the search logic 1110 searches the array 134 for the next active endpoint. For example, if the current endpoint field 712 stores a value corresponding to element 1133, the search logic 1110 finds or identifies the next active endpoint, which is the endpoint corresponding to element 1135 in the array 134 illustrated in FIG. 11. After finding the next active endpoint, the search logic 1110 may optionally store a value corresponding to element 1135 in a next endpoint field.

After finding the next active endpoint, the method 1200 proceeds to step 1206 and the asynchronous state machine 414 performs a dispatch attempt. Additional details of performing a dispatch attempt are described with reference to FIGS. 12B and 12C. Steps 1202, 1204, and 1206 may be performed in any order or in parallel (e.g., at the same time). At step 1208, the asynchronous state machine 414 determines whether there are any more active endpoints in the array 134. For example, the asynchronous state machine 414 may inspect the asynchronous present output 1115, which indicates whether there are any active endpoints in the array 134. If there is at least one additional active endpoint in the array, the method 1200 proceeds to step 1210 and the asynchronous state machine 414 sets the next active endpoint as the current endpoint. After setting the next active endpoint as the current endpoint at step 1210, the method 1200 returns to step 1204 and repeats steps 1204, 1206, and 1208. For example, starting with the new value stored in the current endpoint field 1112 (e.g., a value corresponding to element 1135), the search logic 1110 identifies the next active element in the array 134 at step 1204 and the asynchronous state machine 414 performs a dispatch attempt at step 1206. The method 1200 repeats steps 1204, 1206, 1208, and 1210 until there are no more active endpoints in the array 134. If it is determined at step 1208 that there are no additional active endpoints in the array, the method 1200 ends.

Figure 12B:
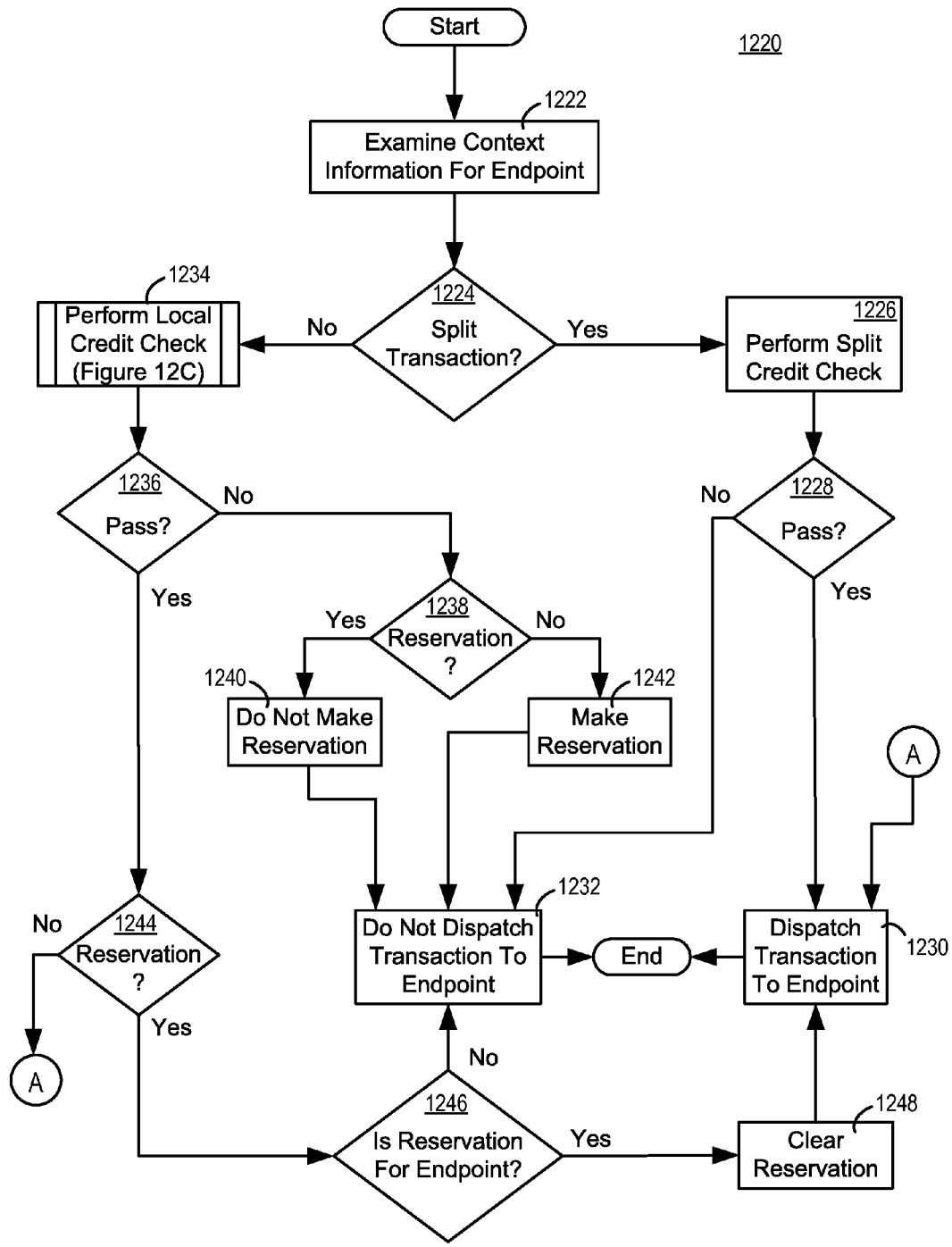
FIG. 12B is a flow chart of a method of performing a dispatch attempt, according to one embodiment.

FIG. 12B is a flow chart of a method 1220 of performing a dispatch attempt, according to one embodiment. The method 1220 may be performed, for example, after step 1204 in FIG. 12A. At step 1222, the method 1220 examines context information for the endpoint (e.g., the next active endpoint identified at step 1204 in FIG. 12A). For example, the credit check module 770 (FIG. 8) or the primary scheduler 130 may access the control memory 260 (FIG. 2) to gather information about the endpoint that will be used to perform a credit check, such as the root hub number (e.g., a value specifying the root hub port number to which the endpoint is connected), endpoint direction (e.g., IN or OUT), speed (e.g., full-speed, low-speed, high-speed, or super-speed), maximum packet size, packet burst and multiplier, and an indication of whether the transaction involves a split transaction (and, if the transaction involves a split transaction, the hub address, hub port number, and multi-TT indicator, which may be used to perform a lookup in the identifier memory 331 of FIG. 3). At step 1224, the method 1220 determines whether the endpoint should be serviced by a split transaction. For example, the credit check module 770 may determine whether the endpoint specific information stored in the control memory 260 includes an indication that the endpoint should be serviced using split transactions.

If it is determined at step 1224 that the endpoint should be serviced using a split transaction, the method 1220 proceeds to step 1226 and a split credit check is performed as described with reference to FIG. 8. If it is determined that the transaction passed the credit check at step 1228, the asynchronous state machine 414 dispatches, at step 1230, a transaction to the endpoint by, for example, sending a request to the transfer manager 220 to service the endpoint. If, on the other hand, it is determined that the transaction failed the credit check at step 1228, the method 1220 proceeds to step 1232 and a transaction is not dispatched to the endpoint. After a transaction is dispatched at step 1230 or not dispatched at step 1232, the method 1220 ends. The method 1200 (FIG. 12A) may then resume at step 1208 so that the asynchronous state machine 414 can process other active endpoints in the array 134. According to certain embodiments, steps 1224, 1226, and 1228 may be omitted.

If it is determined at step 1224 that the endpoint should not be serviced using a split transaction, the method 1220 proceeds to step 1234 and a local credit check is performed. Any suitable method of performing a local credit check may be used to ensure that the buffers associated with the target do not overflow. Additional details of performing a local credit check according to one embodiment are described with reference to FIG. 12C. Other examples of performing credit checks for asynchronous transactions are described with reference to FIG. 8. If it is determined at step 1236 that the transaction failed the credit check, the method proceeds to step 1238 and the asynchronous state machine 414 determines whether a reservation has been made for the port associated with the transaction. For example, the asynchronous state machine 414 may access an appropriate port reservation memory (e.g., reservation elements 1144 and 1145 in FIG. 11 depending on whether the transaction is an IN or OUT transaction) in the reservation system 1140 and determine whether a reservation has been made for the target port. If a reservation has been made for the target port, the method proceeds to step 1240 and another reservation is not made. If, on the other hand, a reservation has not been made for the target port, the method proceeds to step 1242 and a reservation for the target port is made for the endpoint. For example, if the transaction is an asynchronous OUT transaction destined for port 1, the asynchronous state machine 414 may store an endpoint ID for the endpoint in reservation element 1144 to make a reservation for the endpoint. After step 1240 or 1242 is performed, the method 1220 proceeds to step 1232 and a transaction is not dispatched to the endpoint.

If it is determined at step 1236 that the transaction passed the credit check, the method 1220 proceeds to step 1244 and the asynchronous state machine 414 determines whether a reservation has been made for the port associated with the transaction. For example, the asynchronous state machine 414 may access an appropriate port reservation memory (e.g., reservation elements 1144 and 1145 depending on whether the transaction is an IN or OUT transaction) in the reservation system 1140 and determine whether a reservation has been made for the target port. If a reservation has not been made for the target port, the method 1220 proceeds to step 1230 and the asynchronous state machine 414 dispatches a transaction to the endpoint by, for example, sending a request to the transfer manager 220 to service the endpoint. If, on the other hand, a reservation has been made for the target port, the method 1220 proceeds to step 1246 and it is determined whether the reservation is for the endpoint. For example, the asynchronous state machine 414 may compare the endpoint ID associated with the endpoint to the endpoint ID of the endpoint that holds the reservation, which may be stored in the port reservation memory. If the reservation is not for the endpoint (i.e., another endpoint holds a reservation for the target port), the method 1220 proceeds to step 1232 and a transaction is not dispatched to the endpoint. If, on the other hand, it is determined that the endpoint (e.g., the next active endpoint identified at step 1204 in FIG. 12A) holds the reservation, the method 1220 proceeds to step 1248 and the asynchronous state machine 414 clears the reservation for that endpoint at step 1248 and dispatches a transaction to that endpoint at step 1230. Steps 1234-1248 may be performed in any order or in parallel (e.g., at the same time). For example, the method 1220 may perform steps 1238-1248 before, after, or at the same time as the local credit check is being performed.

Figure 12C:
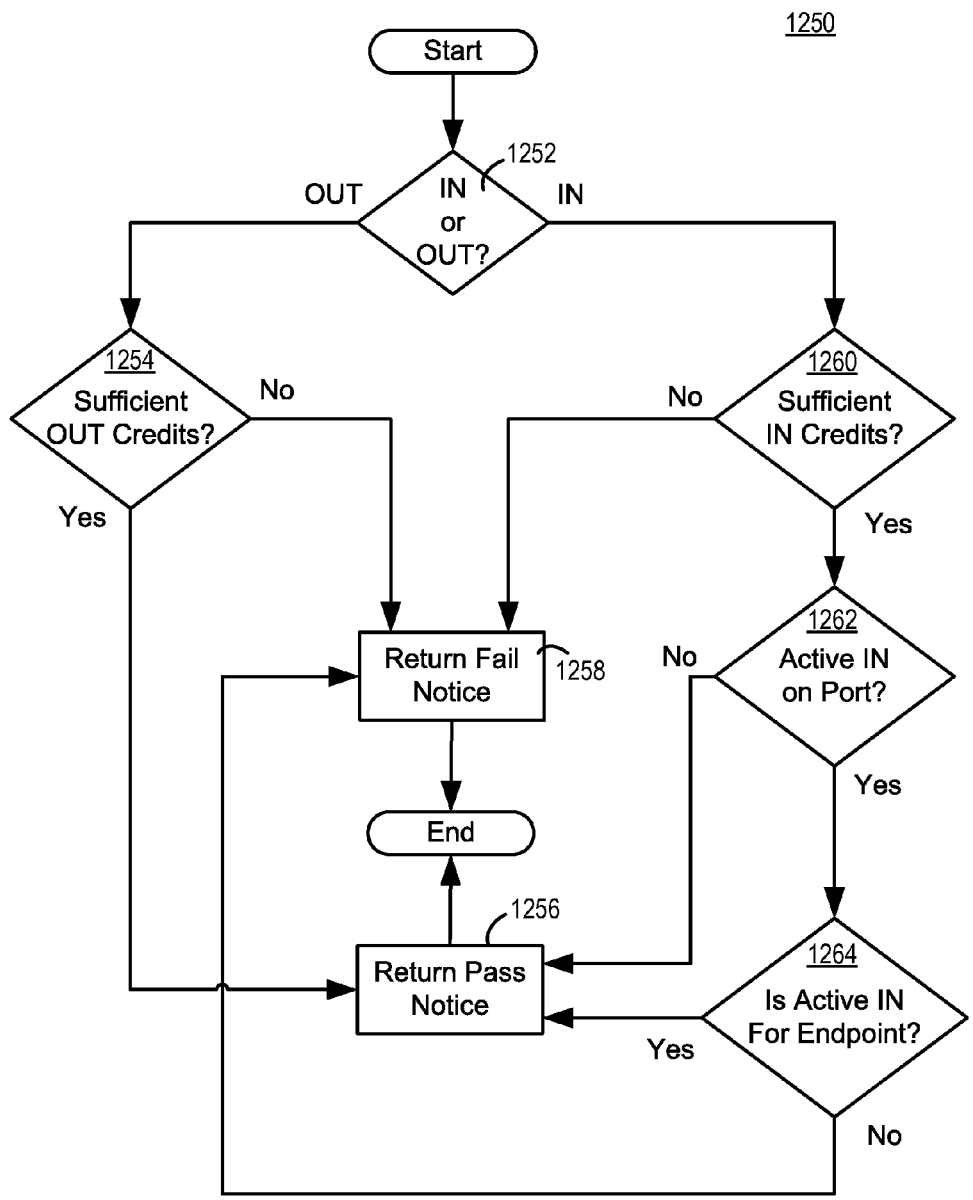
FIG. 12C is a flow chart of a method of performing a local credit check, according to one embodiment.

FIG. 12C is a flow chart of a method 1250 of performing a local credit check, according to one embodiment. The method 1250 may be performed, for example, after step 1224 in FIG. 12B. At step 1252, the method 1250 determines whether the transaction is an IN or OUT transaction (e.g., based on the context information for the endpoint that was examined at step 1222 in FIG. 12B). If the transaction is an OUT transaction, the method proceeds to step 1254 and it is determined (e.g., by the credit check module 770 or the local credit check module 772 in FIG. 8) whether the target port has sufficient OUT credits. For example, the local credit check module 772 may determine whether there is at least available credit for the target port. If there is at least available credit for the target port, the method 1250 proceeds to step 1256 and returns a pass notification (e.g., to the asynchronous state machine 414). If, on the other hand, there is not at least available credit for the target port, the method 1250 proceeds to step 1258 and returns a fail notification (e.g., to the asynchronous state machine 414). After a pass or fail notification is returned at step 1256 or 1258, the method 1250 ends. The method 1220 (FIG. 12B) may then resume at step 1236.

If the transaction is an asynchronous IN transaction, the method proceeds to step 1260 and it is determined (e.g., by the credit check module 770 or the local credit check module 772 in FIG. 8) whether the target port has sufficient IN credits. For example, the local credit check module 772 may determine whether there is at least available credit for the target port. If there is not at least available credit for the target port, the method 1250 proceeds to step 1258 and returns a fail notification (e.g., to the asynchronous state machine 414). If, on the other hand, there is at least available credit for the target port, the method 1250 proceeds to step 1262 and determines whether there are any active IN endpoints on the target port. For example, the local credit check module 772 may check the IN endpoint active array 450 (FIGS. 4 and 8) to determine whether there are any active IN endpoints on the target port. If not, the method 1250 proceeds to step 1256 and returns a pass notification (e.g., to the asynchronous state machine 414). If it is determined that there is an active IN endpoints on the target port, the method proceeds to step 1264 and determines whether the active IN endpoint is the same endpoint for which the credit check is being performed (e.g., the next active endpoint identified at step 1204 in FIG. 12A). For example, the local credit check module 772 may check the endpoint ID of the active IN endpoint in the IN endpoint active array 450 (FIG. 4). If the active IN endpoint on the target port is the same endpoint involved with the transaction, the method 1250 proceeds to step 1256 and returns a pass notification. If the active IN endpoint on the target port is not the same endpoint involved with the transaction, the method 1250 proceeds to step 1258 and returns a fail notification. Steps 1252-1258 may be performed in any order or in parallel (e.g., at the same time).

Figure 13:
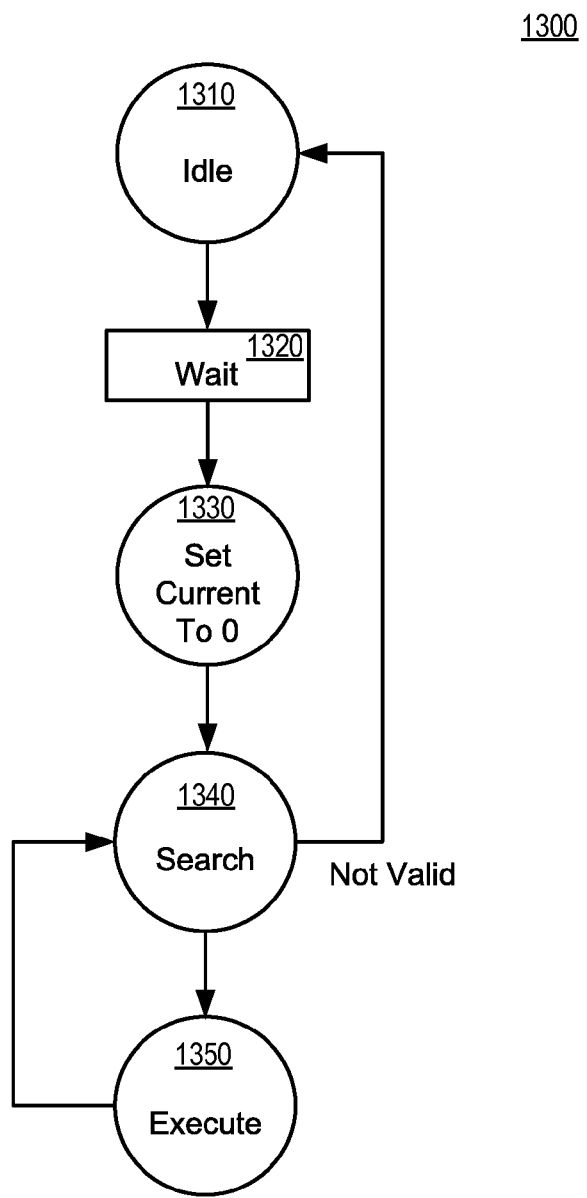
FIG. 13 is a simplified state diagram illustrating various states of the polling state machine of FIG. 11, according to one embodiment.

FIG. 13 is a simplified state diagram 1300 illustrating various states of the polling state machine 420 of FIG. 11, according to one embodiment. While the polling state machine 420 services transactions for high-speed and full-speed ports according to one embodiment, the polling state machine 420 may also service transactions for super-speed ports according to other embodiments. The polling state machine 420 remains in the idle state 1310 until the polling state machine 420 receives a trigger (e.g., from the scheduler master state machine 410 or the asynchronous state machine 414) to service endpoints in the polling active array 540. After receiving the trigger, the polling state machine 420 transitions from the idle state 1310 to state 1320 in which the polling state machine 420 waits (e.g., enters a sleep state) for a predetermined amount of time (e.g., 20 microseconds) before proceeding to state 1330. According to one embodiment, the predetermined amount of time is configurable (e.g., the host controller 140 and/or the OS or drivers running on the host 120 adjust the amount of delay). After waiting the predetermined amount of time, the polling state machine 420 transitions to state 1330 in which the polling state machine 420 clears the value in the current endpoint field 1122 (e.g., sets the current endpoint field 1122 to zero).

After the polling state machine 420 clears the value in the current endpoint field 1122, the polling state machine 420 transitions to a search state 1340. In the search state 1340, the search logic 1120 finds or identifies the next active element in the array 540, which is depicted in the next endpoint output 1124. After the search logic 1120 finds the next active element in the array 540, the polling state machine 420 transitions to an execution state 1350. During execution state 1350, the polling state machine 420 sends a request for service (1162) to the arbiter 1160, which attempts to dispatch the transaction. After the asynchronous state machine 414 services the request (or denies the request), the polling state machine 420 transitions back to state 1340 and the search logic 1120 finds or identifies the next active element in the array 540. The polling state machine 420 transitions back and forth between states 1340 and 1350 until no additional active endpoints are found in the remainder of the array. If the search logic 1120 reaches the end of the array 540 (e.g., element 1158) and does not find any additional active endpoints, the search logic 1120 outputs to the polling state machine 420 a not valid indication via the flag 1126 indicating no additional active endpoints were found in the array 540. After receiving the not valid indication, the polling state machine 420 returns to the idle state 1310.

Figure 14:
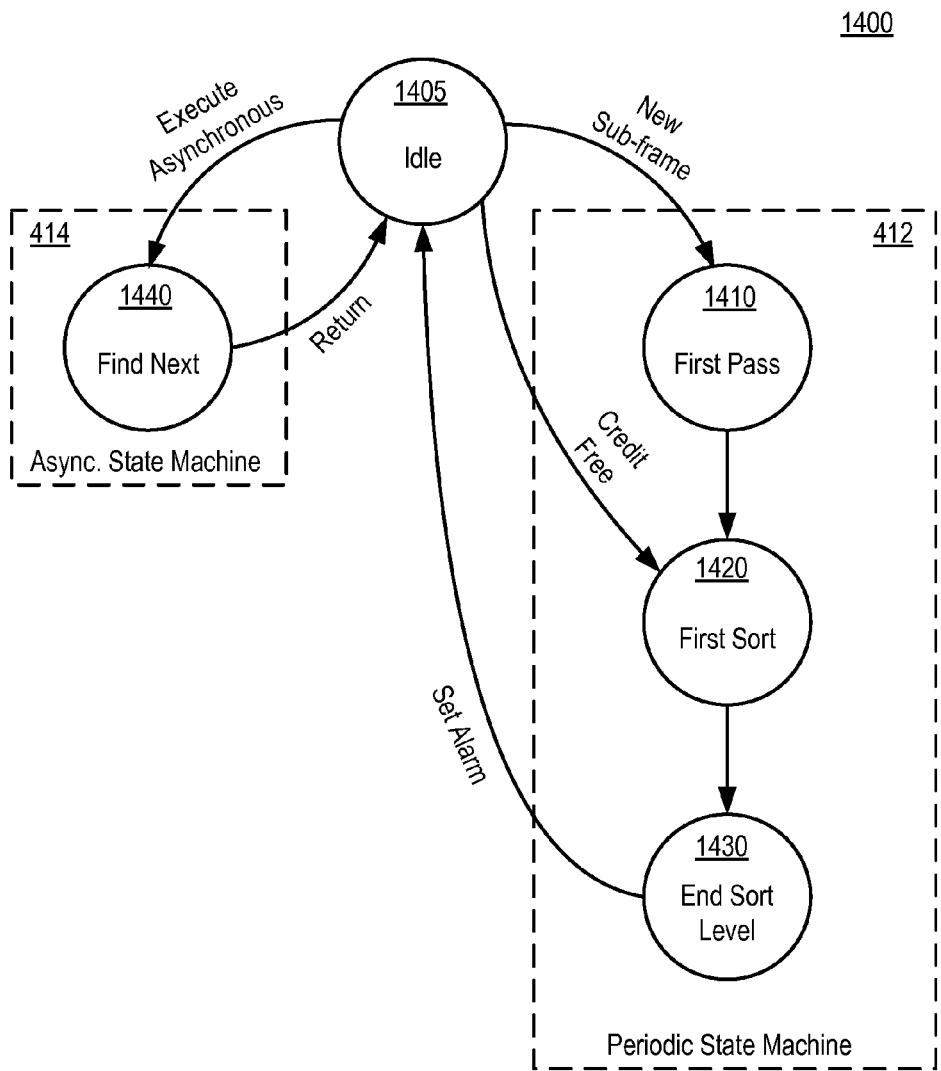
FIG. 14 is a simplified state diagram illustrating the interaction between the periodic and asynchronous state machines in the primary scheduler of FIG. 4, according to one embodiment.

FIG. 14 is a simplified state diagram 1400 of the scheduler master state machine 410 of FIG. 4, according to one embodiment. The state diagram 1400 illustrates the interaction between the periodic and asynchronous state machines 412 and 414 in the primary scheduler 130. When the host controller 140 powers up, the scheduler master state machine 410 enters an idle state 1405. The scheduler master state machine 410 remains in the idle state 1405 until it receives a trigger to perform a task. For example, the scheduler master state machine 410 transitions from the idle state 1405 to a first pass state 1410 after receiving a new sub-frame trigger. By way of another example, the scheduler master state machine 410 transitions from the idle state 1405 to a first sort state 1420 after receiving a credit free trigger. By way of still another example, the scheduler master state machine 410 transitions from the idle state 1405 to a find next state 1440 after receiving an execute asynchronous trigger (e.g., the asynchronous present output 1115 indicating that there are active endpoints in the asynchronous active array 134). If more than one triggers occurs at one time, the scheduler master state machine 410 responds to the highest priority trigger first. According to one embodiment, the scheduler master state machine 410 responds to the new sub-frame trigger first, the credit free trigger second, and the execute asynchronous trigger last.

After receiving a new sub-frame trigger, the scheduler master state machine 410 transitions from the idle state 1405 to the first pass state 1410. The new sub-frame trigger may, for example, be received from the sub-frame boundary trigger 730 (e.g., after the frame index 440 in FIG. 4 increments to a new sub-frame). During the first pass state 1410, the periodic state machine 412 makes an initial service pass through the active array 132 before attempting to dispatch any transactions. The periodic state machine 412 may perform a number of tasks during the first service pass through the active array 132, such as one or more of clearing the bits in the done and ping done fields 514 and 516 (FIG. 5A), setting one or more pending flags, and identifying any missed service intervals. Additional details regarding the tasks performed the service pass(es) through the active array 132 are described with reference to FIG. 7.

After completing the service pass(es), the periodic state machine 412 transitions from the first pass state 1410 to the first sort state 1420. During the first sort state 1420, the periodic state machine 412 selects a highest priority sort level as the sort level to process during a pass through the active array 132 by, for example, accessing the active sort level array 750 and selecting the highest priority sort level that is marked active. Starting with the highest priority sort level, the periodic state machine 412 makes a first search pass through the active array 132 and attempts to dispatch transactions to active endpoints. After completing the first search pass, the periodic state machine 412 may make one or more subsequent search passes through the active array 132, each of which corresponds to a sort level having a unique set of sort criteria. During the subsequent search passes, the periodic state machine 412 inspects the active elements in the active array 132 and attempts to dispatch transactions to active endpoints matching the sort criteria associated with the particular sort level.

Before dispatching a transaction to an active endpoint in the array 132, the periodic state machine 412 determines whether the transaction passes a credit check. If an endpoint satisfies the sort criteria associated with the search pass but the transaction fails the credit check (e.g., due to insufficient port credits), the periodic state machine 412 marks the sort level as incomplete and attempts to service other active endpoints (e.g., endpoints in lower priority sort levels). Additional details regarding servicing active endpoints in the periodic active array 132 by making one or more search passes through the array 132 are described with reference to FIGS. 7, 9A, and 9B.

After the periodic state machine 412 processes all of the sort levels and the only remaining active endpoints are those with blocked ports, the periodic state machine 412 transitions from the first sort state 1420 to an end sort level state 1430. During the end sort level state 1430, the periodic state machine 412 sets an alarm indicating that the periodic state machine 412 is waiting for credits to become available on one or more ports. According to one embodiment, the periodic state machine 412 sets per port flags (and possibly per direction flags) that indicate on which port or ports the periodic state machine 412 is waiting for credits to become available. For example, if the periodic state machine 412 is waiting for credits to become available on three ports, the periodic state machine 412 may set a bit for each port.

After setting the alarm indicating on which port or ports the periodic state machine 412 is waiting for credits to become available, the scheduler master state machine 410 returns to the idle state 1405.

In response to receiving a credit free trigger, the scheduler master state machine 410 transitions from the idle state 1405 to the first sort state 1420. The credit free trigger may, for example, be asserted by the credit check module 770 or the local credit check module 772 (FIGS. 7 and 8). For example, the local credit check module 772 may monitor the IN endpoint active array 450, the IN credit available input 452, and the OUT credit available input 454. If one or more port credits become available on a port for which an alarm is set, the credit free trigger is asserted.

In response to receiving the credit free trigger, the periodic state machine 412 selects a highest priority sort level as the sort level to process during a pass through the active array 132 by, for example, accessing the active sort level array 750 and selecting the highest priority sort level that is marked active or marked incomplete. After servicing the highest priority sort level, the periodic state machine 412 moves on to the lower priority sort levels. By way of example, if sort levels 0, 7, 15, and 50 were previously marked as active in the active sort level array 750 and the periodic state machine 412 serviced all active endpoints in sort level 0 and 50 but was not able to service one or more endpoints in sort levels 7 and 15 (e.g., due to insufficient port credits), the periodic state machine 412 would select sort level 7 as the sort level to process during the pass through the active array 132.

The credit free trigger may be asserted at any time. Regardless of when the credit free trigger is asserted, the scheduler master state machine 410 transitions to the first sort state 1420 as soon as possible after receiving the credit free trigger. For example, if the periodic state machine 412 is midway through the sort levels and the credit free triggers is asserted, the periodic state machine 412 returns to the first sort state 1420 and starts processing the highest priority sort level. By way of another example, if the asynchronous state machine 414 is servicing an endpoint and the credit free triggers is asserted, the scheduler master state machine 410 transitions to the first sort state 1420 as soon as possible after the asynchronous state machine 414 finishes dispatching its transaction.

In response to receiving the execute asynchronous trigger, the scheduler master state machine 410 transitions from the idle state 1405 to the find next state 1440. During the find next state 1440 the asynchronous state machine 414 services an endpoint from the asynchronous active array 134 (e.g., by dispatching a transaction, which make include one or more packets) or the polling state machine 420 services an endpoint from the polling active array 540 (e.g., by dispatching a transaction, which make include one or more packets). According to a preferred embodiment, the asynchronous state machine 414 services one endpoint during the find next state 1440. Additional details regarding servicing active endpoints in the asynchronous active array 134 and the polling active array 540 are described with reference to FIGS. 11, 12A, 12B, and 12C. After servicing the endpoint, the asynchronous state machine 414 returns to the idle state 1405.

According to one embodiment, the scheduler master state machine 410 places restrictions on the asynchronous state machine 414 to help ensure that the periodic state machine 412 services periodic endpoints without missing a service interval. For example, the scheduler master state machine 410 may place limitations on the amount of asynchronous data the asynchronous state machine 414 can dispatch near a sub-frame boundary. For example, if a sub-frame boundary is approaching, the asynchronous state machine 414 may start dialing down how many data packets are being dispatched. In other words, instead of sending four data packets, the asynchronous state machine 414 may only send two data packets. According to one embodiment, the burst size is limited near the end of a sub-frame as follows: if there are two microseconds left, the burst limit is one; if there are four microseconds left, the burst limit is two; and if there are six microseconds left, the burst limit is three.

The scheduler master state machine 410 may also limit the transactions the asynchronous state machine 414 can dispatch if there is a periodic transaction pending on the same port. For example, if there is a pending USB 2.0 periodic IN or OUT transaction on a port, the asynchronous state machine 414 cannot dispatch any transactions to that port. Similarly, the asynchronous state machine 414 cannot dispatch an asynchronous IN transaction to a port if there is a pending USB 3.0 periodic IN transaction on that port and the asynchronous state machine 414 cannot dispatch an asynchronous OUT transaction to a port if there is a pending USB 3.0 periodic OUT transaction on that port. However, if there is a pending USB 3.0 periodic IN transaction on a port, the asynchronous state machine 414 can dispatch an asynchronous OUT transaction to that port (and vice versa).

According to one embodiment, if there are any periodic transactions pending on any port, the scheduler master state machine 410 limits the size of the asynchronous transactions that the asynchronous state machine 414 can dispatch. For example, if there are any periodic transactions pending, the asynchronous state machine 414 may be limited to sending one asynchronous data packet (e.g., to minimize the time the asynchronous state machine 414 is in the find next state 1440).

Figure 15:
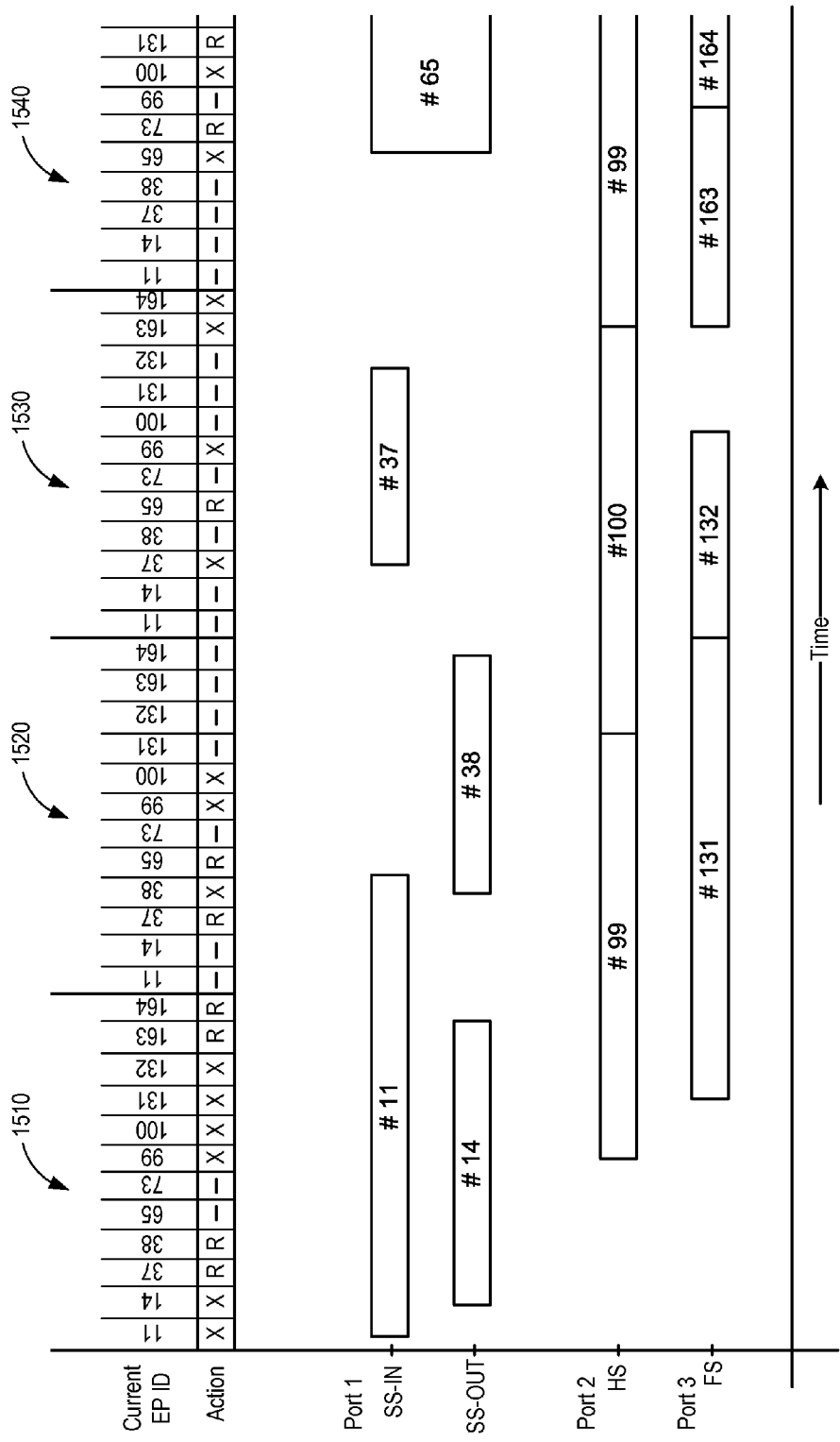
FIG. 15 is a diagram illustrating a hypothetical asynchronous schedule generated by the asynchronous state machine of FIG. 11 operating across multiple ports and using a reservation system to facilitate fair scheduling.

FIG. 15 is a diagram illustrating a hypothetical asynchronous schedule generated by the asynchronous state machine 414 of FIG. 11 operating across multiple ports and using the reservation system 1140 to facilitate fair scheduling. The hypothetical example assumes that all endpoints have a doorbell pending at time 0, all endpoints are pending for the duration, no endpoints are polling or flow controlled (e.g., NAK or NRDY), and ports 2 and 3 can dispatch both IN and OUT transactions (e.g., USB 2.0 transactions) but only execute one at a time on the bus (e.g., via a lower level arbiter), whereas port 1 can execute IN and OUT transactions simultaneously or approximately simultaneously (e.g., USB 3.0 transactions).

Table 5 illustrates the active endpoints (e.g., that were found by the search logic 1110) to be serviced by the asynchronous state machine 414. The endpoint ID is determined from Equation 4.

$$\text{EP ID} = 32 \times (\text{Device} - 1) + \text{EP} \times 2 [+1 \text{ if IN}] \quad \text{(Equation 4)}$$

TABLE 5

| Device | Port | EP - Type | EP ID |
|---|---|---|---|
| Device 1 | 1 | #5 Bulk IN | 0 + 11 = 11 |
|  |  | #7 Bulk OUT | 0 + 14 = 14 |
| Device 2 | 1 | #2 Bulk IN | 32 + 5 = 37 |
|  |  | #3 Bulk OUT | 32 + 6 = 38 |
| Device 3 | 1 | #0 Control | 64 + 1 = 65 |
|  |  | #4 Bulk IN | 64 + 9 = 73 |
| Device 4 | 2 | #1 Bulk IN | 96 + 3 = 99 |
|  |  | #2 Bulk OUT | 96 + 4 = 100 |
| Device 5 | 3 | #1 Bulk IN | 128 + 3 = 131 |
|  |  | #2 Bulk IN | 128 + 4 = 132 |
| Device 6 | 3 | #1 Bulk IN | 160 + 3 = 163 |
|  |  | #2 Bulk OUT | 160 + 4 = 164 |

During the first iteration 1510 through the active endpoints, the asynchronous state machine 414 executes (denoted with an "X") a transaction for endpoint ID 11, which is illustrated on port 1 on the super-speed IN bus, after determining that the transaction passes the credit check (e.g., there are sufficient port credits) and there are no reservations. Likewise, the asynchronous state machine 414 executes a transaction for endpoint ID 14, which is illustrated on port 1 on the super-speed OUT bus, after determining that the transaction passes the credit check and there are no reservations. The asynchronous state machine 414 makes a reservation for endpoint ID 37 (denoted with an "R") and does not execute a transaction after determining that the transaction fails the credit check (e.g., there are not sufficient port credits) and there are no reservations on port 1 for the super-speed IN buffer. Likewise, the asynchronous state machine 414 makes a reservation for endpoint ID 38 and does not execute a transaction after determining that the transaction fails the credit check (e.g., there are not sufficient port credits) and there are no reservations on port 1 for the super-speed OUT buffer. The asynchronous state machine 414 does not execute or make a reservation for endpoint ID 65 (denoted with a dash "-") after determining that the transaction fails the credit check and there already is a reservation on port 1 for the super-speed IN buffer. Likewise, the asynchronous state machine 414 does not execute or make a reservation for endpoint ID 73 after determining that the transaction fails the credit check and there already is a reservation on port 1 for the super-speed IN buffer.

The asynchronous state machine 414 executes high-speed transactions for endpoint IDs 99 and 100 (depicted on port 2) and full-speed transactions for endpoint IDs 131 and 132 (depicted on port 3) after determining that the transactions pass the credit check and there are no reservations. The asynchronous state machine 414 makes a reservation for endpoint ID 163 and does not execute a transaction after determining that the transaction fails the credit check and there are no reservations on port 3 for the IN buffer. Likewise, the asynchronous state machine 414 makes a reservation for endpoint ID 164 and does not execute a transaction after determining that the transaction fails the credit check and there are no reservations on port 3 for the OUT buffer.

During the second iteration 1520 through the active endpoints, the asynchronous state machine 414 does not execute or make a reservation for endpoint IDs 11 or 14 after determining that there already are reservations on port 1 for the super-speed IN and OUT buffers (held by endpoint IDs 37 and 38). The asynchronous state machine 414 keeps the reservation for endpoint ID 37 after determining that the transaction fails the credit check (e.g., the transaction for endpoint ID 11 is still executing). The asynchronous state machine 414 executes a transaction for endpoint ID 38 (port 1 on the super-speed OUT bus) after determining that the transaction passes the credit check (e.g., the transaction for endpoint ID 14 finished executing) and clears the reservation for endpoint ID 38. The asynchronous state machine 414 makes a reservation for endpoint ID 65 for the super-speed OUT buffer (the control reservation locks both IN and OUT super-speed buffers) and does not execute a transaction after determining that the transaction fails the credit check (e.g., the transaction for endpoint ID 38 is still executing) and there are no reservations on port 1 for the super-speed OUT buffer. The asynchronous state machine 414 does not execute or make a reservation for endpoint ID 73 after determining that there already is a reservation on port 1 for the super-speed IN buffer (held by endpoint ID 37).

The asynchronous state machine 414 continues to execute high-speed transactions for endpoint IDs 99 and 100 (depicted on port 2) after determining that the transactions pass the credit check and there are no reservations. However, the asynchronous state machine 414 does not execute or make a reservation for endpoint IDs 131 and 132 after determining that there already are reservations on port 3 for the IN and OUT buffers (held by endpoint IDs 163 and 164). Even though the endpoint IDs 163 and 164 hold reservations for the IN and OUT buffers on port 3, the asynchronous state machine 414 does not execute transactions for endpoint IDs 163 and 164 after determining that the transactions fail the credit check (e.g., the transaction for endpoint ID 131 is still executing).

During the third iteration 1530 through the active endpoints, the asynchronous state machine 414 does not execute or make a reservation for endpoint IDs 11 or 14 after determining that there already are reservations on port 1 for the super-speed IN and OUT buffers (held by endpoint IDs 37 and 65). The asynchronous state machine 414 executes a transaction for endpoint ID 37 (port 1 on the super-speed IN bus) after determining that the transaction passes the credit check (e.g., the transaction for endpoint ID 11 finished executing) and clears the reservation for endpoint ID 37. The asynchronous state machine 414 does not execute a transaction to or make a reservation for endpoint ID 38 after determining that there already is a reservation on port 1 for the super-speed OUT buffer (held by endpoint ID 65). The asynchronous state machine 414 keeps the reservation for endpoint ID 65 for the super-speed OUT buffer and makes a reservation for endpoint ID 65 for the super-speed IN buffer (the control reservation locks both IN and OUT super-speed buffers) after determining that the transaction fails the credit check (e.g., the transaction for endpoint ID 37 is still executing).

The asynchronous state machine 414 does not execute or make a reservation for endpoint ID 73 after determining that the transaction fails the credit check and there already is a reservation on port 1 for the super-speed IN buffer (held by endpoint ID 65). The asynchronous state machine 414 executes another high-speed transaction for endpoint ID 99 (depicted on port 2) after determining that the transaction passes the credit check and there are no reservations. However, the asynchronous state machine 414 does not execute another high-speed transaction for endpoint ID 100 after determining that the transaction fails the credit check (e.g., two OUT transactions have already been executed and the transaction for endpoint ID 100 is still executing). The asynchronous state machine 414 does not execute or make a reservation for endpoint IDs 131 and 132 after determining that there already are reservations on port 3 for the IN and OUT buffers (held by endpoint IDs 163 and 164). The asynchronous state machine 414 executes full-speed transactions for endpoint IDs 163 and 164 (depicted on port 3) after determining that the transactions pass the credit check and clears the reservations for endpoint IDs 163 and 164.

During the fourth iteration 1540 through the active endpoints, the asynchronous state machine 414 does not execute transactions for or make reservations for endpoint IDs 11, 14, 37, or 38 after determining that there already are reservations on port 1 for the super-speed IN and OUT buffers (held by endpoint ID 65). The asynchronous state machine 414 executes a control transaction for endpoint ID 65 (port 1 on the super-speed IN and OUT buses) after determining that the transactions pass the credit check (e.g., the transaction for endpoint ID 37 finished executing) and clears the reservation for endpoint ID 65. The asynchronous state machine 414 makes a reservation for endpoint ID 73 and does not execute a transaction after determining that the transaction fails the credit check (e.g., the transaction for endpoint ID 65 is still executing) and there are no reservations on port 1 for the super-speed IN buffer.

The asynchronous state machine 414 does not execute another high-speed transaction for endpoint ID 99 after determining that the transaction fails the credit check (e.g., two IN transactions have already been executed and the transaction for endpoint ID 99 is still executing). The asynchronous state machine 414 executes another high-speed transaction for endpoint ID 100 after determining that the transaction passes the credit check and there are no reservations. The asynchronous state machine 414 makes a reservation for endpoint ID 131 and does not execute a transaction after determining that the transaction fails the credit check (e.g., the transaction for endpoint ID 164 is still executing) and there are no reservations on port 3 for the IN buffer.

Figure 16:
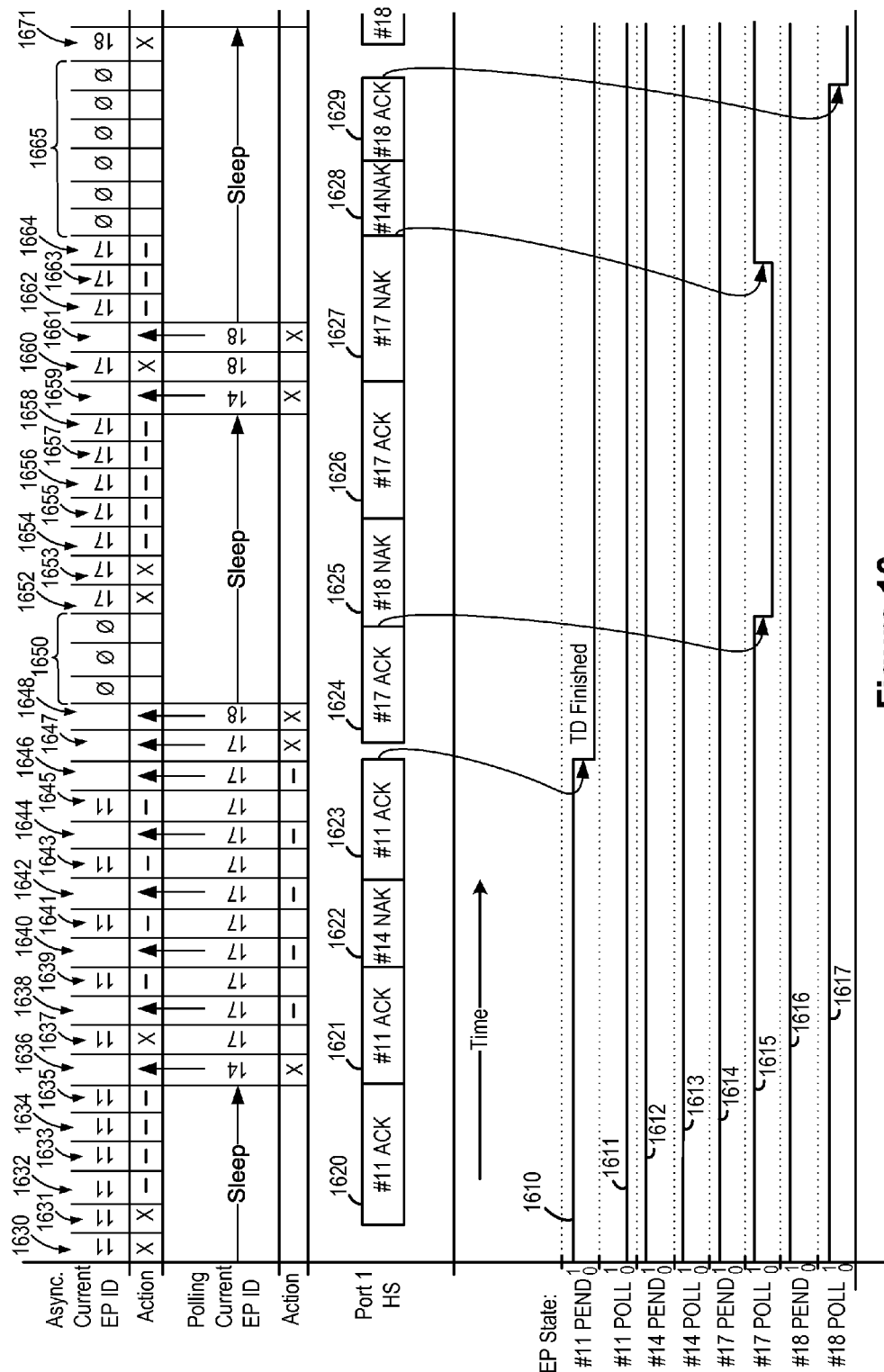
FIG. 16 is a diagram illustrating a hypothetical asynchronous schedule generated by a cooperative interaction between the asynchronous and polling state machines of FIG. 11.

FIG. 16 is a diagram illustrating a hypothetical asynchronous schedule generated by the cooperative interaction between the asynchronous and polling state machines 414 and 420 of FIG. 11. In this hypothetical example, a polling endpoint (e.g., an endpoint with a polling bit set to "1" in the polling state field 534 in FIG. 5B) remains in the polling state until a retry is executed (e.g., until the endpoint sends a positive acknowledgement (ACK) handshake or sends a data payload).

Table 6 illustrates active endpoints (e.g., that were found by the search logic 1110 and 1120) to be serviced by the asynchronous and polling state machines 414 and 420. The endpoint ID is determined from Equation 4, above.

TABLE 6

| Device | Port | EP - Type | EP ID |
|---|---|---|---|
| Device 1 | 1 | #5 Bulk IN | 11 |
| | | #7 Bulk OUT | 14 |
| | | #8 Bulk IN | 17 |
| | | #9 Bulk OUT | 18 |

The bottom portion of FIG. 16 illustrates the state of endpoint IDs 11, 14, 17, and 18 over time. For example, endpoint ID 11 remains active until a pending bit 1610 for endpoint ID 11 (e.g., the bit in the pending state field 530 in FIG. 5B) is cleared, such as after a positive acknowledgment 1623 (e.g., ACK handshake) is received. In this example, endpoint ID 11 does not respond with a negative acknowledgment handshake, so a polling bit 1611 for endpoint ID 11 remains set to "0" throughout the example. Pending and polling bits 1612 and 1613 for endpoint ID 14 remain set to "1" throughout the example because endpoint ID 14 does not respond with a positive acknowledgment handshake. Instead, endpoint ID 14 responds with negative acknowledgment handshakes 1622 and 1628 after the polling state machine 420 attempts to service the endpoint.

Endpoint ID 17 is initially serviced by the polling state machine 420. After endpoint ID 17 responds with a positive acknowledgment handshake 1624, a polling bit 1615 for endpoint ID 17 is cleared and endpoint ID 17 is then serviced by the asynchronous state machine 414. After responding with a negative acknowledgment handshake 1627 when the asynchronous state machine 414 attempted to service endpoint ID 17, the polling bit 1615 for endpoint ID 17 is set back to "1". Endpoint ID 17 remains active throughout the example, as indicated by a pending bit 1614 for endpoint ID 17 remaining "1". Similarly, endpoint ID 18 remains active throughout the example, as indicated by a pending bit 1616 for endpoint ID 18 remaining "1". Endpoint ID 18 continues to be serviced by the polling state machine 420 until endpoint ID 18 responds with a positive acknowledgment handshake 1629. After responding with the positive handshake 1629, a polling bit 1617 for endpoint ID 18 is cleared and endpoint ID 18 is then serviced by the asynchronous state machine 414.

The upper portion of FIG. 16 illustrates the servicing of endpoint IDs 11, 14, 17, and 18 by the asynchronous and polling state machines 414 and 420. During dispatch attempts 1630 and 1631, the asynchronous state machine 414 executes (denoted with an "X") transactions for endpoint ID 11 after determining that the transactions pass the credit check and there are no reservations on port 1 for the high-speed buffer. Endpoint ID 11 responds to the transactions executed during dispatch attempts 1630 and 1631 with positive acknowledgment handshakes 1620 and 1621. During transaction attempts 1632-1635, the asynchronous state machine 414 does not execute transactions (denoted with a dash "-") after determining that the transactions fail the credit check. The polling state machine 420 is in a sleep state during transaction attempts 1630-1635, but transitions to an active state by transaction attempt 1636 (e.g., after a sleep timer expires). According to one embodiment, the amount of time that the polling state machine is in a sleep state is programmable.

Dispatch attempts 1636-1646 illustrate the asynchronous and polling state machines 414 and 420 taking turns servicing endpoints from their active arrays (e.g., active arrays 134 and 540 in FIG. 11). In other words, during dispatch attempts 1636-1646 the arbiter 1160 switches between serving asynchronous transactions for the asynchronous and polling state machines 414 and 420 in an alternating fashion. For example, during dispatch attempt 1636, the arbiter 1160 allows the polling state machine 420 to attempt to service endpoint ID 14 (e.g., the active endpoint found by search logic 1120). A transaction is executed during dispatch attempt 1636 after it is determined that the transaction passes the credit check. Endpoint ID 14 responds to the transaction executed during dispatch attempt 1636 with a negative acknowledgment handshake 1622, so the pending and polling bits 1612 and 1613 remain set to "1".

During dispatch attempt 1637, the asynchronous state machine 414 executes a transaction for endpoint ID 11 after determining that the transaction passes the credit check. Endpoint ID 11 responds to the transaction executed during dispatch attempt 1637 with a positive acknowledgment handshake 1623, which causes the pending bit 1610 to be cleared. During dispatch attempts 1638-1646, transactions are not executed after the transactions fail the credit checks (e.g., there are not sufficient credits for the high-speed buffer on port 1).

After the pending bit 1610 is cleared for endpoint ID 11, the asynchronous state machine 414 has no more active endpoints to service. Thus, the polling state machine 420 makes two consecutive dispatch attempts 1647 and 1648. During dispatch attempts 1647 and 1648, the polling state machine 420 executes (e.g., via the asynchronous state machine 414) transactions for endpoint IDs 17 and 18 after determining that the transactions pass the credit check. Endpoint ID 17 responds to the transaction executed during dispatch attempt 1647 with a positive acknowledgment handshake 1624, which causes the polling bit 1615 to be cleared and allows the asynchronous state machine 414 to service endpoint ID 17. Endpoint ID 18 responds to the transaction executed during dispatch attempt 1648 with a negative acknowledgment handshake 1625, so the polling bit 1617 remains set to "1". The polling state machine 420 enters a sleep state after dispatch attempt 1648 because the polling state machine 420 has made one iteration through its active array (e.g., the search logic 1120 asserts the valid flag 1126 indicating the search logic 1120 has reached the end of the array and there are no additional active endpoints).

Because the polling state machine 420 is in a sleep state and there are no active endpoints for the asynchronous state machine 414 to service, no dispatch attempts are made during time period 1650. After the positive acknowledgment handshake 1624 is received from endpoint ID 17, an active bit corresponding to endpoint ID 17 is set to "1" in the active array 134, which causes the asynchronous present output 1115 to indicate that there are active endpoints in the array 134 and search logic 1110 to find the next active endpoint (i.e., endpoint ID 17). During dispatch attempts 1652 and 1653, the asynchronous state machine 414 executes transactions for endpoint ID 17 after determining that the transactions pass the credit check. During transaction attempts 1654-1657, the asynchronous state machine 414 does not execute transactions to endpoint ID 17 after determining that the transactions fail the credit check.

Endpoint ID 17 responds to the transaction executed during dispatch attempt 1652 with a positive acknowledgment handshakes 1626. Endpoint ID 17 responds to the transaction executed during dispatch attempt 1653 with a negative acknowledgment handshake 1627, which causes the polling bit 1615 to be asserted (e.g., set to "1") and endpoint ID 17 to again be serviced by the polling state machine 420. By transaction attempt 1659, the polling state machine 420 transitions to an active state and the asynchronous and polling state machines 414 and 420 again take turns servicing endpoints during dispatch attempts 1659-1661.

The asynchronous state machine 414 does not execute a transaction to endpoint ID 17 during transaction attempt 1658 after determining that the transaction fails the credit check (e.g., due to insufficient port credits). During dispatch attempt 1659, the asynchronous state machine 414 executes a transaction for endpoint ID 17 after determining that the transaction passes the credit check. According to one embodiment, after receiving the negative acknowledgment handshake 1627 (for the transaction executed during dispatch attempt 1653), the high-speed port will flush the transaction for dispatch attempt 1660. During dispatch attempt 1659, the polling state machine 420 executes a transaction for endpoint ID 14 (e.g., the first active endpoint found by search logic 1120 in the polling active array 540) after determining that the transactions passes the credit check. Likewise, after determining that the transaction passes the credit check, the polling state machine 420 executes a transaction to endpoint ID 18 during transaction attempt 1661. The polling state machine 420 enters a sleep state after dispatch attempt 1661 because the polling state machine 420 has finished making another iteration through its active array.

During transaction attempts 1662-1664, the asynchronous state machine 414 does not execute transactions to endpoint ID 17 after determining that the transactions fail the credit check. It should be noted that even though endpoint ID 17 responds to the transaction executed during dispatch attempt 1653 with the negative acknowledgment handshake 1627, the polling bit 1615 is not set to "1" until the handshake 1627 is fully received. Thus, the asynchronous state machine 414 still attempts to service endpoint ID 17 during dispatch attempts 1654-1658, 1660, and 1662-1664. After the negative acknowledgment handshake 1627 is received, the polling bit 1615 is set to "1" and the asynchronous state machine 414 has no more active endpoints to service. Because the polling state machine 420 is in a sleep state and there are no active endpoints for the asynchronous state machine 414 to service, no dispatch attempts are made during time period 1665.

Endpoint ID 14 responds to the transaction executed during dispatch attempt 1659 with a negative acknowledgment handshakes 1628. Endpoint ID 18 responds to the transaction executed during dispatch attempt 1661 with a positive acknowledgment handshake 1629, which causes the polling bit 1617 to be cleared and endpoint ID 18 to be serviced by the asynchronous state machine 414. During dispatch attempt 1671, the asynchronous state machine 414 executes a transaction for endpoint ID 18 after determining that the transaction passes the credit check.

Figure 17:
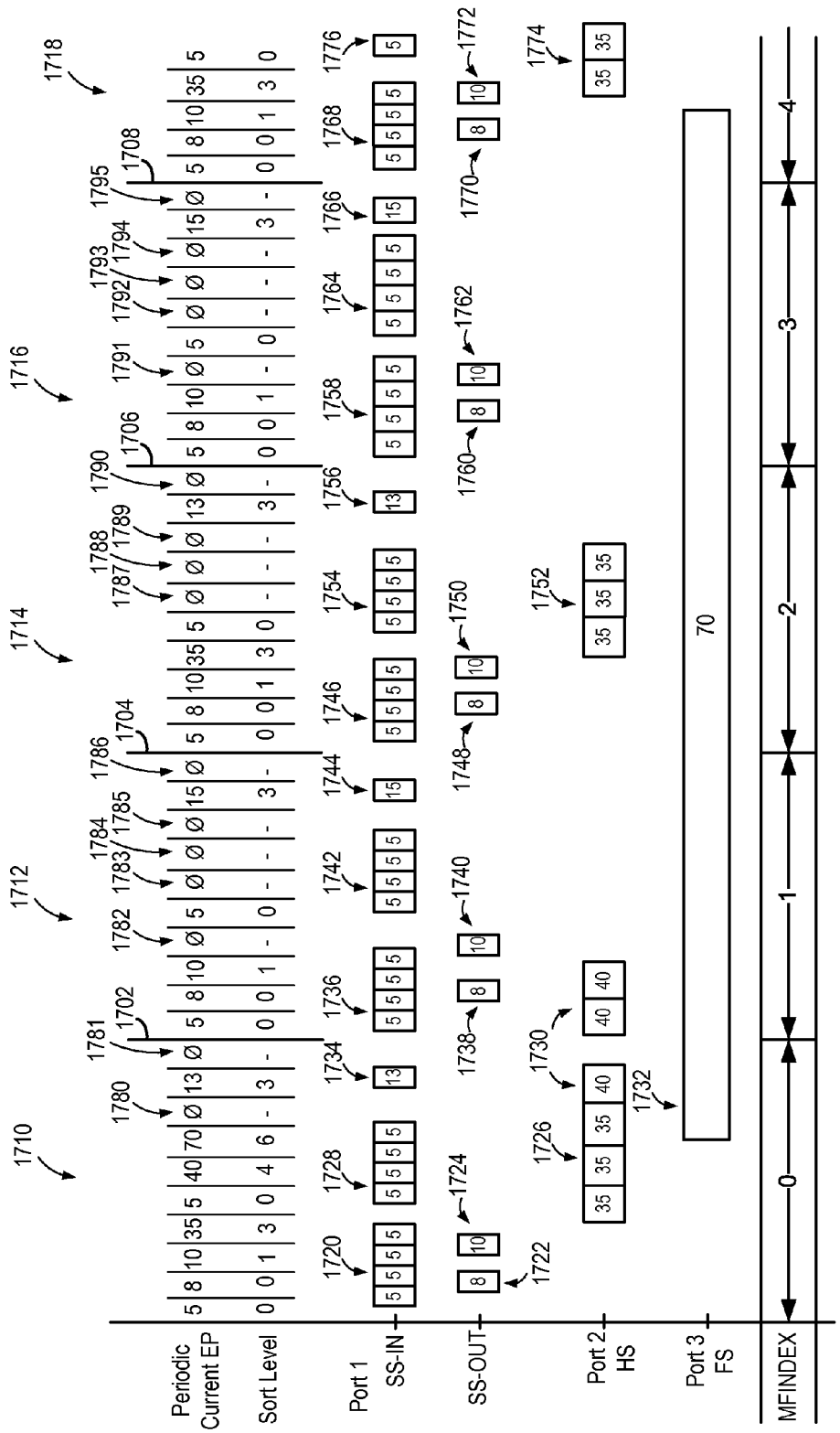
FIG. 17 is a diagram illustrating a hypothetical periodic schedule generated by the periodic state machine of FIG. 7 by servicing endpoints in order according to sort level and revisiting higher priority sort levels in response to a credit free trigger.

FIG. 17 is a diagram illustrating a hypothetical periodic schedule generated by the periodic state machine 412 of FIG. 7 by servicing endpoints in order according to sort level and revisiting higher priority sort levels in response to a credit free trigger. In this hypothetical example, a periodic endpoint is only illustrated in FIG. 17 as packets for the endpoint are executed. Table 7 illustrates active endpoints (e.g., that were found by the search logic 710) to be serviced by the periodic state machine 412. The endpoint ID is determined from Equation 4, above.

TABLE 7

| Device   | Port | EP - Type   | EP ID | Interval | Sort Level | Burst |
|----------|------|-------------|-------|----------|------------|-------|
| Device 1 | 1    | #2 Iso. IN  | 5     | 0        | 0          | 8     |
|          |      | #4 Iso. OUT | 8     | 0        | 0          | 1     |
|          |      | #5 Int. OUT | 10    | 0        | 1          | 1     |
|          |      | #6 Int. IN  | 13    | 1        | 3          | 1     |
|          |      | #7 Int. IN  | 15    | 1        | 3          | 1     |
| Device 2 | 2    | #1 Int. IN  | 35    | 1        | 3          | 3     |
|          |      | #4 Iso. OUT | 40    | 2        | 4          | 3     |
| Device 3 | 3    | #3 Iso. OUT | 70    | 3        | 6          | 1     |

In this example, endpoint IDs 5 and 8 have a service interval of once every sub-frame (e.g., microframe) and are in the highest priority sort level (sort level 0). Endpoint ID 10 also has a service interval of once every sub-frame, but is in the second highest priority sort level (sort level 1) because it is serviced with interrupt transactions. Endpoint IDs 13, 15, and 35 have a service interval of once every two sub-frames and are in the fourth highest priority sort level (sort level 3). Endpoint ID 40 has a service interval of once every four sub-frames and is in the fifth highest priority sort level (sort level 4) and endpoint ID 70 has a service interval of once every eight sub-frames (e.g., a millisecond frame) and is in the seventh highest priority sort level (sort level 6). As illustrated in Table 7, above, there are no active endpoints in sort levels 2 and 5 (e.g., during a service pass, the periodic state machine 412 did not find any active endpoints for sort levels 2 or 5, so those sort levels were not marked as active in the active sort level array 750). Endpoint ID 5 has a burst of eight (e.g., eight packets are received per service interval), endpoint IDs 8, 10, 13, 15, and 70 have a burst of one (e.g., one packet is sent/received per service interval), and endpoint IDs 35 and 40 have a burst of three (e.g., three packets are sent/received per service interval).

Because endpoint IDs 5 and 8 have a service interval of every one sub-frame, those endpoints need to be serviced once during each of sub-frames 1710-1716 as illustrated in FIG. 17. Because endpoint IDs 13, 15, and 35 have a service interval of every two sub-frames, those endpoints only needs to be serviced once during sub-frames 1710 and 1712 and once during sub-frames 1714 and 1716 as illustrated in FIG. 17. Endpoint ID 40 has a service interval of every four sub-frames, so it only needs to be serviced once during sub-frames 1710-1716 as illustrated in FIG. 17.

At the start of sub-frame 1710, the periodic state machine 412 begins a search pass for the highest priority sort level (sort level 0) and performs a dispatch attempt for endpoint ID 5. The periodic state machine 412 executes a transaction 1720 for endpoint ID 5, which is illustrated in the super-speed IN buffer on port 1, after determining that the transaction passes the credit check. Although endpoint ID 5 has a burst of eight, only four packets were dispatched in transaction 1720 because, for example, the super-speed IN buffer on port 1 has a capacity of four data packets. Because only four of the eight packets were dispatched, endpoint ID 5 remains active (e.g., endpoint ID 5 transitions from state S2 to state S5 as described with reference to FIGS. 5A and 6A) and the sort level 0 is marked incomplete (e.g., sort level 0 is still active in the active sort level array 750). Instead of waiting for the super-speed IN buffer on port 1 to drain, the periodic state machine 412 moves on to other endpoints in sort level 0 and then on to endpoints in lower priority sort levels.

Because there is another active endpoint in sort level 0 (e.g., endpoint ID 8), the periodic state machine 412 performs a dispatch attempt for endpoint ID 8. After determining that the transaction passes the credit check, the periodic state machine 412 executes a transaction 1722 for endpoint ID 8, which is illustrated in the super-speed OUT buffer on port 1. Because the endpoint ID 8 has a burst of one, endpoint ID 8 is marked complete for the service interval (e.g., endpoint ID 8 transitions from state S2 to state S6 as described with reference to FIGS. 5A and 6A). After reaching end of the search pass for sort level 0, the periodic state machine 412 performs a search pass for the next highest priority sort level (sort level 1).

During the search pass for sort level 1, the periodic state machine 412 executes a transaction 1724 for endpoint ID 10, which is illustrated in the super-speed OUT buffer on port 1, after determining that the transaction passes the credit check. Because the endpoint ID 10 has a burst of one, endpoint ID 10 is marked complete for the service interval (e.g., endpoint ID 10 transitions from state S2 to state S6). After reaching end of the search pass for sort level 1, the periodic state machine 412 performs a search pass for the next highest priority sort level (sort level 3).

During the search pass for sort level 3, the periodic state machine 412 does not execute transactions for endpoint IDs 13 and 15 because the credit checks fail (e.g., the super-speed IN buffer on port 1 is still storing packets for endpoint ID 5) and sort level 3 is marked incomplete (e.g., sort level 3 is still active in the active sort level array 750). The periodic state machine 412 moves on to the next active endpoint in sort level 3 and executes a transaction 1726 for endpoint ID 35, which is illustrated in the high-speed buffer on port 2, after determining that the transaction passes the credit check. Because the endpoint ID 35 has a burst of three and three packets were executed (e.g., the high-speed buffer on port 2 has a capacity of three data packets), endpoint ID 35 is marked complete for this service interval (e.g., endpoint ID 35 transitions from state S2 to state S6).

After executing the transaction 1726 for endpoint ID 35, the periodic state machine 412 receives a credit free trigger and rewinds to the highest priority sort level. As illustrated in FIG. 17, the super-speed IN buffer on port 1 has drained and can now accept more data. Because sort level 0 is still active in the active sort level array 750, the periodic state machine 412 performs another search pass for sort level 0 and executes a transaction 1728 for endpoint ID 5, which is illustrated in the super-speed IN buffer on port 1, after determining that the transaction passes the credit check (e.g., the super-speed IN buffer on port 1 has drained). Because the endpoint ID 5 has a burst of eight and eight packets have now been dispatched between transactions 1720 and 1728, endpoint ID 5 is marked complete for the service interval (e.g., endpoint ID 5 transitions from state S5 to state S6). Sort level 0 is also marked complete in the active sort level array 750 because endpoint IDs 5 and 8 have been marked complete for the service interval. The periodic state machine 412 then continues with lower priority sort levels.

Because endpoint IDs 8, 10 and 35 were previously marked complete for the service interval, the periodic state machine 412 does not revisit those endpoints. During the search pass for sort level 3, the periodic state machine 412 does not execute transactions for endpoint IDs 13 and 15 because the credit checks fail (e.g., the super-speed IN buffer on port 1 is still storing packets for endpoint ID 5 related to transaction 1728) and sort level 3 is marked incomplete (e.g., sort level 3 is still active in the active sort level array 750). The periodic state machine 412 then continues with lower priority sort levels. During a search pass for sort level 4, the periodic state machine 412 executes a transaction 1730 for endpoint ID 40, which is illustrated in the high-speed buffer on port 2, after determining that the transaction passes the credit check (e.g., high-speed bursts that are greater than one are serviced all at once if there are sufficient port credits). Endpoint IDs 35 and 40 are being transmitted in different directions (e.g., endpoint ID 35 is an IN transaction and endpoint ID 40 is an OUT transaction), so there is room at port to serve both. As illustrated in FIG. 17, endpoint ID 40 does not fit in the sub-frame so two of the three packets spill past sub-frame boundary 1702 (e.g., two of the three packets spill past the next start-of-frame and a gap is shown indicating that the first packet terminates to prevent landing on the start-of-frame). Because the endpoint ID 40 has a burst of three and three packets have been dispatched, endpoint ID 40 is marked complete for the service interval (e.g., endpoint ID 40 transitions from state S5 to state S6). Sort level 4 is also marked complete in the active sort level array 750 because endpoint ID 40 has been marked complete for the service interval. The periodic state machine 412 then continues with lower priority sort levels.

During a search pass for sort level 6, the periodic state machine 412 executes a transaction 1732 for endpoint ID 70, which is illustrated in the full-speed buffer on port 3, after determining that the transaction passes the credit check. Because the endpoint ID 70 has a burst of one and one packet has been dispatched, endpoint ID 70 is marked complete for the service interval (e.g., endpoint ID 70 transitions from state S2 to state S6). Sort level 6 is also marked complete in the active sort level array 750. Because the periodic state machine 412 has reached the end of the sort levels (e.g., there are no lower priority sort levels in this example), the periodic state machine 412 sets an alarm indicating that it is waiting for credits to free (e.g., for the super-speed IN buffer on port 1) and transitions to an idle state (e.g., state 1405 in FIG. 14). No transactions are executed during time period 1780 because the periodic state machine 412 has not received a credit free trigger and is still an idle state. If there are active asynchronous endpoints, the asynchronous state machine 414 may service an asynchronous endpoint during time period 1780.

After time period 1780, the periodic state machine 412 receives a credit free trigger and rewinds to the highest priority sort level. As illustrated in FIG. 17, the super-speed IN buffer on port 1 has drained and can now accept more data. Because sort level 3 is still active in the active sort level array 750, the periodic state machine 412 performs another search pass for sort level 3 and executes a transaction 1734 for endpoint ID 13, which is illustrated in the super-speed IN buffer on port 1, after determining that the transaction passes the credit check (e.g., the super-speed IN buffer on port 1 has drained). Because the endpoint ID 13 has a burst of one and one packet has now been dispatched, endpoint ID 13 is marked complete for the service interval (e.g., endpoint ID 13 transitions from state S2 to state S6). The periodic state machine 412 then performs a dispatch attempt for endpoint 15 (the other active endpoint point in sort level 3) and does not execute a transaction for endpoint ID 15 because the credit check fails (e.g., the super-speed IN buffer on port 1 is still storing the packet for endpoint ID 13 related to transaction 1734) and sort level 3 is marked incomplete (e.g., sort level 3 is still active in the active sort level array 750).

The periodic state machine 412 then continues with lower priority sort levels. Finding none (e.g., sort levels 4 and 6 was previously marked complete), the periodic state machine 412 sets an alarm indicating that it is waiting for credits to free (e.g., for the super-speed IN buffer on port 1) and transitions to the idle state. No transactions are executed during time period 1781 because the periodic state machine 412 has not received a credit free trigger and is still in an idle state.

A sub-frame boundary 1702 causes the sub-frame boundary trigger 730 (FIG. 7) to be asserted and the periodic state machine 412 to perform a service pass through the active array 132 (e.g., the periodic state machine 412 has transitioned to state 1410 in FIG. 14). During the service pass, the done bits are cleared for endpoints entering a new service interval (e.g., endpoint IDs 5, 8, and 10). Because endpoint IDs 5, 8, and 10 are now active, the periodic state machine 412 also marks sort level 0 as active in the active sort level array 750. After finishing the service pass, the periodic state machine 412 performs a search pass for the highest priority sort level (sort level 0) and performs a dispatch attempt for endpoint ID 5. The periodic state machine 412 executes a transaction 1736 for endpoint ID 5 after determining that the transaction passes the credit check. Because only four packets were dispatched in transaction 1736, endpoint ID 5 remains active (e.g., endpoint ID 5 transitions from state S2 to state S5) and sort level 0 is marked incomplete (e.g., sort level 0 is still active in the active sort level array 750).

Because there is another active endpoint in sort level 0, the periodic state machine 412 performs a dispatch attempt for endpoint ID 8. After determining that the transaction passes the credit check, the periodic state machine 412 executes a transaction 1738 for endpoint ID 8. Because the endpoint ID 8 has a burst of one and one packet was dispatched, endpoint ID 8 is marked complete for the service interval (e.g., endpoint ID 8 transitions from state S2 to state S6). After reaching end of the search pass for sort level 0, the periodic state machine 412 performs a search pass for the next highest priority sort level (sort level 1).

During the search pass for sort level 1, the periodic state machine 412 executes a transaction 1740 for endpoint ID 10 after determining that the transaction passes the credit check. Because the endpoint ID 10 has a burst of one and one packet is executed, endpoint ID 10 is marked complete for the service interval (e.g., endpoint ID 10 transitions from state S2 to state S6). After reaching end of the search pass for sort level 1, the periodic state machine 412 performs a search pass for the next highest priority sort level (sort level 3). During the search pass for sort level 3, the periodic state machine 412 does not execute a transaction for endpoint ID 15 because the credit checks fail (e.g., the super-speed IN buffer on port 1 is still storing packets for endpoint ID 5) and sort level 3 is marked incomplete (e.g., sort level 3 is still active in the active sort level array 750). The periodic state machine 412 then continues with lower priority sort levels. Finding none, the periodic state machine 412 sets an alarm indicating that it is waiting for credits to free (e.g., for the super-speed IN buffer on port 1) and transitions to the idle state. No transactions are executed during time period 1782 because the periodic state machine 412 has not received a credit free trigger and is still an idle state.

After time period 1782, the periodic state machine 412 receives a credit free trigger and rewinds to the highest priority sort level. As illustrated in FIG. 17, the super-speed IN buffer on port 1 has drained and can now accept more data. Because sort level 0 is still active in the active sort level array 750, the periodic state machine 412 performs another search pass for sort level 0 and executes a transaction 1742 for endpoint ID 5 after determining that the transaction passes the credit check (e.g., the super-speed IN buffer on port 1 has drained). Because the endpoint ID 5 has a burst of eight and eight packets have now been dispatched between transactions 1736 and 1742, endpoint ID 5 is marked complete for the service interval (e.g., endpoint ID 5 transitions from state S5 to state S6). Sort level 0 is also marked complete in the active sort level array 750 because endpoint IDs 5 and 8 have been marked complete for the service interval. The periodic state machine 412 then continues with lower priority sort levels. During the search pass for sort level 3, the periodic state machine 412 does not execute a transaction for endpoint ID 15 because the credit checks fail (e.g., the super-speed IN buffer on port 1 is still storing packets for endpoint ID 5 related to transaction 1742) and sort level 3 is marked incomplete (e.g., sort level 3 is still active in the active sort level array 750). The periodic state machine 412 then continues with lower priority sort levels.

Finding none, the periodic state machine 412 sets an alarm indicating that it is waiting for credits to free (e.g., for the super-speed IN buffer on port 1) and transitions to the idle state. No transactions are executed during time periods 1783-1785 because the periodic state machine 412 has not received a credit free trigger and is still in the idle state. After time period 1785, the periodic state machine 412 receives a credit free trigger and rewinds to the highest priority sort level. As illustrated in FIG. 17, the super-speed IN buffer on port 1 has drained and can now accept more data. Because sort level 3 is still active in the active sort level array 750, the periodic state machine 412 performs another search pass for sort level 3 and executes a transaction 1744 for endpoint ID 15 after determining that the transaction passes the credit check (e.g., the super-speed IN buffer on port 1 has drained). Because the endpoint ID 15 has a burst of one and one packet has now been dispatched, endpoint ID 15 is marked complete for the service interval (e.g., endpoint ID 15 transitions from state S2 to state S6).

The periodic state machine 412 then continues with lower priority sort levels. Finding none, the periodic state machine 412 transitions to the idle state without setting an alarm that it is waiting for credits to free. No transactions are executed during time period 1786.

A sub-frame boundary 1704 causes the sub-frame boundary trigger 730 to be asserted and the periodic state machine 412 to perform a service pass through the active array 132. During the service pass, the done bits are cleared for endpoints entering a new service interval (e.g., endpoint IDs 5, 8, 10, 13, 15, and 35). Because endpoint IDs 5, 8, 10, 13, 15, and 35 are now active, the periodic state machine 412 also marks sort levels 0, 1, and 3 as active in the active sort level array 750. After finishing the service pass, the periodic state machine 412 performs a search pass for the highest priority sort level (sort level 0) and performs a dispatch attempt for endpoint ID 5.

The periodic state machine 412 executes a transaction 1746 for endpoint ID 5 after determining that the transaction passes the credit check. Because only four of the eight packets were dispatched, endpoint ID 5 remains active (e.g., endpoint ID 5 transitions from state S2 to state S5) and the sort level 0 is marked incomplete (e.g., sort level 0 is still active in the active sort level array 750). Because there is another active endpoint in sort level 0 (e.g., endpoint ID 8), the periodic state machine 412 performs a dispatch attempt for endpoint ID 8. After determining that the transaction passes the credit check, the periodic state machine 412 executes a transaction 1748 for endpoint ID 8. Endpoint ID 8 is marked complete for the service interval (e.g., endpoint ID 8 transitions from state S2 to state S6). After reaching the end of the search pass for sort level 0, the periodic state machine 412 performs a search pass for the next highest priority sort level (sort level 1).

During the search pass for sort level 1, the periodic state machine 412 executes a transaction 1750 for endpoint ID 10 after determining that the transaction passes the credit check. Endpoint ID 10 is marked complete for the service interval (e.g., endpoint ID 10 transitions from state S2 to state S6). After reaching end of the search pass for sort level 1, the periodic state machine 412 performs a search pass for the next highest priority sort level (sort level 3).

During the search pass for sort level 3, the periodic state machine 412 does not execute transactions for endpoint IDs 13 and 15 because the credit checks fail (e.g., the super-speed IN buffer on port 1 is still storing packets for endpoint ID 5) and sort level 3 is marked incomplete. The periodic state machine 412 moves on to the next active endpoint in sort level 3 and executes a transaction 1752 for endpoint ID 35 after determining that the transaction passes the credit check. Endpoint ID 35 is marked complete for the service interval (e.g., endpoint ID 35 transitions from state S2 to state S6).

After executing the transaction 1752 for endpoint ID 35, the periodic state machine 412 receives a credit free trigger and rewinds to the highest priority sort level. As illustrated in FIG. 17, the super-speed IN buffer on port 1 has drained and can now accept more data. Because sort level 0 is still active in the active sort level array 750, the periodic state machine 412 performs another search pass for sort level 0 and executes a transaction 1754 for endpoint ID 5 after determining that the transaction passes the credit check (e.g., the super-speed IN buffer on port 1 has drained). Because the endpoint ID 5 has a burst of eight and eight packets have now been dispatched between transactions 1746 and 1754, endpoint ID 5 is marked complete for the service interval (e.g., endpoint ID 5 transitions from state S5 to state S6). Sort level 0 is also marked complete in the active sort level array 750 because endpoint IDs 5 and 8 have been marked complete for the service interval. The periodic state machine 412 then continues with lower priority sort levels.

Because endpoint IDs 8, 10 and 35 were previously marked complete for the service interval, the periodic state machine 412 does not revisit those endpoints. During the search pass for sort level 3, the periodic state machine 412 does not execute transactions for endpoint IDs 13 and 15 because the credit checks fail (e.g., the super-speed IN buffer on port 1 is still storing packets for endpoint ID 5 related to transaction 1754) and sort level 3 is marked incomplete. The periodic state machine 412 then continues with lower priority sort levels.

Finding none, the periodic state machine 412 sets an alarm indicating that it is waiting for credits to free (e.g., for the super-speed IN buffer on port 1) and transitions to the idle state. No transactions are executed during time periods 1787-1789 because the periodic state machine 412 has not received a credit free trigger and is still an idle state. After time period 1789, the periodic state machine 412 receives a credit free trigger and rewinds to the highest priority sort level. As illustrated in FIG. 17, the super-speed IN buffer on port 1 has drained and can now accept more data. Because sort level 3 is still active in the active sort level array 750, the periodic state machine 412 performs another search pass for sort level 3 and executes a transaction 1756 for endpoint ID 13 after determining that the transaction passes the credit check (e.g., the super-speed IN buffer on port 1 has drained). Endpoint ID 13 is marked complete for the service interval (e.g., endpoint ID 13 transitions from state S2 to state S6).

The periodic state machine 412 then continues with lower priority sort levels. Finding none, the periodic state machine 412 sets an alarm indicating that it is waiting for credits to free (e.g., for the super-speed IN buffer on port 1) and transitions to the idle state. No transactions are executed during time period 1790 because the periodic state machine 412 has not received a credit free trigger and is still an idle state.

A sub-frame boundary 1706 causes the sub-frame boundary trigger 730 to be asserted and the periodic state machine 412 to perform a service pass through the active array 132. During the service pass, the done bits are cleared for endpoints entering a new service interval (e.g., endpoint IDs 5, 8, and 10). Because endpoint IDs 5, 8, and 10 are now active, the periodic state machine 412 also marks sort level 0 as active in the active sort level array 750. After finishing the service pass, the periodic state machine 412 performs a search pass for the highest priority sort level (sort level 0) and performs a dispatch attempt for endpoint ID 5. The periodic state machine 412 executes a transaction 1758 for endpoint ID 5 after determining that the transaction passes the credit check. Because only four packets were dispatched in transaction 1758, endpoint ID 5 remains active (e.g., endpoint ID 5 transitions from state S2 to state S5) and sort level 0 is marked incomplete (e.g., sort level 0 is still active in the active sort level array 750).

Because there is another active endpoint in sort level 0, the periodic state machine 412 performs a dispatch attempt for endpoint ID 8. After determining that the transaction passes the credit check, the periodic state machine 412 executes a transaction 1760 for endpoint ID 8. Endpoint ID 8 is marked complete for the service interval (e.g., endpoint ID 8 transitions from state S2 to state S6). After reaching end of the search pass for sort level 0, the periodic state machine 412 performs a search pass for the next highest priority sort level (sort level 1).

During the search pass for sort level 1, the periodic state machine 412 executes a transaction 1762 for endpoint ID 10 after determining that the transaction passes the credit check. Endpoint ID 10 is marked complete for the service interval (e.g., endpoint ID 10 transitions from state S2 to state S6). After reaching the end of the search pass for sort level 1, the periodic state machine 412 performs a search pass for the next highest priority sort level (sort level 3). During the search pass for sort level 3, the periodic state machine 412 does not execute a transaction for endpoint ID 15 because the credit check fails (e.g., the super-speed IN buffer on port 1 is still storing packets for endpoint ID 5) and sort level 3 is marked incomplete. The periodic state machine 412 then continues with lower priority sort levels. Finding none, the periodic state machine 412 sets an alarm indicating that it is waiting for credits to free (e.g., for the super-speed IN buffer on port 1) and transitions to the idle state. No transactions are executed during time period 1791 because the periodic state machine 412 has not received a credit free trigger and is still an idle state.

After time period 1791, the periodic state machine 412 receives a credit free trigger and rewinds to the highest priority sort level. As illustrated in FIG. 17, the super-speed IN buffer on port 1 has drained and can now accept more data. Because sort level 0 is still active in the active sort level array 750, the periodic state machine 412 performs another search pass for sort level 0 and executes a transaction 1764 for endpoint ID 5 after determining that the transaction passes the credit check (e.g., the super-speed IN buffer on port 1 has drained). Because the endpoint ID 5 has a burst of eight and eight packets have now been dispatched between transactions 1758 and 1764, endpoint ID 5 is marked complete for the service interval (e.g., endpoint ID 5 transitions from state S5 to state S6). Sort level 0 is also marked complete in the active sort level array 750 because endpoint IDs 5 and 8 have been marked complete for the service interval. The periodic state machine 412 then continues with lower priority sort levels. During the search pass for sort level 3, the periodic state machine 412 does not execute a transaction for endpoint ID 15 because the credit checks fail (e.g., the super-speed IN buffer on port 1 is still storing packets for endpoint ID 5 related to transaction 1764) and sort level 3 is marked incomplete (e.g., sort level 3 is still active in the active sort level array 750). The periodic state machine 412 then continues with lower priority sort levels.

Finding none, the periodic state machine 412 sets an alarm indicating that it is waiting for credits to free (e.g., for the super-speed IN buffer on port 1) and transitions to the idle state. No transactions are executed during time periods 1792-1794 because the periodic state machine 412 has not received a credit free trigger and is still in the idle state. After time period 1794, the periodic state machine 412 receives a credit free trigger and rewinds to the highest priority sort level. As illustrated in FIG. 17, the super-speed IN buffer on port 1 has drained and can now accept more data. Because sort level 3 is still active in the active sort level array 750, the periodic state machine 412 performs another search pass for sort level 3 and executes a transaction 1766 for endpoint ID 15 after determining that the transaction passes the credit check (e.g., the super-speed IN buffer on port 1 has drained). Endpoint ID 15 is marked complete for the service interval (e.g., endpoint ID 15 transitions from state S2 to state S6).

The periodic state machine 412 then continues with lower priority sort levels. Finding none, the periodic state machine 412 transitions to the idle state without setting an alarm that it is waiting for credits to free. No transactions are executed during time period 1795.

A sub-frame boundary 1708 causes the sub-frame boundary trigger 730 to be asserted and the periodic state machine 412 to perform a service pass through the active array 132. During the service pass, the done bits are cleared for endpoints entering a new service interval (e.g., endpoint IDs 5, 8, 10, 13, 15, 35, and 40). Because endpoint IDs 5, 8, 10, 13, 15, 35, and 40 are now active, the periodic state machine 412 also marks sort levels 0, 1, 3, and 4 as active in the active sort level array 750. After finishing the service pass, the periodic state machine 412 performs search passes for sort levels 0, 1, 3, and 4 and executes transactions 1768, 1770, 1772, 1774, and 1776 in a manner similar to that described above with reference to transactions 1720, 1722, 1724, 1726, and 1728.

Figure 18:
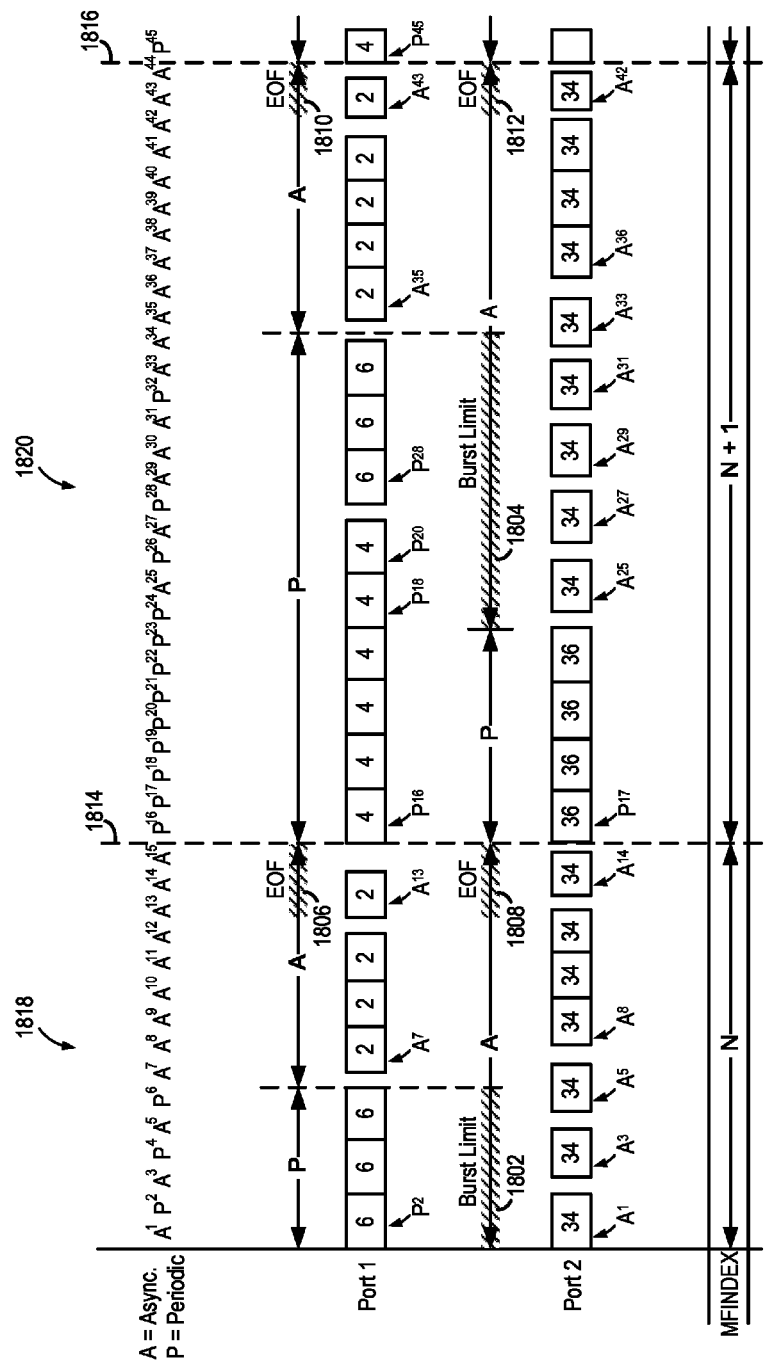
FIG. 18 is a diagram illustrating a hypothetical schedule generated by a cooperative interaction between the periodic and asynchronous state machines of FIGS. 7 and 11.

FIG. 18 is a diagram illustrating a hypothetical schedule generated by a cooperative interaction between the periodic and asynchronous state machines 412 and 414 of FIGS. 7 and 11. In this hypothetical example, the scheduler master state machine 410 limits the burst size near the end of a sub-frame and if there are any periodic transactions pending on any port. Table 8 illustrates active endpoints (e.g., that were found by the search logic 710 and 1110 in FIGS. 7 and 11) to be serviced by the periodic and asynchronous state machines 412 and 414. The endpoint ID is determined from Equation 4, above.

TABLE 8

| Device | Port | EP - Type | EP ID | Async./Periodic | Burst |
|---|---|---|---|---|---|
| Device 1 | 1 | #1 Bulk | 2 | A | 4 |
|  |  | #2 Iso. | 4 | P | 6 |
|  |  | #3 Iso. | 6 | P | 3 |
| Device 2 | 2 | #1 Bulk | 34 | A | 4 |
|  |  | #2 Iso. | 36 | P | 4 |

Even though endpoint ID 34 has a burst limit of four (e.g., endpoint ID 34 can send/receive four packets before waiting for an acknowledgement handshake), the burst size is limited to one packet when there is a periodic transaction pending on port 1, which is illustrated as burst limits 1802 and 1804 in FIG. 18. In a similar vein, even though endpoint IDs 2 and 34 each have a burst limit of four, the burst size is limited to one packet near sub-frame boundaries 1814 and 1816, which is illustrated as end-of-frame (EOF) limits 1806, 1808, 1810, and 1812 in FIG. 18.

In the top portion of FIG. 18, a "P" indicates when the periodic state machine 412 is active and an "A" indicates when the asynchronous state machine 414 is active. In other words, $P^2$, $P^4$, $P^6$, and so forth represent scheduling opportunities for the periodic state machine 412 and $A^1$, $A^3$, $A^5$, and so forth represent scheduling opportunities for the asynchronous state machine 414. The example begins during sub-frame N (1818) with the asynchronous state machine 414 executing an asynchronous transaction ($A^1$) for endpoint ID 34, which is illustrated on port 2. Before executing the transaction, the asynchronous state machine 414 verifies that there are no reservations for port 2 and that there are sufficient port credits. An asynchronous endpoint is being serviced on port 2 instead of a periodic endpoint because there are no active periodic endpoints for port 2 (e.g., the periodic state machine 416 previously serviced endpoint ID 36). The periodic state machine 412 executes during scheduling opportunity $P^2$ a burst of three packets for endpoint ID 6. The periodic and asynchronous state machines 412 and 414 take turns executing transactions during scheduling opportunities $A^1$, $P^2$, $A^3$, $P^4$, $A^5$, and $P^6$. For example, the interface between the primary scheduler 130 and the transfer manager 220 is single threaded, according to one embodiment, so the periodic and asynchronous state machines 412 and 414 take turns sending requests to the transfer manager 220. According to other embodiments, the interface between the primary scheduler 130 and the transfer manager 220 is multi-threaded, so the periodic and asynchronous state machines 412 and 414 do not take turns sending requests to the transfer manager 220. Even though endpoint ID 34 has a burst limit of four, the asynchronous state machine 414 executes one packet at a time during transactions $A^1$, $A^3$, and $A^5$ because there are periodic packets pending on port 1. Scheduling opportunities $P^4$ and $P^6$ may, for example, represent blocked opportunities (e.g., due to insufficient port credits).

After the third packet for transaction $P^2$ has finished executing, there are no more periodic transactions pending on port 1 and the asynchronous state machine 414 can execute transactions up to the burst limit for the endpoint. For example, the asynchronous state machine 414 executes during scheduling opportunity $A^7$ a burst of three packets for endpoint ID 2 on port 1 and executes during scheduling opportunity $A^8$ a burst of three packets for endpoint ID 34 on port 2. Scheduling opportunities $A^9$, $A^{10}$, $A^{11}$, and $A^{12}$ may, for example, represent blocked opportunities (e.g., due to insufficient port credits). As the sub-frame boundary 1814 approaches, the asynchronous state machine 414 is limited to sending one packet at a time during the EOF limits 1806 and 1808. Thus, even though endpoint IDs 2 and 34 each have a burst limit of four, the asynchronous state machine 414 executes one packet at a time during transactions $A^{13}$ and $A^{14}$. According to one embodiment, the asynchronous state machine 414 executes transactions, one packet at a time, right up to the end of the sub-frame to limit spillover into next sub-frame (e.g., to help ensure execution time is not wasted). According to certain embodiments, a periodic OUT transaction cuts ahead of an asynchronous OUT and a periodic IN header cuts ahead of an asynchronous IN header.

After the sub-frame boundary 1814, the periodic state machine 412 services endpoint IDs 4 and 36 (e.g., those endpoints may be starting a new service interval in sub-frame N+1 (1820)). During scheduling opportunity $P^{16}$, the periodic state machine 412 executes a burst of four packets for endpoint ID 4 (e.g., assuming port 1 has a credit limit of four packets) even though endpoint ID 4 has a burst limit of six packets. During scheduling opportunity $P^{17}$, the periodic state machine 412 executes a burst of four packets for endpoint ID 36. During scheduling opportunity $P^{18}$, the periodic state machine 412 executes another packet for endpoint ID 4 (e.g., after a port credit has become available on port 1). Likewise, during scheduling opportunity $P^{20}$, the periodic state machine 412 executes another packet for endpoint ID 4 (e.g., after a port credit has become available on port 1). The asynchronous state machine 414 does not have any scheduling opportunities between scheduling opportunity $P^{16}$ and $P^{24}$. After the fourth packet in the transaction that was executed for endpoint ID 4 during scheduling opportunity $P^{17}$ has completed executing, the periodic state machine 412 has no more periodic transactions to service on port 2 and the asynchronous state machine 414 begins servicing asynchronous transactions on port 2. Even though endpoint ID 34 has a burst limit of four, the asynchronous state machine 414 executes one packet at a time during scheduling opportunities $A^{25}$, $A^{27}$, $A^{29}$, $A^{31}$, and $A^{33}$ because there are periodic transactions pending on port 1. The periodic and asynchronous state machines 412 and 414 take turns executing transactions between scheduling opportunities $A^{25}$ and $A^{29}$. After the packet executed during scheduling opportunity $P^{20}$ for endpoint ID 4 has finished executing, the periodic state machine 412 services the next active periodic endpoint (endpoint ID 6) before servicing the active asynchronous endpoint (endpoint ID 2) on port 1.

During the scheduling opportunity $A^{31}$, the periodic state machine 412 may have received a credit free alarm. During the scheduling opportunity $P^{32}$ the periodic state machine 412 searches for the next active periodic endpoint to service. Finding none, the periodic state machine 412 does not execute another periodic transaction during the scheduling opportunity $P^{32}$ and enters the idle state, which allows the asynchronous state machine 414 to begin executing transactions to active endpoints on port 1.

After the third packet for transaction $P^{28}$ has finished executing, there are no more periodic transactions pending on port 1 and the asynchronous state machine 414 can execute transactions up to the burst limit for the endpoint. For example, the asynchronous state machine 414 executes during scheduling opportunity $A^{35}$ a burst of four packets for endpoint ID 2 on port 1 and executes during scheduling opportunity $A^{36}$ a burst of three packets for endpoint ID 34 on port 2. Scheduling opportunities $A^{37}$, $A^{38}$, $A^{39}$, $A^{40}$, and $A^{41}$ may, for example, represent blocked opportunities (e.g., due to insufficient port credits). As the sub-frame boundary 1816 approaches, the asynchronous state machine 414 is limited to sending one packet at a time during the EOF limits 1810 and 1812. Thus, even though endpoint IDs 2 and 34 each have a burst limit of four, the asynchronous state machine 414 executes one packet at a time during transactions $A^{42}$ and $A^{43}$. After the sub-frame boundary 1816, the periodic state machine 412 executes a periodic transaction $P^{45}$ to endpoint ID 4.

Embodiments may be provided as a computer program product including a nontransitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

The terms and descriptions used above are set forth by way of illustration only and are not meant as limitations. Those skilled in the art will recognize that many variations can be made to the details of the above-described embodiments without departing from the underlying principles of the invention. The scope of the invention should therefore be determined only by the following claims and their equivalents.

The invention claimed is:

1. A method of dispatching transactions to endpoints on a bus, the endpoints included in an array of endpoints to be serviced in priority order during multiple search passes through the array, the method comprising:

performing a search pass through the array of endpoints, wherein the search pass corresponds to a sort level having associated therewith a set of sort criteria and the search pass comprises:
identifying one or more active endpoints in the array that satisfy the set of sort criteria associated with the sort level;
when an endpoint satisfies the set of sort criteria, determining whether one or more dispatch resources are available to service the endpoint; and
when it is determined that the one or more dispatch resources are not available to service the endpoint, storing an indication that an endpoint satisfying the set of sort criteria has not been serviced so that endpoints in lower priority sort levels can be serviced during one or more subsequent search passes through the array using a different set of sort criteria; and
in response to receiving an indication that the one or more dispatch resources have become available, performing another search pass through the array, starting with endpoints in a highest priority sort level.

2. The method of claim 1, further comprising:
while servicing the array of endpoints during a subsequent search pass through the array using a different set of sort criteria, receiving an indication that the one or more dispatch resources have become available;
interrupting the servicing of the array of endpoints during the subsequent search pass through the array using the different set of sort criteria; and
performing another search pass through the array, starting with endpoints in the highest priority sort level.

3. The method of claim 1, wherein the multiple search passes through the array correspond to different sort levels having different sort criteria and the array of endpoints is processed over the multiple passes in a priority order, with higher priority sort levels being processed first.

4. The method of claim 3, wherein the different sort criteria are programmable.

5. The method of claim 3, wherein the array of endpoints is processed over 64 search passes corresponding to 64 sort levels.

6. The method of claim 3, wherein transactions traverse the bus during sub-frame intervals of time that are separated by sub-frame boundaries, the method further comprising:
during an initial service pass through the array after a sub-frame boundary, determining which sort levels include at least one active endpoint that satisfies the sort criteria associated with a respective sort level and marking the sort levels that include at least one active endpoint satisfying the sort criteria associated with the respective sort level so that subsequent search passes through the array are performed only for the marked sort levels.

7. The method of claim 6, wherein the sub-frame intervals of time comprise USB microframes.

8. The method of claim 1, wherein the set of sort criteria associated with the sort level includes a service interval defining a period of time between consecutive requests to an endpoint to send or receive data, and the step of identifying one or more active endpoints that satisfy the set of sort criteria comprises determining a service interval for the endpoint and comparing the service interval for the endpoint to the service interval associated with the set of sort criteria.

9. The method of claim 1, wherein the set of sort criteria associated with the sort level includes a data transfer rate at which transactions with the endpoint traverse the bus, and the step of identifying one or more active endpoints that satisfy the set of sort criteria comprises determining a data transfer rate for the endpoint and comparing the data transfer rate for the endpoint to the data transfer rate associated with the set of sort criteria.

10. The method of claim 1, wherein the set of sort criteria associated with the sort level includes a transfer type of either an isochronous or an interrupt transfer, and the step of identifying one or more active endpoints that satisfy the set of sort criteria comprises determining a transfer type associated with the endpoint and comparing the transfer type associated with the endpoint to the transfer type associated with the set of sort criteria.

11. The method of claim 1, wherein the set of sort criteria associated with the sort level includes a USB transaction type associated with either the USB specification revision 2.0 or the USB specification revision 3.0, and the step of identifying one or more active endpoints that satisfy the set of sort criteria comprises determining whether a USB transaction type associated with the endpoint is a USB 2.0 or 3.0 transaction and comparing the USB transaction type associated with the endpoint to the USB transaction type associated with the set of sort criteria.

12. The method of claim 1, wherein the step of determining whether one or more dispatch resources are available to service the endpoint includes determining whether a port memory associated with servicing the endpoint has a predetermined amount of available memory.

13. The method of claim 1, wherein the step of determining whether one or more dispatch resources are available to service the endpoint includes determining whether a transaction list to which a transaction associated with the endpoint is to be posted includes at least one available storage location.

14. The method of claim 1, wherein the endpoint has associated therewith a service interval defining a period of time between consecutive requests to the endpoint to send or receive data and the consecutive requests include a predetermined number of transactions, and further comprising:
after dispatching the predetermined number of transactions to the endpoint during a service interval, updating a state field associated with the endpoint to indicate that no additional transactions need to be dispatched to the endpoint during the service interval.

15. The method of claim 1, wherein the endpoints in the array have associated therewith service intervals that define a period of time between consecutive requests to an endpoint to send or receive data using one or more transactions and the transactions traverse the bus during sub-frame intervals of time that are separated by sub-frame boundaries, the method further comprising:
during an initial service pass through the array after a sub-frame boundary, determining which endpoints in the array are starting a new service interval and updating a state field associated with the endpoints that are starting a new service interval to indicate that one or more transactions need to be dispatched to the endpoints during the new service interval.

16. The method of claim 1, wherein the endpoints in the array have associated therewith service intervals that define a period of time between consecutive requests to an endpoint to send or receive data, the consecutive requests include a predetermined number of transactions, and the transactions traverse the bus during sub-frame intervals of time that are separated by sub-frame boundaries, the method further comprising:
during an initial service pass through the array after a sub-frame boundary, determining which endpoints in the array are starting a new service interval and, for endpoints starting a new service interval, determining whether the predetermined number of transactions were dispatched in a previous service interval to identify a missed service interval.

17. The method of claim 1, wherein transactions traverse the bus during sub-frame intervals of time that are separated by sub-frame boundaries, the method further comprising:
during a service pass through the array after a sub-frame boundary, determining which endpoints in the array include isochronous transfers with a link in a sleep state and, for endpoints that include isochronous transfers with a link in a sleep state, dispatching a transaction to wake up the link.

18. The method of claim 1, wherein the bus comprises a USB bus.

19. The method of claim 1, wherein the endpoints comprise periodic endpoints configured to receive or send periodic transactions.

20. A host controller comprising:
a root hub including multiple ports, each port configured to communicate with one or more endpoints over a bus;
an array including one or more elements that correspond to endpoints in communication with the root hub, the elements storing an indication of whether a corresponding endpoint is ready to receive or send a transaction;
search logic configured to identify endpoints in the array that are ready to receive or send a transaction; and
control logic configured to:
cause the search logic to perform a search pass through the array corresponding to a sort level having a set of sort criteria associated therewith;
during the search pass through the array, examine the endpoints identified by the search logic to determine whether any of the endpoints satisfy the set of sort criteria associated with the sort level;
determine whether one or more dispatch resources are available for the endpoints that satisfy the set of sort criteria; and
when it is determined that the one or more dispatch resources are not available for at least one endpoint, mark the sort level corresponding to the search pass with an indication that at least one endpoint satisfying the set of sort criteria has not been serviced.

21. The host controller of claim 20, wherein the control logic is further configured to receive an indication that the one or more dispatch resources have become available and, in response to receiving the indication that the one or more dispatch resources have become available, cause the search logic to perform another search pass through the array, starting with a highest priority sort level.

22. The host controller of claim 20, wherein the control logic is further configured to cause the search logic to perform multiple search passes through the array and each search pass corresponds to a sort level having a unique set of sort criteria associated therewith.

23. The host controller of claim 20, further comprising:
an active sort level array including an element corresponding to each sort level, wherein each element in the active sort level array stores an indication of whether a corresponding sort level includes at least one endpoint that is ready to receive or send a transaction.

24. The host controller of claim 20, further comprising:
a sort level counter configured to store a value reflecting a sort level associated with a search pass through the array, wherein the control logic is configured to examine the endpoints identified by the search logic during a pass through the array using a set of sort criteria associated with a sort level reflected by a value stored in the sort level counter, and, after receiving an indication that the one or more dispatch resources have become available, load the sort level counter with a value associated with a highest priority sort level.

25. The host controller of claim 20, further comprising:
a credit check module configured to provide the control logic with an indication of whether one or more dispatch resources are available for the endpoints that satisfy the set of sort criteria.

26. The host controller of claim 20, further comprising:
multiple transaction counters, each transaction counter associated with a respective one of the multiple ports included with the root hub and configured to store a value reflecting a number of transactions stored or about to be stored in an associated port buffer, wherein the control logic is configured to determine whether one or more dispatch resources are available based on the value stored in a transaction counter associated with each endpoint that satisfies the set of sort criteria.

27. The host controller of claim 20, further comprising:
a plurality of state fields associated with each endpoint, wherein the state fields reflect a state of an endpoint; and combinational logic configured to combine the plurality of state fields associated with a respective endpoint into a corresponding element in the array.

28. The host controller of claim 20, wherein, after determining that there are no endpoints in the array that are ready to receive or send a transaction, the search logic is configured to provide the control logic with an indication that there are no endpoints in the array that are ready to receive or send a transaction.

29. The host controller of claim 20, wherein the endpoints comprise periodic endpoints configured to receive or send periodic transactions, the bus comprises a USB bus, and the host controller implements a USB protocol.

30. A host including the host controller of claim 20.

31. A method of dispatching transactions to endpoints on a bus, the endpoints included in an array of endpoints, the method comprising:
selecting one endpoint in the array as a current endpoint from which to begin a search of the array;
starting with the current endpoint, searching the array for an active endpoint that is ready to receive or send a transaction;
performing a dispatch attempt comprising:
determining whether one or more dispatch resources are available to service the active endpoint;
determining whether there is a reservation for a port associated with servicing the active endpoint;
when it is determined that the one or more dispatch resources are available to service the active endpoint and that there is a reservation for the port, determining whether the reservation is for the active endpoint; and
when it is determined that the reservation is for the active endpoint, clearing the reservation for the active endpoint and dispatching a transaction to the active endpoint;
setting the active endpoint as the current endpoint; and
iteratively repeating the searching, performing a dispatch attempt, and setting steps until there are no more endpoints in the array that are ready to receive or send a transaction.

32. The method of claim 31, wherein the step of performing the dispatch attempt further comprises:
when it is determined that the one or more dispatch resources are not available to service the active endpoint and that there is no reservation for the port, making a reservation for the port for the active endpoint and delaying dispatch of a transaction to the active endpoint until a subsequent dispatch attempt.

33. The method of claim 31, wherein the step of performing the dispatch attempt further comprises:
when it is determined that the one or more dispatch resources are not available to service the active endpoint and that there is a reservation for the port, delaying making a reservation for the port for the active endpoint until a subsequent dispatch attempt and delaying dispatch of a transaction to the active endpoint until a subsequent dispatch attempt.

34. The method of claim 31, wherein the step of performing the dispatch attempt further comprises:
when it is determined that the reservation is not for the active endpoint, delaying dispatch of a transaction to the active endpoint until a subsequent dispatch attempt.

35. The method of claim 31, wherein the step of performing the dispatch attempt further comprises:
when it is determined that the one or more dispatch resources are available to service the active endpoint and that there is not a reservation for the port, dispatching a transaction to the active endpoint.

36. The method of claim 31, wherein the bus comprises a USB bus.

37. The method of claim 31, wherein the endpoints comprise asynchronous endpoints configured to receive or send asynchronous transactions.

38. A host controller comprising:
a root hub including multiple ports, each port including one or more buffers and configured to communicate with one or more endpoints over a bus;
an array including one or more elements that correspond to endpoints in communication with the root hub, the elements storing an indication of whether a corresponding endpoint is ready to receive or send a transaction;
search logic configured to identify endpoints in the array that are ready to receive or send a transaction; and
control logic configured to:
(a) select one endpoint in the array as a current endpoint from which to begin a search of the array;
(b) cause the search logic to, starting with the current endpoint, search the array for an active endpoint that is ready to receive or send a transaction;
(c) determine whether one or more dispatch resources are available to service the active endpoint;
(d) dispatch a transaction to the active endpoint if the one or more dispatch resources are available to service the active endpoint and the active endpoint has a reservation for a port associated with servicing the active endpoint;
(e) clear the reservation for the port associated with the active endpoint;
(f) set the active endpoint as the current endpoint; and
(g) iteratively repeat steps (b), (c), (d), (e), and (f) until there are no more endpoints in the array that are ready to receive or send a transaction.

39. The host controller of claim 38, wherein steps (b), (c), (d), (e), and (f) are performed simultaneously.

40. The host controller of claim 38, further comprising:
a reservation memory associated with each port, each reservation memory configured to store an indication that a reservation has been made for the associated port for an endpoint and an identification of the endpoint to which the reservation belongs.

41. The host controller of claim 38, further comprising:
a credit check module configured to provide the control logic with an indication of whether one or more dispatch resources are available to service the active endpoint.

42. The host controller of claim 38, wherein the array is configured to provided to the control logic an indication of whether there are any endpoints in the array that are ready to receive or send a transaction.

43. The host controller of claim 38, further comprising:
plurality of state fields associated with each endpoint, wherein the state fields reflect a state of an endpoint; and
combinational logic configured to combine the plurality of state fields associated with a respective endpoint into a corresponding element in the array.

44. The host controller of claim 38 wherein the array comprises a first array and the host controller further comprises:
a polling array including one or more elements that correspond to endpoints in communication with the root hub, wherein the elements store an indication of whether a corresponding endpoint should be serviced by polling logic;
polling logic configured to sequence through the elements in the polling array that store an indication that a corresponding endpoint should be serviced by the polling logic, and, for each element in the polling array that stores an indication that a corresponding endpoint should be serviced by the polling logic, send a service request to dispatch a transaction to the corresponding endpoint, wherein the polling logic is configured service endpoints from the polling array a slower rate than the control logic services endpoints from the first array; and
an arbiter in communication with the control logic and the polling logic, the arbiter configured to receive the service request from the polling logic and alternate between dispatching transactions for the control logic and the polling logic.

45. The host controller of claim 44, wherein an element in the polling array is set to indicate that an endpoint corresponding to the element should be serviced by the polling logic if an endpoint corresponding to the element responds to a transaction with a negative acknowledgment.

46. The host controller of claim 38, wherein the endpoints comprise asynchronous endpoints configured to receive or send asynchronous transactions, the bus comprises a USB bus, and the host controller implements a USB protocol.

47. A host including the host controller of claim 38.

48. A method of dispatching periodic and non-periodic transactions to endpoints on a bus, the method comprising:
starting with a highest priority sort level, performing multiple search passes through a first array of endpoints to determine whether one or more dispatch resources are available for active endpoints that satisfy a set of sort criteria associated with a search pass, wherein each search pass corresponds to a sort level;
if, during a search pass, it is determined that one or more dispatch resources are not available for an endpoint, marking the sort level corresponding to the search pass with a marker indicating that at least one endpoint satisfying the set of sort criteria has not been serviced;
after the active endpoints in the first array have been serviced by dispatching a periodic transaction to the endpoint or by marking a sort level corresponding to the endpoint with the marker, dispatching a non-periodic transaction to an active endpoint in a second array of endpoints; and
in response to receiving an indication that the one or more dispatch resources have become available, performing one or more subsequent search passes through the first array, starting with a highest priority sort level that is marked with the marker, to dispatch one or more transactions to active endpoints satisfying a set of sort criteria associated with the subsequent search pass and for which one or more dispatch resources are available.

49. The method of claim 48, wherein the endpoints in the first array have associated therewith service intervals that define a period of time between consecutive requests to an endpoint to send or receive data using one or more transactions and the transactions traverse the bus during sub-frame intervals of time that are separated by sub-frame boundaries, the method further comprising:
in response to receiving a sub-frame boundary trigger, performing an initial service pass through the first array to:
determine which endpoints in the first array are starting a new service interval and update a state field associated with the endpoints that are starting a new service interval to indicate that one or more transactions need to be dispatched to the endpoints during the new service interval; and
determine which sort levels include at least one active endpoint that satisfies the sort criteria associated with a respective sort level and mark the sort levels that include at least one active endpoint satisfying the sort criteria associated with the respective sort level so that subsequent search passes through the first array are performed only for the marked sort levels.

50. A host controller comprising:
a root hub including multiple ports, each port configured to communicate with one or more endpoints over a bus;
a first array including one or more elements that correspond to periodic endpoints in communication with the root hub, the elements storing an indication of whether a corresponding endpoint is ready to receive or send a transaction;
a first controller configured to service from the first array endpoints that are ready to receive or send a transaction in priority order during multiple search passes through the first array, each search pass corresponding to a sort level, and, in response to determining that one or more dispatch resources are not available for an endpoint, marking the sort level corresponding to the search pass with a marker indicating that at least one endpoint satisfying the set of sort criteria has not been serviced;
a second array including one or more elements that correspond to non-periodic endpoints in communication with the root hub, the elements storing an indication of whether a corresponding endpoint is ready to receive or send a transaction; and
a second controller configured to service from the second array endpoints that are ready to receive or send a transaction in multiple search iterations through the second array by determining whether one or more dispatch resources are available to service an endpoint, and, if it is determined that the one or more dispatch resources are not available to service the endpoint, make a reservation for the endpoint so that the endpoint can be serviced during a subsequent search iteration through the second array.

51. The host controller of claim 50, wherein the first controller is further configured to receive an indication that the one or more dispatch resources have become available and, in response to receiving the indication that the one or more dispatch resources have become available, perform another search pass through the array, starting with a highest priority sort level that is marked with the marker.

* * * * *